US012809137B2

(12) United States Patent
Kondo

(10) Patent No.: US 12,809,137 B2
(45) Date of Patent: Nov. 24, 2026

(54) VARIABLE MAGNIFICATION OPTICAL SYSTEM AND IMAGING APPARATUS

(71) Applicant: FUJIFILM Corporation, Tokyo (JP)

(72) Inventor: Masato Kondo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 209 days.

(21) Appl. No.: 18/920,835

(22) Filed: Oct. 18, 2024

(65) Prior Publication Data

US 2025/0138292 A1 May 1, 2025

(30) Foreign Application Priority Data

Oct. 27, 2023 (JP) ................................ 2023-185033

(51) Int. Cl.

*G02B 15/14* (2006.01)
*G02B 15/16* (2006.01)
*G02B 27/64* (2006.01)

(52) U.S. Cl.

CPC ......... *G02B 15/1435* (2019.08); *G02B 15/16* (2013.01); *G02B 27/646* (2013.01)

(58) Field of Classification Search

CPC ...... G02B 13/18; G02B 15/20; G02B 15/177; G02B 15/1465; G02B 13/009; G02B 13/04; G02B 27/0025; G02B 13/02; G02B 15/14; G02B 15/144507; G02B 15/144511; G02B 15/143503; G02B 15/145527; G02B 15/145523; G02B 15/1425; G02B 15/143507; G02B 15/167; G02B 13/0045; G02B 15/144503; G02B 15/145507; G02B 15/145511; G02B 15/145515; G02B 15/145519; G02B 15/22; G03B 2205/0046; G03B 5/00; H04N 23/69

See application file for complete search history.

(56) References Cited

U.S. PATENT DOCUMENTS

| | | | | |
|---|---|---|---|---|
| 2021/0165196 | A1 | 6/2021 | Gyoda | |
| 2021/0311290 | A1 | 10/2021 | Gyoda et al. | |
| 2023/0194840 | A1 * | 6/2023 | Kondo ........... | G02B 15/143507 359/683 |

FOREIGN PATENT DOCUMENTS

| | | |
|---|---|---|
| JP | 2021-086024 A | 6/2021 |
| JP | 2021-162822 A | 10/2021 |

* cited by examiner

*Primary Examiner* — Brandi N Thomas
(74) *Attorney, Agent, or Firm* — Studebaker Brackett PLLC

(57) ABSTRACT

A variable magnification optical system consists of, in order from an object side to an image side, a first lens group having a negative refractive power, a second lens group having a positive refractive power, and a subsequent group including one or more lens groups. During changing magnification, the first lens group moves, and spacings between all adjacent lens groups change. One lens group included in the subsequent group is a focusing lens group that moves along an optical axis during focusing. The variable magnification optical system satisfies a predetermined conditional expression.

29 Claims, 43 Drawing Sheets

EXAMPLE 1

EXAMPLE 2

EXAMPLE 3

EXAMPLE 4

EXAMPLE 5

EXAMPLE 7

EXAMPLE 9

EXAMPLE 10

EXAMPLE 11

EXAMPLE 14

EXAMPLE 15

EXAMPLE 16

EXAMPLE 17

EXAMPLE 19

VARIABLE MAGNIFICATION OPTICAL SYSTEM AND IMAGING APPARATUS

CROSS-REFERENCE TO RELATED APPLICATIONS

This application claims priority from Japanese Patent Application No. 2023-185033, filed on Oct. 27, 2023, the entire disclosure of which is incorporated herein by reference.

BACKGROUND

Technical Field

The disclosed technology relates to a variable magnification optical system and an imaging apparatus.

Related Art

In the related art, variable magnification optical systems according to JP2021-162822A and JP2021-086024A have been known as a variable magnification optical system usable in an imaging apparatus such as a digital camera.

SUMMARY

A variable magnification optical system that is configured to have a small size and a low weight and that maintains favorable optical performance in an entire magnification range is desired. A level of such demands is increased year by year.

The present disclosure provides a variable magnification optical system that is configured to have a small size and a low weight and that maintains favorable optical performance in an entire magnification range, and an imaging apparatus comprising the variable magnification optical system.

According to a first aspect of the present disclosure, there is provided a variable magnification optical system consisting of, in order from an object side to an image side, a first lens group having a negative refractive power, a second lens group having a positive refractive power, and a subsequent group including one or more lens groups, in which during changing magnification, the first lens group moves, and spacings between all adjacent lens groups change, one lens group included in the subsequent group is a focusing lens group that moves along an optical axis during focusing, and Conditional Expressions (1), (2), (3), (4), and (5) are satisfied, which are represented by $$4.5 < TLw/(ft \times \tan \omega t) < 8 \quad (1)$$

$$0.4 < Bfw/(ft \times \tan \omega t) < 3 \quad (2)$$

$$0.9 < (fw \times TLw)/ft^2 < 3.2 \quad (3)$$

$$1.6 < NG1L + 0.01 \times \nu G1L < 2.3 \quad (4)$$

$$0.1 < Dsum/(TLw - Bfw) < 0.8. \quad (5)$$

Symbols of Conditional Expressions (1), (2), (3), (4), and (5) are defined as follows.

A sum of a back focus of an entire system as an air conversion distance and a distance on the optical axis from a lens surface of the first lens group closest to the object side to a lens surface of the subsequent group closest to the image side in a state where an infinite distance object is focused on at a wide angle end is denoted by TLw. A focal length of the entire system in a state where the infinite distance object is focused on at a telephoto end is denoted by ft. A maximum half angle of view in the state where the infinite distance object is focused on at the telephoto end is denoted by ωt. The back focus of the entire system as the air conversion distance in the state where the infinite distance object is focused on at the wide angle end is denoted by Bfw. A focal length of the entire system in the state where the infinite distance object is focused on at the wide angle end is denoted by fw. A refractive index with respect to a d line and an Abbe number based on the d line for any lens included in the first lens group are denoted by NG1L and νG1L, respectively. A sum total of thicknesses of all lens groups on the optical axis is denoted by Dsum.

According to a second aspect of the present disclosure, in the variable magnification optical system according to the first aspect, Conditional Expression (1-1) is satisfied, which is represented by $$5.4 < TLw/(ft \times \tan \omega t) < 7. \quad (1\text{-}1)$$

According to a third aspect of the present disclosure, in the variable magnification optical system according to the first aspect, Conditional Expression (2-1) is satisfied, which is represented by $$0.55 < Bfw/(ft \times \tan \omega t) < 2. \quad (2\text{-}1)$$

According to a fourth aspect of the present disclosure, in the variable magnification optical system according to the first aspect, in a case where a thickness of the first lens group on the optical axis is denoted by dG1, and a focal length of the first lens group is denoted by f1, Conditional Expression (6) is satisfied, which is represented by $$0.4 < dG1/|f1| < 2. \quad (6)$$

According to a fifth aspect of the present disclosure, in the variable magnification optical system according to the fourth aspect, Conditional Expression (6-1) is satisfied, which is represented by $$0.55 < dG1/|f1| < 1.65. \quad (6\text{-}1)$$

According to a sixth aspect of the present disclosure, in the variable magnification optical system according to the first aspect, the first lens group includes an L1nm lens that is a non-cemented negative meniscus lens having a convex surface toward the object side, an L1n lens that is a non-cemented negative lens having a concave surface toward the image side, and an L1p lens that is a positive lens, the L1n lens is disposed adjacent to the image side of the L1nm lens, and the L1p lens is disposed closer to the image side than the L1n lens.

According to a seventh aspect of the present disclosure, in the variable magnification optical system according to the sixth aspect, in a case where a refractive index with respect to a d line and an Abbe number based on the d line for a negative lens disposed between the L1nm lens and the L1p lens are denoted by NG1n and νG1n, respectively, the variable magnification optical system includes a negative lens satisfying Conditional Expression (7) represented by $$1.7 < NG1n + 0.01 \times \nu G1n < 2.16, \tag{7}$$

the negative lens satisfying Conditional Expression (7) is the L1n lens or a negative lens disposed adjacent to the image side of the L1n lens.

According to an eighth aspect of the present disclosure, in the variable magnification optical system according to the seventh aspect, the negative lens satisfying Conditional Expression (7) satisfies Conditional Expression (7-1) represented by $$1.74 < NG1n + 0.01 \times \nu G1n < 2.14. \tag{7-1}$$

According to a ninth aspect of the present disclosure, in the variable magnification optical system according to the sixth aspect, in a case where a distance on the optical axis between the L1nm lens and the L1n lens is denoted by dm, and a thickness of the first lens group on the optical axis is denoted by dG1, Conditional Expression (8) is satisfied, which is represented by $$0.01 < dm/dG1 < 0.9. \tag{8}$$

According to a tenth aspect of the present disclosure, in the variable magnification optical system according to the sixth aspect, a surface of the L1n lens on the object side is an aspherical surface in which a refractive power at a position of a maximum effective diameter is shifted in a positive direction compared to a refractive power in a paraxial region.

According to an eleventh aspect of the present disclosure, in the variable magnification optical system according to the tenth aspect, the surface of the L1n lens on the object side has a concave shape in the paraxial region and has a convex shape in an edge part including the position of the maximum effective diameter.

According to a twelfth aspect of the present disclosure, in the variable magnification optical system according to the first aspect, in a case where a focal length of the second lens group is denoted by f2, and a focal length of the first lens group is denoted by f1, Conditional Expression (9) is satisfied, which is represented by $$0.3 < f2/|f1| < 5. \tag{9}$$

According to a thirteenth aspect of the present disclosure, in the variable magnification optical system according to the twelfth aspect, Conditional Expression (9-1) is satisfied, which is represented by $$0.65 < f2/|f1| < 3. \tag{9-1}$$

According to a fourteenth aspect of the present disclosure, in the variable magnification optical system according to the thirteenth aspect, Conditional Expression (1-1) is satisfied, which is represented by $$5.4 < TLw/(ft \times \tan\omega t) < 7. \tag{1-1}$$

According to a fifteenth aspect of the present disclosure, in the variable magnification optical system according to the fourteenth aspect, the first lens group includes an L1nm lens that is a non-cemented negative meniscus lens having a convex surface toward the object side, an L1n lens that is a non-cemented negative lens having a concave surface toward the image side, and an L1p lens that is a positive lens, the L1n lens is disposed adjacent to the image side of the L1nm lens, and the L1p lens is disposed closer to the image side than the L1n lens.

According to a sixteenth aspect of the present disclosure, in the variable magnification optical system according to the fifteenth aspect, in a case where a refractive index with respect to a d line and an Abbe number based on the d line for a negative lens disposed between the L1nm lens and the L1p lens are denoted by NG1n and νG1n, respectively, the variable magnification optical system includes a negative lens satisfying Conditional Expression (7-1) represented by $$1.74 < NG1n + 0.01 \times \nu G1n < 2.14, \tag{7-1}$$

and the negative lens satisfying Conditional Expression (7-1) is the L1n lens or a negative lens disposed adjacent to the image side of the L1n lens.

According to a seventeenth aspect of the present disclosure, in the variable magnification optical system according to the sixteenth aspect, the first lens group includes a positive lens having a convex surface toward the object side, closest to the object side.

According to an eighteenth aspect of the present disclosure, in the variable magnification optical system according to the sixteenth aspect, Conditional Expression (4-1) is satisfied, which is represented by $$1.82 < NG1L + 0.01 \times \nu G1L < 1.91. \tag{4-1}$$

According to a nineteenth aspect of the present disclosure, in the variable magnification optical system according to the sixteenth aspect, in a case where a thickness of the first lens group on the optical axis is denoted by dG1, Conditional Expression (6-1) is satisfied, which is represented by $$0.55 < dG1/|f1| < 1.65. \tag{6-1}$$

According to a twentieth aspect of the present disclosure, in the variable magnification optical system according to the nineteenth aspect, Conditional Expression (6-2) is satisfied, which is represented by $$0.75 < dG1/|f1| < 1.35. \tag{62}$$

According to a twenty-first aspect of the present disclosure, in the variable magnification optical system according to the nineteenth aspect, in a case where a distance on the optical axis between the L1nm lens and the L1n lens is denoted by dm, Conditional Expression (8) is satisfied, which is represented by $$0.01 < dm/dG1 < 0.9. \tag{8}$$

According to a twenty-second aspect of the present disclosure, in the variable magnification optical system according to the nineteenth aspect, the first lens group consists of four or less lenses.

According to a twenty-third aspect of the present disclosure, in the variable magnification optical system according to the nineteenth aspect, a surface of the Ln lens on the object side is an aspherical surface in which a refractive power at a position of a maximum effective diameter is shifted in a positive direction compared to a refractive power in a paraxial region.

According to a twenty-fourth aspect of the present disclosure, in the variable magnification optical system according to the first aspect, in a case where a focal length of the first lens group is denoted by f1, Conditional Expression (10) is satisfied, which is represented by $$0.45 < fw/|f1| < 2. \tag{10}$$

According to a twenty-fifth aspect of the present disclosure, in the variable magnification optical system according to the first aspect, the first lens group includes an L1nm lens that is a non-cemented negative meniscus lens having a convex surface toward the object side, and in a case where a paraxial curvature radius of a surface of the L1nm lens on the object side is denoted by Rf, and a paraxial curvature radius of a surface of the L1nm lens on the image side is denoted by Rr, Conditional Expression (11) is satisfied, which is represented by $$1 < (Rf + Rr)/(Rf - Rr) < 7. \tag{11}$$

According to a twenty-sixth aspect of the present disclosure, in the variable magnification optical system according to the first aspect, a vibration-proof group that moves in a direction intersecting with the optical axis during image shake correction is disposed closer to the image side than the first lens group, and in a case where a focal length of the vibration-proof group is denoted by fois, Conditional Expression (12) is satisfied, which is represented by $$0.3 < ft/|fois| < 4. \tag{12}$$

According to a twenty-seventh aspect of the present disclosure, in the variable magnification optical system according to the first aspect, in a case where a focal length of the focusing lens group is denoted by ffoc, Conditional Expression (13) is satisfied, which is represented by $$0.3 < ft/|ffoc| < 3. \tag{13}$$

According to a twenty-eighth aspect of the present disclosure, in the variable magnification optical system according to the first aspect, an Lr lens is disposed closer to the image side than the focusing lens group, and in a case where a refractive index with respect to a d line and an Abbe number based on the d line for the Lr lens are denoted by Nr and νr, respectively, Conditional Expression (14) is satisfied, which is represented by $$1.7 < Nr + 0.01 \times \nu r < 2.16. \tag{14}$$

According to a twenty-ninth aspect of the present disclosure, there is provided an imaging apparatus comprising the variable magnification optical system according to any one of the first to twenty-eighth aspects.

In the present specification, the expressions "consists of" and "consisting of" intend that a lens substantially not having a refractive power, an optical element other than a lens such as a stop, a filter, and a cover glass, a mechanism part such as a lens flange, a lens barrel, an imaging element, and a camera shake correction mechanism may be included in addition to the illustrated constituents.

The term "group having a positive refractive power" in the present specification means that a positive refractive power is provided as a whole group. Similarly, the term "group having a negative refractive power" means that a negative refractive power is provided as a whole group. The term "lens having a positive refractive power" and the term "positive lens" are synonymous with each other. The term "lens having a negative refractive power" and the term "negative lens" are synonymous with each other. The term "group" in the present specification is not limited to a configuration consisting of a plurality of lenses and may be a configuration consisting of only one lens.

The term "entire system" in the present specification means the variable magnification optical system. The term "focal length" used in the conditional expressions is a paraxial focal length. Unless otherwise specified, the term "distance on the optical axis" used in the conditional expressions is a geometrical distance. Unless otherwise specified, values used in the conditional expressions are values based on the d line in a state where an infinite distance object is focused on. Unless otherwise specified, a curvature radius, a sign of a refractive power, and a surface shape related to a lens including an aspherical surface in a paraxial region are used. For a sign of the paraxial curvature radius, a sign of a surface having a convex shape toward the object side is positive, and a sign of a surface having a convex shape toward the image side is negative.

According to the present disclosure, a variable magnification optical system that is configured to have a small size and a low weight and that maintains favorable optical performance in an entire magnification range, and an imaging apparatus comprising the variable magnification optical system can be provided.

DESCRIPTION OF EMBODIMENTS

Hereinafter, an embodiment of the present disclosure will be described with reference to the drawings.

Figure 1:
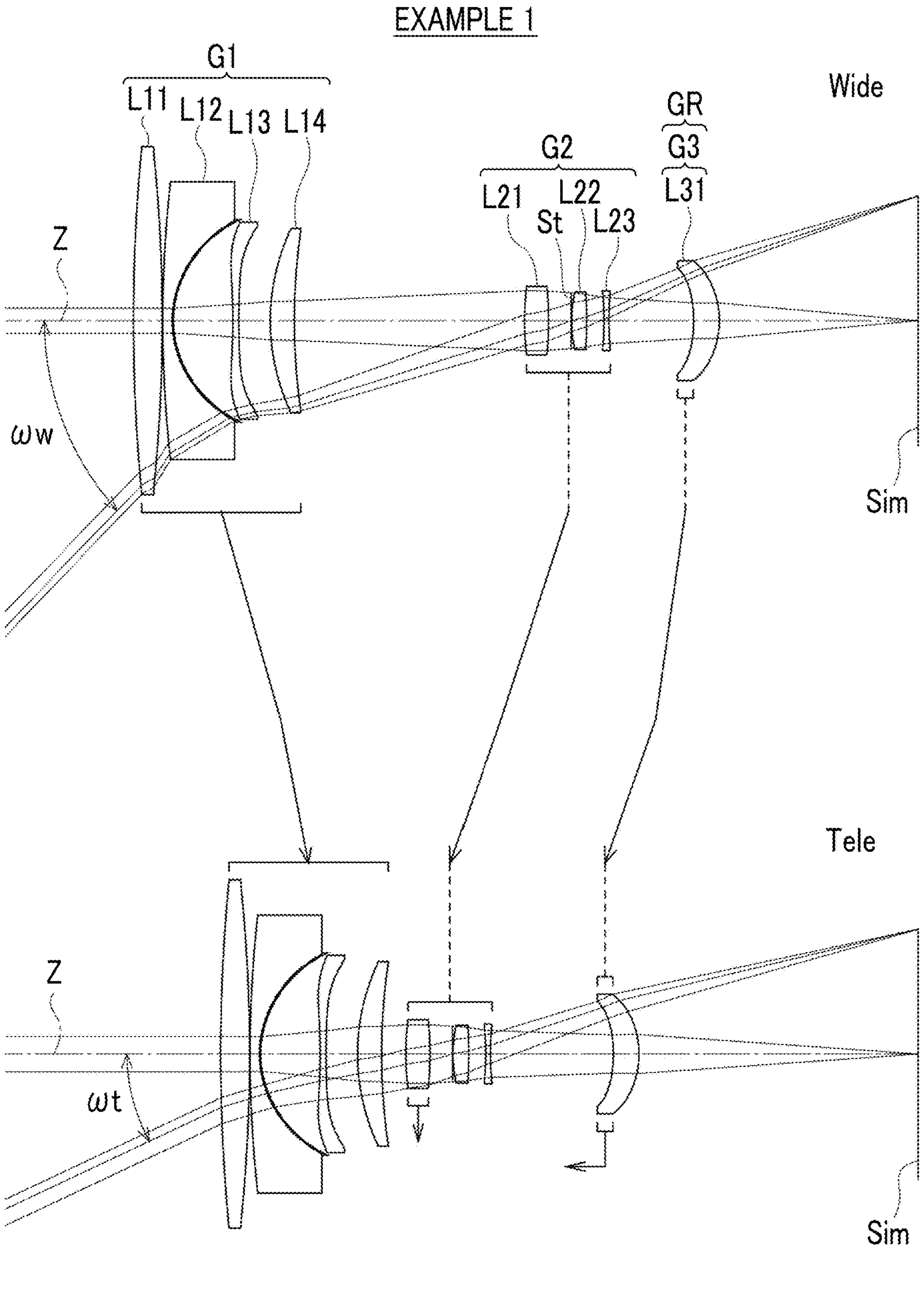
FIG. 1 is a diagram that corresponds to a variable magnification optical system of Example 1 and that illustrates a cross-sectional view and a moving path of a configuration of a variable magnification optical system according to one embodiment.
Figure 2:
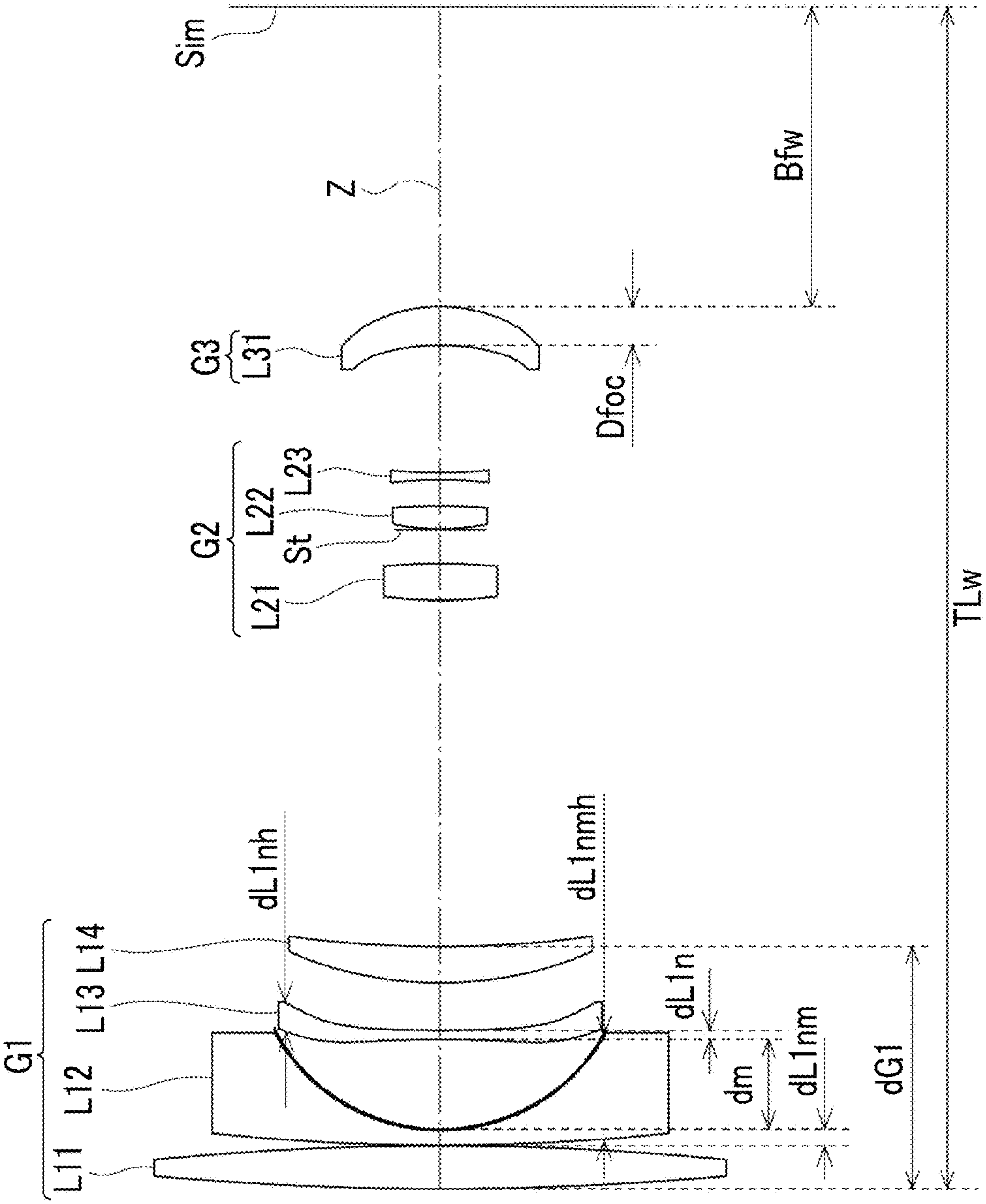
FIG. 2 is a cross-sectional view of the configuration of the variable magnification optical system in FIG. 1 and is a diagram for describing symbols of conditional expressions.

FIG. 1 illustrates a cross-sectional view and a moving path of a configuration and a luminous flux of a variable magnification optical system according to one embodiment of the present disclosure. In FIG. 1, a wide angle end state is illustrated in an upper part denoted by "Wide", and a telephoto end state is illustrated in a lower part denoted by "Tele". As the luminous flux, FIG. 1 illustrates an on-axis luminous flux and a luminous flux of a maximum half angle of view ωw at a wide angle end and an on-axis luminous flux and a luminous flux of a maximum half angle of view ωt at a telephoto end. FIG. 2 illustrates a cross-sectional view of the configuration at the wide angle end of the variable magnification optical system in FIG. 1. FIGS. 1 and 2 illustrate a state where an infinite distance object is focused. A left side is an object side, and a right side is an image side. The examples illustrated in FIGS. 1 and 2 correspond to a variable magnification optical system of Example 1 described later. The following description will be mainly provided with reference to FIG. 1, and FIG. 2 will be referred to, as necessary.

The variable magnification optical system according to the present disclosure consists of, in order from the object side to the image side along an optical axis Z, a first lens group G1 having a negative refractive power, a second lens group G2 having a positive refractive power, and a subsequent group GR including one or more lens groups. During changing magnification, the first lens group G1 moves, and spacings between all adjacent lens groups change. By the above configuration, an advantage of suppressing various aberrations in an entire magnification range is achieved.

Particularly, by setting the first lens group G1 as a group having a negative refractive power, an advantage of obtaining a wide angle of view is achieved. By setting the first lens group G1 as a group having a negative refractive power and setting the second lens group G2 as a group having a positive refractive power, an advantage of suppressing various aberrations is achieved. By setting the second lens group G2 as a group having a positive refractive power, a height of a ray incident on the subsequent group GR from the optical axis Z can be reduced. Thus, an advantage of suppressing fluctuations of aberrations during changing the magnification is achieved.

In the present specification, a group of which a spacing with respect to its adjacent group in an optical axis direction changes during changing the magnification is set as one lens group. During changing the magnification, a spacing between adjacent lenses does not change in one lens group. That is, the term "lens group" means a part that constitutes the variable magnification optical system and that includes at least one lens divided by an air spacing which changes during changing the magnification. During changing the magnification, each lens group is moved or fixed in lens group units. The term "lens group" may include a constituent, for example, an aperture stop St, other than a lens that does not have a refractive power.

For example, each group of the variable magnification optical system illustrated in FIG. 1 is configured as follows. The first lens group G1 consists of four lenses including lenses L11 to L14 in order from the object side to the image side. The second lens group G2 consists of a lens L21, the aperture stop St, and lenses L22 and L23 in order from the object side to the image side. The subsequent group GR consists of one lens group. The subsequent group GR consists of a third lens group G3, and the third lens group G3 consists of one lens that is a lens L31. The aperture stop St illustrated in FIG. 1 does not indicate a size or a shape and indicates a position on the optical axis.

In the example in FIG. 1, during changing the magnification, the first lens group G1, the second lens group G2, and the third lens group G3 move along the optical axis Z by changing their spacings with respect to their adjacent lens groups. In FIG. 1, a schematic moving path of each lens group during changing the magnification from the wide angle end to the telephoto end is illustrated by a solid line arrow between the upper part and the lower part of FIG. 1.

The example illustrated in FIG. 1 is merely an example, and various modifications can be made to the variable magnification optical system according to the present disclosure without departing from the gist of the disclosed technology. Hereinafter, preferable configurations and available configurations of the variable magnification optical system according to the present disclosure will be described.

The first lens group G1 may be configured to include a positive lens having a convex surface toward the object side, closest to the object side. In this case, an advantage of correcting a spherical aberration at the telephoto end is achieved.

The first lens group G1 may be configured to consist of four or less lenses. In this case, an increase in a size of the first lens group G1 can be suppressed while various aberrations are suppressed.

The first lens group G1 preferably includes an L1nm lens that is a non-cemented negative meniscus lens having a convex surface toward the object side, an L1n lens that is a non-cemented negative lens having a concave surface toward the image side, and an L1p lens that is a positive lens. The L1n lens is preferably disposed adjacent to the image side of the L1nm lens, and the L1p lens is preferably disposed closer to the image side than the L1n lens. The L1p lens may be disposed adjacent to the image side of the L1n lens, or may not be disposed adjacent to the image side of the L1n lens as long as the L1p lens is positioned closer to the image side than the L1n lens. In a case where the first lens group G1 has the preferable configuration including the L1nm lens, the L1n lens, and the L1p lens, an advantage of correcting a distortion and a field curvature particularly at the wide angle end is achieved. In the example in FIG. 1, the lens L12 corresponds to the L1nm lens, the lens L13 corresponds to the L1n lens, and the lens L14 corresponds to the L1p lens.

A surface of the L1n lens on the object side may be configured to be an aspherical surface in which the refractive power at a position of a maximum effective diameter is shifted in a positive direction compared to the refractive power in a paraxial region. In this case, an advantage of correcting the distortion is achieved.

Figure 3:
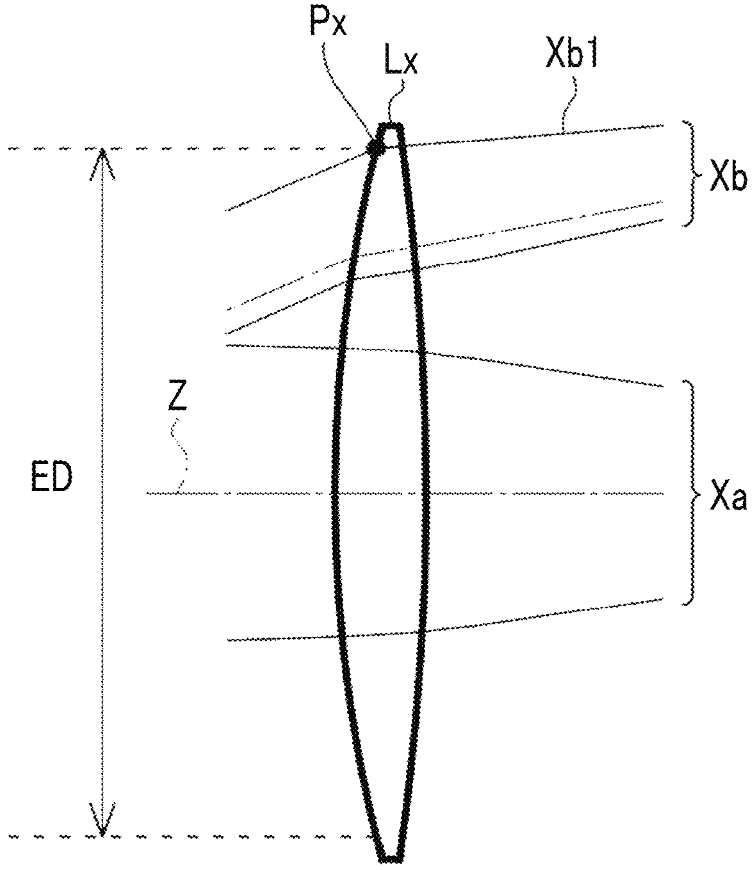
FIG. 3 is a diagram for describing a position of a maximum effective diameter.

The term "position of the maximum effective diameter" in the present specification will be described with reference to FIG. 3. FIG. 3 is a diagram for description. In FIG. 3, a left side is the object side, and a right side is the image side. FIG. 3 illustrates an on-axis luminous flux Xa and an off-axis luminous flux Xb passing through a lens Lx. In the example in FIG. 3, a ray Xb1 that is an upper ray of the off-axis luminous flux Xb is a ray passing through the outermost side. Here, the term "outer side" means an outer side in a diameter direction centered on the optical axis Z, that is, a side of separating from the optical axis Z. In the present specification, a position of an intersection between the ray passing through the outermost side and a lens surface is a position Px of the maximum effective diameter. In addition, twice a distance from the position Px of the maximum effective diameter to the optical axis Z is an effective diameter ED of a surface of the lens Lx on the object side. While the upper ray of the off-axis luminous flux Xb is the ray passing through the outermost side in the example in FIG. 3, which ray is the ray passing through the outermost side varies depending on the optical system.

The expression "refractive power at the position of the maximum effective diameter is shifted in the positive direction compared to the refractive power in the paraxial region" in the present specification has the following meanings based on a sign of the refractive power. In a case where the surface has a positive refractive power in both of the paraxial region and the position of the maximum effective diameter, this means that the positive refractive power is strong at the position of the maximum effective diameter compared to that in the paraxial region. In a case where the surface has a negative refractive power in both of the paraxial region and the position of the maximum effective diameter, this means that the negative refractive power is weak at the position of the maximum effective diameter compared to that in the paraxial region. In a case where the surface has refractive powers of different signs between the paraxial region and the position of the maximum effective diameter, this means that the refractive power is negative in the paraxial region, and the refractive power is positive at the position of the maximum effective diameter.

The surface of the Ln lens on the object side may be configured to have a concave shape in the paraxial region and have a convex shape in an edge part including the position of the maximum effective diameter. In this case, an advantage of correcting the field curvature is achieved.

The L1nm lens or the L1n lens may be configured as a compound aspherical lens. In this case, an advantage of suppressing various aberrations is achieved. A compound aspherical lens has an advantage of being available at a lower cost than a molded aspherical lens consisting of only glass, and having higher environmental durability than an aspherical lens consisting of only a resin.

In the present specification, a compound aspherical lens means a lens that has a configuration in which the lens (for example, a spherical lens) is integrated with a film of an aspherical shape formed on the lens and that functions as one aspherical lens as a whole. In the compound aspherical lens, the lens (for example, a spherical lens) on which the film is formed is generally made of glass, and the film is generally made of resin. In the present specification, the compound aspherical lens is not considered to be a cemented lens and is regarded as one non-cemented lens, that is, a single lens.

In a case where the first lens group G1 includes the L1n lens, an L2 nm lens that is a negative meniscus lens having a convex surface toward the object side may be configured to be disposed closer to the image side than the L1n lens, as illustrated in Examples 6 and 7 described later. In this case, an advantage of correcting the field curvature is achieved. The surface of the L2 nm lens on the object side may be configured to be an aspherical surface in which the refractive power at the position of the maximum effective diameter is shifted in a negative direction compared to the refractive power in the paraxial region. In this case, an advantage of further correcting the field curvature is achieved. The L2 nm lens is preferably disposed in the first lens group G1. The L2 nm lens may be disposed adjacent to the image side of the Lin lens.

The expression "refractive power at the position of the maximum effective diameter is shifted in the negative direction compared to the refractive power in the paraxial region" in the present specification has the following meanings based on a sign of the refractive power. In a case where the surface has a negative refractive power in both of the paraxial region and the position of the maximum effective diameter, this means that the negative refractive power is strong at the position of the maximum effective diameter compared to that in the paraxial region. In a case where the surface has a positive refractive power in both of the paraxial region and the position of the maximum effective diameter, this means that the positive refractive power is weak at the position of the maximum effective diameter compared to that in the paraxial region. In a case where the surface has refractive powers of different signs between the paraxial region and the position of the maximum effective diameter, this means that the refractive power is positive in the paraxial region, and the refractive power is negative at the position of the maximum effective diameter.

The variable magnification optical system according to the present disclosure preferably has a focusing function. For example, one lens group included in the subsequent group GR may be configured as a focusing lens group that moves along the optical axis Z during focusing. The focusing is performed by moving the focusing lens group. In the example in FIG. 1, the focusing lens group consists of the third lens group G3. Parentheses and an arrow in a left-right direction provided to the third lens group G3 in the lower part of FIG. 1 indicate that the third lens group G3 is the focusing lens group and indicate a direction in which the third lens group G3 moves during the focusing from an infinite distance object to a nearest object. While the focusing lens group functions in the entire magnification range including the wide angle end state, the arrow is provided in only the lower part of FIG. 1 in order to avoid complication of FIG. 1.

The focusing lens group may be configured to consist of one lens or one cemented lens. In this case, size reduction and weight reduction of the focusing lens group are facilitated. Thus, an advantage of high-speed focusing is achieved.

The variable magnification optical system according to the present disclosure preferably has a function of image shake correction. For example, a vibration-proof group that moves in a direction intersecting with the optical axis Z during the image shake correction may be configured to be disposed closer to the image side than the first lens group G1. The image shake correction is performed by moving the vibration-proof group. In the example in FIG. 1, the vibration-proof group consists of the lens L21. Parentheses and an arrow in a downward direction provided to the lens L21 in the lower part of FIG. 1 indicate that the lens L21 is the vibration-proof group. While the vibration-proof group functions in the entire magnification range including the wide angle end state, the arrow is provided in only the lower part of FIG. 1 in order to avoid complication of FIG. 1.

The vibration-proof group may be configured to consist of all lenses included in the second lens group G2. By using the second lens group G2 having a relatively low ray height as the vibration-proof group, an advantage of size reduction and weight reduction of the vibration-proof group is achieved. In a case where the second lens group G2 includes both of a positive lens and a negative lens, an advantage of suppressing fluctuations of a chromatic aberration during the image shake correction is achieved. The vibration-proof group may be configured to consist of one lens closest to the object side in the second lens group G2. By causing the vibration-proof group to consist of one lens, an advantage of size reduction and weight reduction of the vibration-proof group is achieved. By disposing the vibration-proof group closest to the object side in the second lens group G2, it is facilitated to secure a space for installing a vibration-proof mechanism.

The number of lenses included in the variable magnification optical system according to the present disclosure may be configured to be greater than or equal to 8 and less than or equal to 12. In this case, an advantage of size reduction and weight reduction of the entire optical system is achieved.

Next, preferable configurations and available configurations related to conditional expressions of the variable magnification optical system according to the present disclosure will be described. In the following description related to the conditional expressions, duplicate descriptions of symbols will be omitted by using the same symbol for the same definition in order to avoid redundant description. In addition, hereinafter, the term "variable magnification optical system according to the present disclosure" will be simply referred to as the "variable magnification optical system" in order to avoid redundant description.

The variable magnification optical system preferably satisfies Conditional Expression (1) below. A sum of a back focus of the entire system as an air conversion distance and a distance on the optical axis from a lens surface of the first lens group G1 closest to the object side to a lens surface of the subsequent group GR closest to the image side in a state where the infinite distance object is focused on at the wide angle end is denoted by TLw. A focal length of the entire system in a state where the infinite distance object is focused on at the telephoto end is denoted by ft. A maximum half angle of view in the state where the infinite distance object is focused on at the telephoto end is denoted by ωt. Here, tan is a tangent. TLw denotes a total optical length in the state where the infinite distance object is focused on at the wide angle end. For example, FIG. 2 illustrates the total optical length TLw. By not causing a corresponding value of Conditional Expression (1) to be less than or equal to its lower limit value, an advantage of suppressing various aberrations in the entire magnification range is achieved. By not causing the corresponding value of Conditional Expression (1) to be greater than or equal to its upper limit value, an advantage of size reduction of the entire optical system is achieved.

$$4.5 < TLw/(ft \times \tan\omega t) < 8 \quad (1)$$

In order to obtain more favorable characteristics, the lower limit value of Conditional Expression (1) is more preferably 5, further preferably 5.3, further preferably 5.4, further preferably 5.6, and further preferably 5.7. In order to obtain more favorable characteristics, the upper limit value of Conditional Expression (1) is more preferably 7.5, further preferably 7.2, further preferably 7, further preferably 6.9, and further preferably 6.8. For example, the variable magnification optical system more preferably satisfies Conditional Expression (1-1) below.

$$5.4 < TLw/(ft \times \tan\omega t) < 7 \quad (1\text{-}1)$$

The variable magnification optical system preferably satisfies Conditional Expression (2) below. Here, the back focus of the entire system as the air conversion distance in the state where the infinite distance object is focused on at the wide angle end is denoted by Bfw. The back focus as the air conversion distance is an air conversion distance on the optical axis from a lens surface of the variable magnification optical system closest to the image side to an image plane Sim. For example, FIG. 2 illustrates the back focus Bfw. By not causing a corresponding value of Conditional Expression (2) to be less than or equal to its lower limit value, the back focus Bfw is not excessively decreased. Thus, it is facilitated to attach a mount replacement mechanism. By not causing the corresponding value of Conditional Expression (2) to be greater than or equal to its upper limit value, the back focus Bfw is not excessively increased. Thus, size reduction is facilitated.

$$0.4 < Bfw/(ft \times \tan\omega t) < 3 \quad (2)$$

In order to obtain more favorable characteristics, the lower limit value of Conditional Expression (2) is more preferably 0.45, further preferably 0.5, further preferably 0.55, and further preferably 0.6. In order to obtain more favorable characteristics, the upper limit value of Conditional Expression (2) is more preferably 2.5, further preferably 2.2, further preferably 2, and further preferably 1.8. For example, the variable magnification optical system more preferably satisfies Conditional Expression (2-1) below.

$$0.55 < Bfw/(ft \times \tan\omega t) < 2 \quad (2\text{-}1)$$

The variable magnification optical system preferably satisfies Conditional Expression (3) below. Here, a focal length of the entire system in the state where the infinite distance object is focused on at the wide angle end is denoted by fw. By not causing a corresponding value of Conditional Expression (3) to be less than or equal to its lower limit value, an advantage of suppressing various aberrations in the entire magnification range is achieved. By not causing the corresponding value of Conditional Expression (3) to be greater than or equal to its upper limit value, an advantage of size reduction of the entire optical system is achieved, or an advantage of obtaining a sufficient magnification ratio as the variable magnification optical system is achieved.

$$0.9 < (fw \times TLw)/ft^2 < 3.2 \quad (3)$$

In order to obtain more favorable characteristics, the lower limit value of Conditional Expression (3) is more preferably 1, further preferably 1.1, further preferably 1.2, and further preferably 1.25. In order to obtain more favorable characteristics, the upper limit value of Conditional Expression (3) is more preferably 3, further preferably 2.8, further preferably 2.6, and further preferably 2.45.

The variable magnification optical system preferably satisfies Conditional Expression (4) below. Here, a refractive index with respect to a d line and an Abbe number based on the d line for any lens included in the first lens group G1 are denoted by NG1L and νG1L, respectively. NG1L and νG1L in Conditional Expression (4) are values related to the same lens. By not causing a corresponding value of Conditional Expression (4) to be less than or equal to its lower limit value, a material other than a material having a low refractive index and a small Abbe number can be selected. Thus, it is facilitated to correct the lateral chromatic aberration at the wide angle end. By not causing the corresponding value of Conditional Expression (4) to be greater than or equal to its upper limit value, a material other than a material having a high refractive index and a large Abbe number can be selected. Thus, a material of which a specific gravity is not large can be selected, and weight reduction is facilitated.

$$1.6 < NG1L + 0.01 \times \nu G1L < 2.3 \quad (4)$$

In order to obtain more favorable characteristics, the lower limit value of Conditional Expression (4) is more preferably 1.65, further preferably 1.7, further preferably 1.72, further preferably 1.74, further preferably 1.76, further preferably 1.78, further preferably 1.8, and further preferably 1.82. In order to obtain more favorable characteristics, the upper limit value of Conditional Expression (4) is more preferably 2.2, further preferably 2.16, further preferably 2.15, further preferably 2.14, further preferably 2.13, further preferably 2.12, further preferably 2.11, and further preferably 1.91. For example, the variable magnification optical system more preferably satisfies Conditional Expression (4-1) below.

$$1.82 < NG1L + 0.01 \times \nu G1L < 1.91 \quad (4\text{-}1)$$

The variable magnification optical system preferably satisfies Conditional Expression (5) below. Here, a sum total of thicknesses of all lens groups on the optical axis is denoted by Dsum. In other words, Dsum is obtained by adding the thickness of each lens group on the optical axis for all lens groups of the entire system. The term "thickness of the lens group on the optical axis" in the present specification refers to a distance on the optical axis from a surface of the lens group closest to the object side to a surface of the lens group closest to the image side. By not causing a corresponding value of Conditional Expression (5) to be less than or equal to its lower limit value, a thickness of each lens in the variable magnification optical system is not excessively decreased. Thus, an advantage of securing favorable optical performance is achieved. By not causing the corresponding value of Conditional Expression (5) to be greater than or equal to its upper limit value, an advantage of suppressing an increase in a weight of the entire variable magnification optical system is achieved.

$$0.1 < Dsum/(TLw - Bfw) < 0.8 \quad (5)$$

In order to obtain more favorable characteristics, the lower limit value of Conditional Expression (5) is more preferably 0.2, further preferably 0.25, further preferably 0.28, further preferably 0.3, and further preferably 0.32. In order to obtain more favorable characteristics, the upper limit value of Conditional Expression (5) is more preferably 0.75, further preferably 0.7, further preferably 0.65, further preferably 0.6, and further preferably 0.55.

The variable magnification optical system preferably satisfies Conditional Expression (6) below. Here, a thickness of the first lens group G1 on the optical axis is denoted by dG1. A focal length of the first lens group G1 is denoted by f1. For example, FIG. 2 illustrates the thickness dG1. By not causing a corresponding value of Conditional Expression (6) to be less than or equal to its lower limit value, an advantage of suppressing various aberrations in the entire magnification range is achieved. By not causing the corresponding value of Conditional Expression (6) to be greater than or equal to its upper limit value, an advantage of weight reduction of the first lens group G1 is achieved.

$$0.4 < dG1/|f1| < 2 \quad (6)$$

In order to obtain more favorable characteristics, the lower limit value of Conditional Expression (6) is more preferably 0.5, further preferably 0.55, further preferably 0.65, further preferably 0.7, further preferably 0.75, and further preferably 0.8. In order to obtain more favorable characteristics, the upper limit value of Conditional Expression (6) is more preferably 1.8, further preferably 1.65, further preferably 1.55, further preferably 1.45, further preferably 1.35, and further preferably 1.31. For example, the variable magnification optical system more preferably satisfies Conditional Expression (6-1) below and further preferably satisfies Conditional Expression (6-2) below.

$$0.55 < dG1/|f1| < 1.65 \quad (6\text{-}1)$$

$$0.75 < dG1/|f1| < 1.35 \quad (6\text{-}2)$$

In a configuration in which the first lens group G1 includes the L1nm lens, the L1n lens, and the L1p lens, the L1n lens is disposed adjacent to the image side of the L1nm lens, and the L1p lens is disposed closer to the image side than the L1n lens, the variable magnification optical system preferably includes a negative lens satisfying Conditional Expression (7) below. In this case, the negative lens satisfying Conditional Expression (7) is preferably the L1n lens or a negative lens disposed adjacent to the image side of the L1n lens. Here, a refractive index with respect to the d line and an Abbe number based on the d line for the negative lens disposed between the L1nm lens and the L1p lens are denoted by NG1n and νG1n, respectively. By not causing a corresponding value of Conditional Expression (7) to be less than or equal to its lower limit value, a material other than a material having a low refractive index and a small Abbe number can be selected. Thus, it is facilitated to correct the lateral chromatic aberration at the wide angle end. By not causing the corresponding value of Conditional Expression (7) to be greater than or equal to its upper limit value, a material other than a material having a high refractive index and a large Abbe number can be selected. Thus, a material of which a specific gravity is not large can be selected, and weight reduction is facilitated.

$$1.7 < NG1n + 0.01 \times \nu G1n < 2.16 \quad (7)$$

In order to obtain more favorable characteristics, the lower limit value of Conditional Expression (7) is more preferably 1.72, further preferably 1.74, further preferably 1.76, further preferably 1.78, and further preferably 1.8. In order to obtain more favorable characteristics, the upper limit value of Conditional Expression (7) is more preferably 2.15, further preferably 2.14, further preferably 2.13, further preferably 2.12, and further preferably 2.11. For example, the negative lens satisfying Conditional Expression (7) more preferably satisfies Conditional Expression (7-1) below.

$$1.74 < NG1n + 0.01 \times \nu G1n < 2.14 \quad (7\text{-}1)$$

In a configuration in which the first lens group G1 includes the L1nm lens, the L1n lens, and the L1p lens, the L1n lens is disposed adjacent to the image side of the L1nm lens, and the L1p lens is disposed closer to the image side than the L1n lens, the variable magnification optical system preferably satisfies Conditional Expression (8) below. Here, a distance on the optical axis between the L1nm lens and the L1n lens is denoted by dm. For example, FIG. 2 illustrates the distance dm. By not causing a corresponding value of Conditional Expression (8) to be less than or equal to its lower limit value, intensity of stray light that is reflected by the surface of the L1n lens on the object side and then is reflected by a surface of the L1nm lens on the image side to be concentrated on the image plane Sim can be suppressed. By not causing the corresponding value of Conditional Expression (8) to be greater than or equal to its upper limit value, an increase in a diameter of the L1nm lens can be suppressed.

$$0.01 < dm/dG1 < 0.9 \tag{8}$$

In order to obtain more favorable characteristics, the lower limit value of Conditional Expression (8) is more preferably 0.1, further preferably 0.15, further preferably 0.17, further preferably 0.19, and further preferably 0.2. In order to obtain more favorable characteristics, the upper limit value of Conditional Expression (8) is more preferably 0.8, further preferably 0.7, further preferably 0.65, further preferably 0.6, and further preferably 0.57.

The variable magnification optical system preferably satisfies Conditional Expression (9) below. Here, a focal length of the second lens group G2 is denoted by f2. By not causing a corresponding value of Conditional Expression (9) to be less than or equal to its lower limit value, a refractive power of the first lens group G1 is not excessively decreased, and a refractive power of the second lens group G2 is not excessively increased. Thus, an advantage of correcting the spherical aberration on a telephoto side is achieved. By not causing the corresponding value of Conditional Expression (9) to be greater than or equal to its upper limit value, the refractive power of the first lens group G1 is not excessively increased, and the refractive power of the second lens group G2 is not excessively decreased. Thus, an advantage of correcting the spherical aberration on a wide angle side is achieved. In addition, by not causing the corresponding value of Conditional Expression (9) to be greater than or equal to its upper limit value, it is facilitated to obtain a high magnification ratio without increasing a moving amount of the second lens group G2 having a magnification function. Thus, an advantage of size reduction of the total optical length is achieved.

$$0.3 < f2/|f1| < 5 \tag{9}$$

In order to obtain more favorable characteristics, the lower limit value of Conditional Expression (9) is more preferably 0.65, further preferably 0.7, further preferably 0.75, and further preferably 0.8. In order to obtain more favorable characteristics, the upper limit value of Conditional Expression (9) is more preferably 3, further preferably 2.8, further preferably 2.6, and further preferably 2.5. For example, the variable magnification optical system more preferably satisfies Conditional Expression (9-1) below.

$$0.65 < f2/|f1| < 3 \tag{9-1}$$

The variable magnification optical system preferably satisfies Conditional Expression (10) below. By not causing a corresponding value of Conditional Expression (10) to be less than or equal to its lower limit value, the refractive power of the first lens group G1 is not excessively decreased. Thus, a moving amount of the first lens group G1 during changing the magnification can be suppressed. By not causing the corresponding value of Conditional Expression (10) to be greater than or equal to its upper limit value, the refractive power of the first lens group G1 is not excessively increased. Thus, an advantage of suppressing fluctuations of aberrations during changing the magnification is achieved.

$$0.45 < fw/|f1| < 2 \tag{10}$$

In order to obtain more favorable characteristics, the lower limit value of Conditional Expression (10) is more preferably 0.52, further preferably 0.58, further preferably 0.62, and further preferably 0.65. In order to obtain more favorable characteristics, the upper limit value of Conditional Expression (10) is more preferably 1.7, further preferably 1.5, further preferably 1.4, and further preferably 1.3.

In a configuration in which the first lens group G1 includes the L1nm lens, the variable magnification optical system preferably satisfies Conditional Expression (11) below. Here, a paraxial curvature radius of a surface of the L1nm lens on the object side is denoted by Rf. A paraxial curvature radius of the surface of the L1nm lens on the image side is denoted by Rr. Conditional Expression (11) defines a so-called shape factor of the L1nm lens. By not causing a corresponding value of Conditional Expression (11) to be less than or equal to its lower limit value, it is particularly facilitated to correct an astigmatism on the telephoto side. By not causing the corresponding value of Conditional Expression (11) to be greater than or equal to its upper limit value, it is facilitated to favorably correct the spherical aberration on the telephoto side.

$$1 < (Rf + Rr)/(Rf - Rr) < 7 \tag{11}$$

In order to obtain more favorable characteristics, the lower limit value of Conditional Expression (11) is more preferably 1.1, further preferably 1.15, further preferably 1.2, and further preferably 1.25. In order to obtain more favorable characteristics, the upper limit value of Conditional Expression (11) is more preferably 6, further preferably 5, further preferably 4.5, and further preferably 4.

In a configuration in which the vibration-proof group that moves in the direction intersecting with the optical axis Z during the image shake correction is disposed closer to the image side than the first lens group G1, the variable magnification optical system preferably satisfies Conditional Expression (12) below. Here, a focal length of the vibration-proof group is denoted by fois. By not causing a corresponding value of Conditional Expression (12) to be less than or equal to its lower limit value, a moving amount of the vibration-proof group during the image shake correction can be suppressed. Thus, an advantage of size reduction of the entire variable magnification optical system and size reduction of a vibration-proof unit is achieved. By not causing the corresponding value of Conditional Expression (12) to be greater than or equal to its upper limit value, a refractive power of the vibration-proof group is not excessively increased. Thus, an advantage of suppressing fluctuations of aberrations during the image shake correction is achieved.

$$0.3 < ft/|fois| < 4 \quad (12)$$

In order to obtain more favorable characteristics, the lower limit value of Conditional Expression (12) is more preferably 0.5, further preferably 0.6, further preferably 0.65, and further preferably 0.7. In order to obtain more favorable characteristics, the upper limit value of Conditional Expression (12) is more preferably 3.5, further preferably 3, further preferably 2.5, and further preferably 2.

In a configuration in which the variable magnification optical system includes the focusing lens group, the variable magnification optical system preferably satisfies Conditional Expression (13) below. Here, a focal length of the focusing lens group is denoted by ffoc. By not causing a corresponding value of Conditional Expression (13) to be less than or equal to its lower limit value, a refractive power of the focusing lens group is not excessively decreased. Thus, a moving amount of the focusing lens group during the focusing can be suppressed. By not causing the corresponding value of Conditional Expression (13) to be greater than or equal to its upper limit value, the refractive power of the focusing lens group is not excessively increased. Thus, an advantage of suppressing fluctuations of aberrations during the focusing is achieved.

$$0.3 < ft/|ffoc| < 3 \quad (13)$$

In order to obtain more favorable characteristics, the lower limit value of Conditional Expression (13) is more preferably 0.4, further preferably 0.5, further preferably 0.55, and further preferably 0.6. In order to obtain more favorable characteristics, the upper limit value of Conditional Expression (13) is more preferably 2.5, further preferably 2.2, further preferably 1.9, and further preferably 1.8.

In a configuration in which the variable magnification optical system includes the focusing lens group and an Lr lens disposed closer to the image side than the focusing lens group, the variable magnification optical system preferably satisfies Conditional Expression (14) below. Here, a refractive index with respect to the d line and an Abbe number based on the d line for the Lr lens are denoted by Nr and νr, respectively. By not causing a corresponding value of Conditional Expression (14) to be less than or equal to its lower limit value, a material other than a material having a low refractive index and a small Abbe number can be selected. Thus, it is facilitated to correct the lateral chromatic aberration at the wide angle end. By not causing the corresponding value of Conditional Expression (14) to be greater than or equal to its upper limit value, a material other than a material having a high refractive index and a large Abbe number can be selected. Thus, a material of which a specific gravity is not large can be selected, and weight reduction is facilitated.

$$1.7 < Nr + 0.01 \times \nu r < 2.16 \quad (14)$$

In order to obtain more favorable characteristics, the lower limit value of Conditional Expression (14) is more preferably 1.72, further preferably 1.74, further preferably 1.76, further preferably 1.78, and further preferably 1.8. In order to obtain more favorable characteristics, the upper limit value of Conditional Expression (14) is more preferably 2.15, further preferably 2.14, further preferably 2.13, further preferably 2.12, and further preferably 2.11.

The variable magnification optical system preferably satisfies Conditional Expression (15) below. By not causing a corresponding value of Conditional Expression (15) to be less than or equal to its lower limit value, the refractive power of the first lens group G1 is not excessively decreased. Thus, the moving amount of the first lens group G1 during changing the magnification can be suppressed. By not causing the corresponding value of Conditional Expression (15) to be greater than or equal to its upper limit value, the refractive power of the first lens group G1 is not excessively increased. Thus, an advantage of suppressing fluctuations of aberrations during changing the magnification is achieved.

$$1 < ft/|f1| < 3.5 \quad (15)$$

In order to obtain more favorable characteristics, the lower limit value of Conditional Expression (15) is more preferably 1.1, further preferably 1.2, and further preferably 1.3. In order to obtain more favorable characteristics, the upper limit value of Conditional Expression (15) is more preferably 3, further preferably 2.8, and further preferably 2.5.

The variable magnification optical system preferably satisfies Conditional Expression (16) below. By not causing a corresponding value of Conditional Expression (16) to be less than or equal to its lower limit value, the refractive power of the first lens group G1 is not excessively increased. Thus, an advantage of suppressing fluctuations of aberrations during changing the magnification is achieved. By not causing the corresponding value of Conditional Expression (16) to be greater than or equal to its upper limit value, the refractive power of the first lens group G1 is not excessively decreased. Thus, the moving amount of the first lens group G1 during changing the magnification can be suppressed, and an advantage of suppressing the distortion at the wide angle end is achieved.

$$0.4 < |f1|/(fw \times ft)^{1/2} < 2.2 \quad (16)$$

In order to obtain more favorable characteristics, the lower limit value of Conditional Expression (16) is more preferably 0.5, further preferably 0.55, and further preferably 0.6. In order to obtain more favorable characteristics, the upper limit value of Conditional Expression (16) is more preferably 1.8, further preferably 1.5, and further preferably 1.4.

The variable magnification optical system preferably satisfies Conditional Expression (17) below. By not causing a corresponding value of Conditional Expression (17) to be less than or equal to its lower limit value, the refractive power of the second lens group G2 is not excessively increased. Thus, the field curvature occurring in the second lens group G2 can be reduced, and an advantage of correcting aberrations during changing the magnification is achieved. By not causing the corresponding value of Conditional Expression (17) to be greater than or equal to its upper limit value, the refractive power of the second lens group G2 is not excessively decreased. Thus, the moving amount of the second lens group G2 during changing the magnification can be suppressed. Accordingly, an advantage of reducing the total optical length is achieved.

$$0.4 < f2/(fw \times ft)^{1/2} < 3.5 \quad (17)$$

In order to obtain more favorable characteristics, the lower limit value of Conditional Expression (17) is more preferably 0.6, further preferably 0.7, and further preferably 0.8. In order to obtain more favorable characteristics, the upper limit value of Conditional Expression (17) is more preferably 2.7, further preferably 2.2, and further preferably 1.8.

The variable magnification optical system preferably satisfies Conditional Expression (18) below. By not causing a corresponding value of Conditional Expression (18) to be less than or equal to its lower limit value, an advantage of securing strength of the first lens group G1 is achieved. By not causing the corresponding value of Conditional Expression (18) to be greater than or equal to its upper limit value, an advantage of weight reduction of the first lens group G1 is achieved.

$$0.15 < dG1/(TLw - Bfw) < 0.5 \quad (18)$$

In order to obtain more favorable characteristics, the lower limit value of Conditional Expression (18) is more preferably 0.17, further preferably 0.18, and further preferably 0.19. In order to obtain more favorable characteristics, the upper limit value of Conditional Expression (18) is more preferably 0.4, further preferably 0.35, and further preferably 0.32.

The variable magnification optical system preferably satisfies Conditional Expression (19) below. Here, an open F-number in the state where the infinite distance object is focused on at the telephoto end is denoted by FNot. By not causing a corresponding value of Conditional Expression (19) to be less than or equal to its lower limit value, an advantage of high performance is achieved. By not causing the corresponding value of Conditional Expression (19) to be greater than or equal to its upper limit value, the refractive power of the first lens group G1 is not excessively decreased. Thus, the moving amount of the first lens group G1 during changing the magnification can be suppressed, and an advantage of suppressing the distortion at the wide angle end is achieved.

$$1.5 < |f1|/(ft/FNot) < 8 \quad (19)$$

In order to obtain more favorable characteristics, the lower limit value of Conditional Expression (19) is more preferably 2, further preferably 2.3, and further preferably 2.5. In order to obtain more favorable characteristics, the upper limit value of Conditional Expression (19) is more preferably 7, further preferably 6.5, and further preferably 6.

The variable magnification optical system preferably satisfies Conditional Expression (20) below. By not causing a corresponding value of Conditional Expression (20) to be less than or equal to its lower limit value, the refractive power of the focusing lens group is not excessively decreased. Thus, the moving amount of the focusing lens group during the focusing can be suppressed. By not causing the corresponding value of Conditional Expression (20) to be greater than or equal to its upper limit value, the refractive power of the focusing lens group is not excessively increased. Thus, an advantage of suppressing fluctuations of aberrations during the focusing is achieved.

$$0.1 < fw/|ffoc| < 2 \quad (20)$$

In order to obtain more favorable characteristics, the lower limit value of Conditional Expression (20) is more preferably 0.16, further preferably 0.18, and further preferably 0.2. In order to obtain more favorable characteristics, the upper limit value of Conditional Expression (20) is more preferably 1.5, further preferably 1.2, and further preferably 1.

In a configuration in which the first lens group G1 includes the L1nm lens, the variable magnification optical system preferably satisfies Conditional Expression (21) below. Here, a refractive index with respect to the d line for the L1nm lens is denoted by N1nm. By not causing a corresponding value of Conditional Expression (21) to be less than or equal to its lower limit value, it is facilitated to provide the L1nm lens with a sufficient negative refractive power. Thus, an advantage of favorably correcting the distortion is achieved. By not causing the corresponding value of Conditional Expression (21) to be greater than or equal to its upper limit value, it is facilitated to configure the L1nm lens without using a material having high dispersion. Thus, an advantage of favorably correcting the lateral chromatic aberration is achieved.

$$1.42 < N1nm < 1.8 \quad (21)$$

In order to obtain more favorable characteristics, the lower limit value of Conditional Expression (21) is more preferably 1.43, further preferably 1.44, further preferably 1.45, further preferably 1.46, further preferably 1.47, and further preferably 1.48. In order to obtain more favorable characteristics, the upper limit value of Conditional Expression (21) is more preferably 1.75, further preferably 1.7, further preferably 1.65, further preferably 1.6, further preferably 1.55, and further preferably 1.52.

In a configuration in which the first lens group G1 includes the L1nm lens, the L1n lens, and the L1p lens, the L1n lens is disposed adjacent to the image side of the L1nm lens, and the L1p lens is disposed closer to the image side than the L1n lens, the variable magnification optical system preferably includes a negative lens satisfying Conditional Expression (22) below. In this case, the negative lens satisfying Conditional Expression (22) is preferably the L1n lens or a negative lens disposed adjacent to the image side of the L1n lens. Here, a refractive index with respect to the d line for the negative lens disposed between the L1nm lens and the L1p lens is denoted by NG1n. By not causing a corresponding value of Conditional Expression (22) to be less than or equal to its lower limit value, it is facilitated to provide the L1n lens or the negative lens disposed adjacent to the image side of the L1n lens with a sufficient negative refractive power. Thus, an advantage of favorably correcting the distortion is achieved. By not causing the corresponding value of Conditional Expression (22) to be greater than or equal to its upper limit value, it is facilitated to configure the L1n lens or the negative lens disposed adjacent to the image side of the L1n lens without using a material having high dispersion. Thus, an advantage of favorably correcting the lateral chromatic aberration is achieved.

$$1.44 < NG1n < 1.8 \quad (22)$$

In order to obtain more favorable characteristics, the lower limit value of Conditional Expression (22) is more preferably 1.48, further preferably 1.51, and further preferably 1.53. In order to obtain more favorable characteristics, the upper limit value of Conditional Expression (22) is more preferably 1.7, further preferably 1.65, and further preferably 1.6.

In a configuration in which the variable magnification optical system includes the focusing lens group, the variable magnification optical system preferably satisfies Conditional Expression (23) below. Here, a thickness of the focusing lens group on the optical axis is denoted by Dfoc. The term "thickness of the focusing lens group on the optical axis" is a distance on the optical axis from a surface of the focusing lens group closest to the object side to a surface of the focusing lens group closest to the image side. For example, FIG. 2 illustrates the thickness Dfoc. By not causing a corresponding value of Conditional Expression (23) to be less than or equal to its lower limit value, the thickness of the focusing lens group is not excessively decreased. Thus, an advantage of securing strength of the focusing lens group is achieved. By not causing the corresponding value of Conditional Expression (23) to be greater than or equal to its upper limit value, the thickness of the focusing lens group is not excessively increased. Thus, an advantage of high-speed focusing is achieved.

$$0.025 < Dfoc/(\mathrm{ft} \times \tan\omega t) < 0.4 \quad (23)$$

In order to obtain more favorable characteristics, the lower limit value of Conditional Expression (23) is more preferably 0.027, further preferably 0.029, and further preferably 0.03. In order to obtain more favorable characteristics, the upper limit value of Conditional Expression (23) is more preferably 0.35, further preferably 0.3, and further preferably 0.25.

In a configuration in which the variable magnification optical system includes the focusing lens group, and the focusing lens group consists of one lens, the variable magnification optical system preferably satisfies Conditional Expression (24) below. Here, an Abbe number based on the d line for the lens constituting the focusing lens group is denoted by νfoc. By not causing a corresponding value of Conditional Expression (24) to be less than or equal to its lower limit value, an advantage of suppressing fluctuations of the chromatic aberration during the focusing is achieved. By not causing the corresponding value of Conditional Expression (24) to be greater than or equal to its upper limit value, a material that is easily obtainable can be used. Thus, an advantage of implementing a variable magnification optical system in which the spherical aberration and the astigmatism are suppressed is achieved.

$$20 < \nu foc < 95 \quad (24)$$

In order to obtain more favorable characteristics, the lower limit value of Conditional Expression (24) is more preferably 25, further preferably 34, further preferably 39, further preferably 43, further preferably 47, and further preferably 50. In order to obtain more favorable characteristics, the upper limit value of Conditional Expression (24) is more preferably 83, further preferably 78, further preferably 73, further preferably 68, further preferably 63, and further preferably 58.

The variable magnification optical system preferably satisfies Conditional Expression (25) below. Here, a maximum half angle of view in the state where the infinite distance object is focused on at the wide angle end is denoted by ωw. Here, ωw is in degree units. By not causing a corresponding value of Conditional Expression (25) to be less than or equal to its lower limit value, an advantage of obtaining a wide angle is achieved. By not causing the corresponding value of Conditional Expression (25) to be greater than or equal to its upper limit value, an advantage of size reduction is achieved.

$$40 < \omega w < 70 \quad (25)$$

In order to obtain more favorable characteristics, the lower limit value of Conditional Expression (25) is more preferably 44, further preferably 46, and further preferably 48. In order to obtain more favorable characteristics, the upper limit value of Conditional Expression (25) is more preferably 65, further preferably 60, and further preferably 56.

The variable magnification optical system preferably satisfies Conditional Expression (26) below. By not causing a corresponding value of Conditional Expression (26) to be less than or equal to its lower limit value, an advantage of implementing a high magnification ratio is achieved. By not causing the corresponding value of Conditional Expression (26) to be greater than or equal to its upper limit value, an advantage of suppressing fluctuations of aberrations during changing the magnification is achieved.

$$1.5 < ft/fw < 3 \quad (26)$$

In order to obtain more favorable characteristics, the lower limit value of Conditional Expression (26) is more preferably 1.6, further preferably 1.65, and further preferably 1.7. In order to obtain more favorable characteristics, the upper limit value of Conditional Expression (26) is more preferably 2.6, further preferably 2.3, and further preferably 2.1.

In a configuration in which the first lens group G1 includes the L1n lens, the variable magnification optical system preferably satisfies Conditional Expression (27) below. Here, a specific gravity of the L1n lens is denoted by ρL1n. By not causing a corresponding value of Conditional Expression (27) to be less than or equal to its lower limit value, it is facilitated to use a material that is easily obtainable. By not causing the corresponding value of Conditional Expression (27) to be greater than or equal to its upper limit value, an advantage of weight reduction of the optical system is achieved.

$$0.75 < \rho L1n < 3.2 \quad (27)$$

In order to obtain more favorable characteristics, the lower limit value of Conditional Expression (27) is more preferably 0.8, further preferably 0.82, further preferably 0.84, further preferably 0.86, further preferably 0.88, further preferably 0.9, and further preferably 0.92. In order to obtain more favorable characteristics, the upper limit value of Conditional Expression (27) is more preferably 2.9, further preferably 2.6, further preferably 2.4, further preferably 2.2, further preferably 2, further preferably 1.8, and further preferably 1.6.

In a configuration in which the first lens group G1 includes the L1n lens, and the Lin lens is a lens consisting of only resin, the variable magnification optical system preferably satisfies Conditional Expression (28) below. Here, a center thickness of the L1n lens is denoted by dL1n. A thickness of the L1n lens in a direction parallel to the optical axis Z at the position of the maximum effective diameter of a surface of the L1n lens on the image side is denoted by dL1nh. For example, FIG. 2 illustrates the center thickness dL1n and the thickness dL1nh. By not causing a corresponding value of Conditional Expression (28) to be less than or equal to its lower limit value, an advantage of correcting the chromatic aberration is achieved. By not causing the corresponding value of Conditional Expression (28) to be greater than or equal to its upper limit value, a decrease in formability of the L1n lens can be suppressed. Thus, an advantage in manufacturing is achieved. In addition, by not causing the corresponding value of Conditional Expression (28) to be greater than or equal to its upper limit value, an increase in a volume of the L1n lens can be suppressed. Thus, an advantage of weight reduction is achieved.

$$1.1 < dL1nh/\mathrm{d}L1n < 10 \quad (28)$$

In order to obtain more favorable characteristics, the lower limit value of Conditional Expression (28) is more preferably 1.2, further preferably 1.3, further preferably 1.35, and further preferably 1.4. In order to obtain more favorable characteristics, the upper limit value of Conditional Expression (28) is more preferably 5, further preferably 4, further preferably 3.5, and further preferably 3.

In a configuration in which the L2 nm lens is disposed closer to the image side than the L1n lens, the variable magnification optical system preferably satisfies Conditional Expression (29) below. Here, a specific gravity of the L2 nm lens is denoted by ρL2 nm. By not causing a corresponding value of Conditional Expression (29) to be less than or equal to its lower limit value, it is facilitated to use a material that is easily obtainable. By not causing the corresponding value of Conditional Expression (29) to be greater than or equal to its upper limit value, an advantage of weight reduction of the optical system is achieved.

$$0.75 < \rho L2nm < 3 \quad (29)$$

In order to obtain more favorable characteristics, the lower limit value of Conditional Expression (29) is more preferably 0.8, further preferably 0.82, further preferably 0.84, further preferably 0.86, further preferably 0.88, further preferably 0.9, and further preferably 0.92. In order to obtain more favorable characteristics, the upper limit value of Conditional Expression (29) is more preferably 2.8, further preferably 2.6, further preferably 2.4, further preferably 2.2, further preferably 2, further preferably 1.8, and further preferably 1.6.

In a configuration in which the L2 nm lens is disposed closer to the image side than the L1n lens, and the L2 nm lens is a lens consisting of only resin, the variable magnification optical system preferably satisfies Conditional Expression (30) below. Here, a center thickness of the L2 nm lens is denoted by dL2 nm. A thickness of the L2 nm lens in a direction parallel to the optical axis Z at the position of the maximum effective diameter of a surface of the L2 nm lens on the image side is denoted by dL2nmh. By not causing a corresponding value of Conditional Expression (30) to be less than or equal to its lower limit value, an advantage of correcting the chromatic aberration is achieved. By not causing the corresponding value of Conditional Expression (30) to be greater than or equal to its upper limit value, a decrease in formability of the L2 nm lens can be suppressed. Thus, an advantage in manufacturing is achieved. In addition, by not causing the corresponding value of Conditional Expression (30) to be greater than or equal to its upper limit value, an increase in a volume of the L2 nm lens can be suppressed. Thus, an advantage of weight reduction is achieved.

$$1.1 < dL2nmh/dL2nm < 10 \quad (30)$$

In order to obtain more favorable characteristics, the lower limit value of Conditional Expression (30) is more preferably 1.13, further preferably 1.16, further preferably 1.18, and further preferably 1.2. In order to obtain more favorable characteristics, the upper limit value of Conditional Expression (30) is more preferably 5, further preferably 4, further preferably 3, and further preferably 2.5.

In a configuration in which the first lens group G1 includes the L1nm lens, the variable magnification optical system preferably satisfies Conditional Expression (31) below. Here, a focal length of the L1nm lens is denoted by fL1nm. By not causing a corresponding value of Conditional Expression (31) to be less than or equal to its lower limit value, the negative refractive power of the L1nm lens is not excessively decreased. Thus, a light quantity in an image edge part at the wide angle end can be secured without increasing the diameter of the L1nm lens. Accordingly, an advantage of size reduction is achieved. By not causing the corresponding value of Conditional Expression (31) to be greater than or equal to its upper limit value, the negative refractive power of the L1nm lens is not excessively increased. Thus, an advantage of correcting the field curvature and the distortion at the wide angle end is achieved.

$$0.05 < fw/|fL1nm| < 2 \quad (31)$$

In order to obtain more favorable characteristics, the lower limit value of Conditional Expression (31) is more preferably 0.1, further preferably 0.15, further preferably 0.2, and further preferably 0.27. In order to obtain more favorable characteristics, the upper limit value of Conditional Expression (31) is more preferably 1.5, further preferably 1.1, further preferably 0.7, and further preferably 0.55.

In a configuration in which the variable magnification optical system includes the focusing lens group and the Lr lens disposed closer to the image side than the focusing lens group, the variable magnification optical system preferably satisfies Conditional Expression (32) below. Here, a specific gravity of the Lr lens is denoted by ρLr. By not causing a corresponding value of Conditional Expression (32) to be less than or equal to its lower limit value, it is facilitated to use a material that is easily obtainable. By not causing the corresponding value of Conditional Expression (32) to be greater than or equal to its upper limit value, an advantage of weight reduction of the optical system is achieved.

$$0.75 < \rho Lr < 3 \tag{32}$$

In order to obtain more favorable characteristics, the lower limit value of Conditional Expression (32) is more preferably 0.8, further preferably 0.82, further preferably 0.84, further preferably 0.86, further preferably 0.88, further preferably 0.9, and further preferably 0.92. In order to obtain more favorable characteristics, the upper limit value of Conditional Expression (32) is more preferably 2.8, further preferably 2.6, further preferably 2.4, further preferably 2.2, further preferably 2, further preferably 1.8, and further preferably 1.6.

In a configuration in which the first lens group G1 includes the L1nm lens, the variable magnification optical system preferably satisfies Conditional Expression (33) below. Here, a center thickness of the L1nm lens is denoted by dL1nm. A thickness of the L1nm lens in a direction parallel to the optical axis Z at the position of the maximum effective diameter of the surface of the L1nm lens on the image side is denoted by dL1nmh. For example, FIG. 2 illustrates the center thickness dL1nm and the thickness dL1nmh. By not causing a corresponding value of Conditional Expression (33) to be less than or equal to its lower limit value, an advantage of suppressing the distortion at the wide angle end is achieved. By not causing the corresponding value of Conditional Expression (33) to be greater than or equal to its upper limit value, the center thickness of the L1nm lens is not excessively decreased. Thus, an advantage of securing strength of the L1nm lens is achieved.

$$2 < dL1nmh/dL1nm < 12 \tag{33}$$

In order to obtain more favorable characteristics, the lower limit value of Conditional Expression (33) is more preferably 3, further preferably 4, further preferably 5, and further preferably 5.5. In order to obtain more favorable characteristics, the upper limit value of Conditional Expression (33) is more preferably 10, further preferably 9, further preferably 8, and further preferably 7.5.

The above preferable configurations and available configurations can be combined with each other in any manner without inconsistency and are preferably employed appropriately selectively in accordance with required specifications.

For example, a preferable aspect of the variable magnification optical system according to the present disclosure consists of, in order from the object side to the image side, the first lens group G1 having a negative refractive power, the second lens group G2 having a positive refractive power, and the subsequent group GR including one or more lens groups, in which during changing the magnification, the first lens group G1 moves, and spacings between all adjacent lens groups change, one lens group included in the subsequent group GR is a focusing lens group that moves along the optical axis Z the during focusing, and Conditional Expressions (1), (2), (3), (4), and (5) are satisfied.

Next, examples of the variable magnification optical system according to the present disclosure will be described with reference to the drawings. Reference numerals provided to each lens and each group in a cross-sectional view of each example are independently used for each example in order to avoid complication of description and illustration caused by an increase in the number of digits of the reference numerals. Accordingly, even in a case where a common reference numeral is provided in the drawings of different examples, the common reference numeral does not necessarily indicate a common configuration.

Example 1

A configuration and a moving path of the variable magnification optical system of Example 1 are illustrated in FIG. 1, and its illustration method is described above. Thus, duplicate descriptions will be partially omitted here. The variable magnification optical system of Example 1 consists of, in order from the object side to the image side, the first lens group G1 having a positive refractive power, the second lens group G2 having a negative refractive power, and the third lens group G3 having a positive refractive power. The subsequent group GR consists of the third lens group G3. The first lens group G1 consists of four lenses including the lenses L11 to L14 in order from the object side to the image side. The second lens group G2 consists of the lens L21, the aperture stop St, and the lenses L22 and L23 in order from the object side to the image side. The third lens group G3 consists of one lens that is the lens L31. The lens L12 is a compound aspherical lens.

During changing the magnification from the wide angle end to the telephoto end, all lens groups move along the optical axis Z by changing their spacings with respect to their adjacent lens groups. The focusing lens group consists of the third lens group G3. During the focusing from the infinite distance object to the nearest object, the third lens group G3 moves to the object side, and other lens groups are fixed with respect to the image plane Sim. The vibration-proof group consists of the lens L21.

For the variable magnification optical system of Example 1, basic lens data is shown in Table 1, specifications and variable surface spacings are shown in Table 2, and aspherical coefficients are shown in Table 3.

The table of the basic lens data is described as follows. A column of "Sn" shows surface numbers in a case where the number is increased by one at a time toward the image side from the surface closest to the object side as a first surface. A column of "R" shows a curvature radius of each surface. A column of "D" shows a surface spacing on the optical axis between each surface and its adjacent surface on the image side. A column of "Nd" shows a refractive index of each lens with respect to the d line. A column of "νd" shows an Abbe number of each lens based on the d line. A column of "θg, F" shows a partial dispersion ratio of each constituent between a g line and an F line. A column of "ED" shows an effective diameter of each surface. A column of "NG1L+0.01×νG1L" shows the corresponding value of Conditional Expression (4) for each lens. The columns of "ED" and "NG1L+0.01×νG1L" show values for only relevant surfaces and lenses.

In a case where refractive indexes of a lens with respect to the g line, the F line, and a C line are denoted by Ng, NF, and NC, respectively, and a partial dispersion ratio of the lens between the g line and the F line is denoted by θg, F, θg, F is defined as the following expression.

$$\theta g,F=(Ng-NF)/(NF-NC)$$

The terms "d line", "C line", "F line", and "g line" described in the present specification mean bright lines. A wavelength of the d line is 587.56 nanometers (nm). A wavelength of the C line is 656.27 nanometers (nm). A wavelength of the F line is 486.13 nanometers (nm). A wavelength of the g line is 435.84 nanometers (nm).

In the table of the basic lens data, a sign of the curvature radius of the surface having a convex shape toward the object side is positive, and a sign of the curvature radius of the surface having a convex shape toward the image side is negative. In Table 1, a field of the surface number of the surface corresponding to the aperture stop St has the surface number and a text (St). A value in the lowermost field of the column of D in the table is a spacing between a surface closest to the image side in the table and the image plane Sim. A symbol DD[ ] is used for the variable surface spacings during changing the magnification. A surface number on the object side of the spacing is provided inside [ ] and is described in the column of the surface spacings.

Table 2 shows a magnification ratio Zr, a focal length f, a back focus Bf, an open F-number FNo, a maximum full angle of view 2ω, and variable surface spacings based on the d line. In a case where the variable magnification optical system is a zoom lens, the magnification ratio is synonymous with a zoom magnification. In fields of 2ω, [°] indicates degree units. In Table 2, each value in the wide angle end state, a middle focal length state, and the telephoto end state is shown in columns denoted by "Wide", "Middle", and "Tele", respectively.

In the basic lens data, surface numbers of aspherical surfaces are marked with *, and values of paraxial curvature radiuses are described in fields of the curvature radiuses of the aspherical surfaces. In Table 3, the column of Sn shows the surface numbers of the aspherical surfaces, and columns of KA and Am show numerical values of the aspherical coefficients for each aspherical surface. Here, m of Am is an integer greater than or equal to 3 and varies depending on the surface. For example, for the fifth surface of Example 1, m=4, 6, 8, and 10 is established. In the numerical values of the aspherical coefficients in Table 3, "E±n" (n: integer) means "×10+n". KA and Am are aspherical coefficients in an aspheric equation represented by the following expression.

$$Zd=C\times h^2/\{1+(1-KA\times C^2\times h^2)^{1/2}\}+\sum Am\times h^m$$

where

Zd: a depth of an aspherical surface (a length of a perpendicular line drawn from a point on the aspherical surface having a height h to a plane that is in contact with an aspherical surface apex and that is perpendicular to the optical axis Z)

h: a height (a distance from the optical axis Z to the lens surface)

C: a reciprocal of the paraxial curvature radius

KA and Am: aspherical coefficients

Σ in the aspheric equation means a sum total with respect to m.

In the data of each table, a degree unit is used for angles, and a millimeter unit is used for lengths. However, since the optical system can also be proportionally enlarged or proportionally reduced to be used, other appropriate units can also be used. In addition, numerical values rounded to predetermined digits are described in each table shown below.

TABLE 1

Example 1

| Sn | R | D | Nd | νd | θg, F | ED | NG1L + 0.01 × νG1L |
|---|---|---|---|---|---|---|---|
| 1 | 225.6446 | 3.0000 | 1.48749 | 70.24 | 0.53007 | | 2.18989 |
| 2 | −204.7120 | 0.0500 | | | | | |
| 3 | 156.7462 | 1.0001 | 1.75500 | 52.32 | 0.54757 | | 2.27820 |
| 4 | 13.1971 | 0.1000 | 1.51876 | 54.04 | 0.55927 | | |
| *5 | 12.4255 | 6.1714 | | | | 22.74 | |
| *6 | −88.0876 | 0.6231 | 1.53409 | 55.87 | 0.55858 | 22.43 | 2.09279 |
| *7 | 97.9671 | 3.2678 | | | | 21.56 | |
| 8 | 26.5916 | 2.5000 | 1.80518 | 25.42 | 0.61616 | | 2.05938 |
| 9 | 78.8988 | DD[9] | | | | | |
| 10 | 34.2076 | 2.5000 | 1.75500 | 52.32 | 0.54757 | | |
| 11 | −43.7324 | 2.3426 | | | | | |
| 12 (St) | ∞ | 0.0500 | | | | | |
| 13 | 16.4283 | 1.5639 | 1.43875 | 94.66 | 0.53402 | | |
| 14 | −52.2578 | 1.8051 | | | | | |
| 15 | −32.2346 | 0.4954 | 1.84666 | 23.78 | 0.62054 | | |
| 16 | 37.4243 | DD[16] | | | | | |
| *17 | −16.5693 | 2.6591 | 1.53409 | 55.87 | 0.55858 | | |
| *18 | −11.1108 | DD[18] | | | | | |

TABLE 2

| Example 1 | | | |
|---|---|---|---|
| | Wide | Middle | Tele |
| Zr | 1.0 | 1.4 | 1.8 |
| f | 14.65 | 20.72 | 26.38 |
| Bf | 20.66 | 23.74 | 29.00 |
| FNo. | 5.15 | 5.97 | 6.59 |
| 2ω[°] | 97.4 | 68.2 | 54.6 |
| DD[9] | 23.87 | 10.70 | 2.52 |
| DD[16] | 8.81 | 12.75 | 12.76 |
| DD[18] | 20.66 | 23.74 | 29.00 |

TABLE 3

| Example 1 | | | |
|---|---|---|---|
| | Sn | | |
| | 5 | 6 | 7 |
| KA | 1.0000000E+00 | 1.0000000E+00 | 1.0000000E+00 |
| A4 | −4.0349758E−05 | −8.5452165E−05 | −6.0208060E−05 |
| A6 | −8.4465208E−08 | 3.7294703E−06 | 3.6012803E−06 |
| A8 | 3.3396531E−09 | −2.6378718E−08 | −2.4922830E−08 |
| A10 | −2.2208075E−11 | 6.3253528E−11 | 4.9413143E−11 |

| | Sn | |
|---|---|---|
| | 17 | 18 |
| KA | 1.0000000E+00 | 1.0000000E+00 |
| A4 | −2.1555952E−04 | −5.6523145E−05 |
| A6 | 1.3739246E−06 | 4.8666335E−07 |
| A8 | −2.0564140E−07 | −6.9913046E−08 |
| A10 | 6.9480074E−10 | −1.6107487E−11 |

Figure 4:
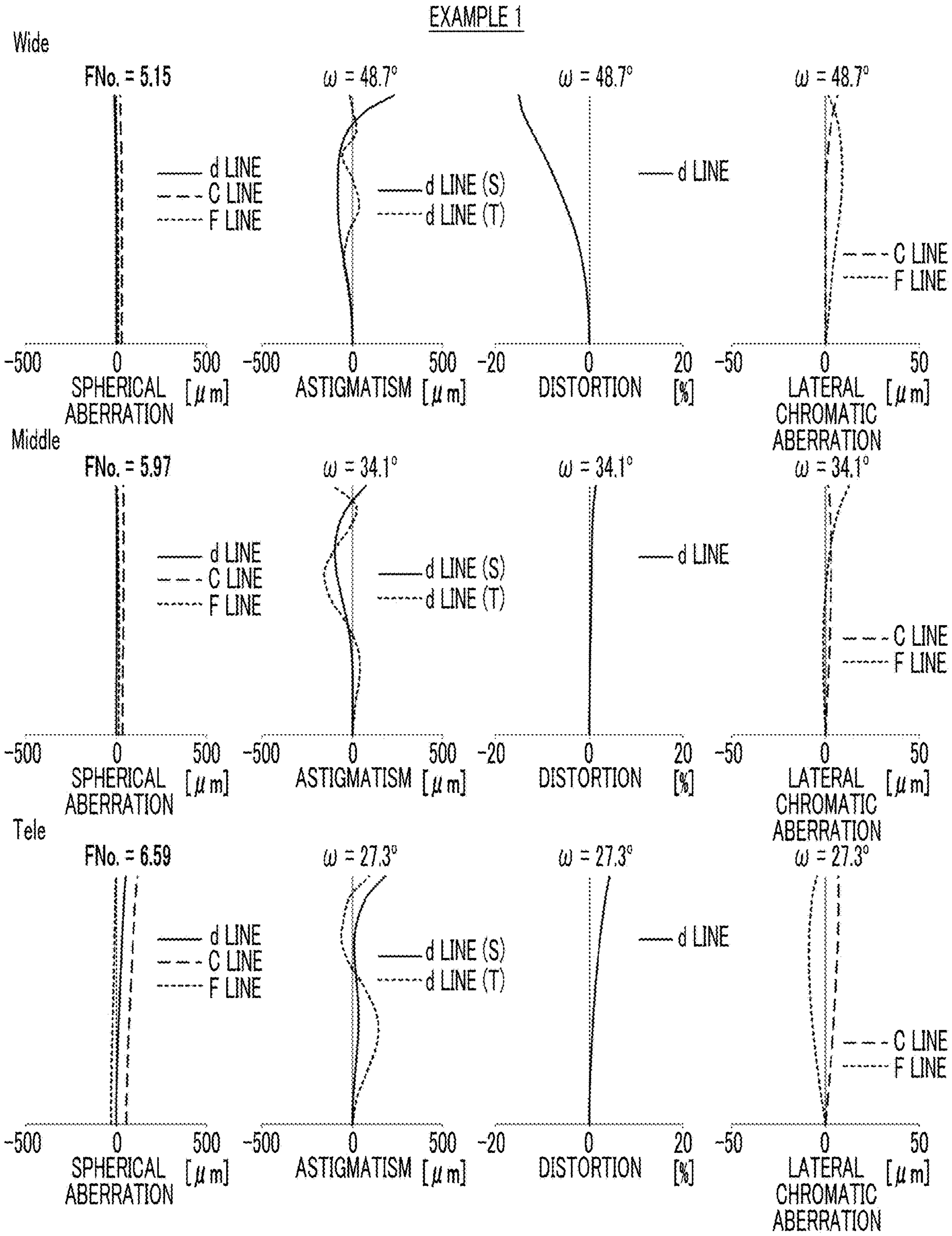
FIG. 4 is each aberration diagram of the variable magnification optical system of Example 1.

FIG. 4 illustrates each aberration diagram of the variable magnification optical system of Example 1 in the state where the infinite distance object is focused on. In FIG. 4, a spherical aberration, an astigmatism, a distortion, and a lateral chromatic aberration are illustrated in this order from the left. In FIG. 4, aberrations in the wide angle end state are illustrated in an upper part denoted by "Wide", aberrations in the middle focal length state are illustrated in a middle part denoted by "Middle", and aberrations in the telephoto end state are illustrated in a lower part denoted by "Tele". In the spherical aberration diagram, aberrations on the d line, the C line, and the F line are illustrated by a solid line, a long broken line, and a short broken line, respectively. In the astigmatism diagram, an aberration on the d line in a sagittal direction is illustrated by a solid line, and an aberration on the d line in a tangential direction is illustrated by a short broken line. In the distortion diagram, an aberration on the d line is illustrated by a solid line. In the lateral chromatic aberration diagram, aberrations on the C line and the F line are illustrated by a long broken line and a short broken line, respectively. In the spherical aberration diagram, the value of the open F-number is shown after FNo.=. In other aberration diagrams, the value of the maximum half angle of view is shown after ω=.

Symbols, meanings, description methods, and illustration methods of each data related to Example 1 are basically the same for the following examples unless otherwise specified. Thus, duplicate descriptions will be omitted below.

Example 2

Figure 5:
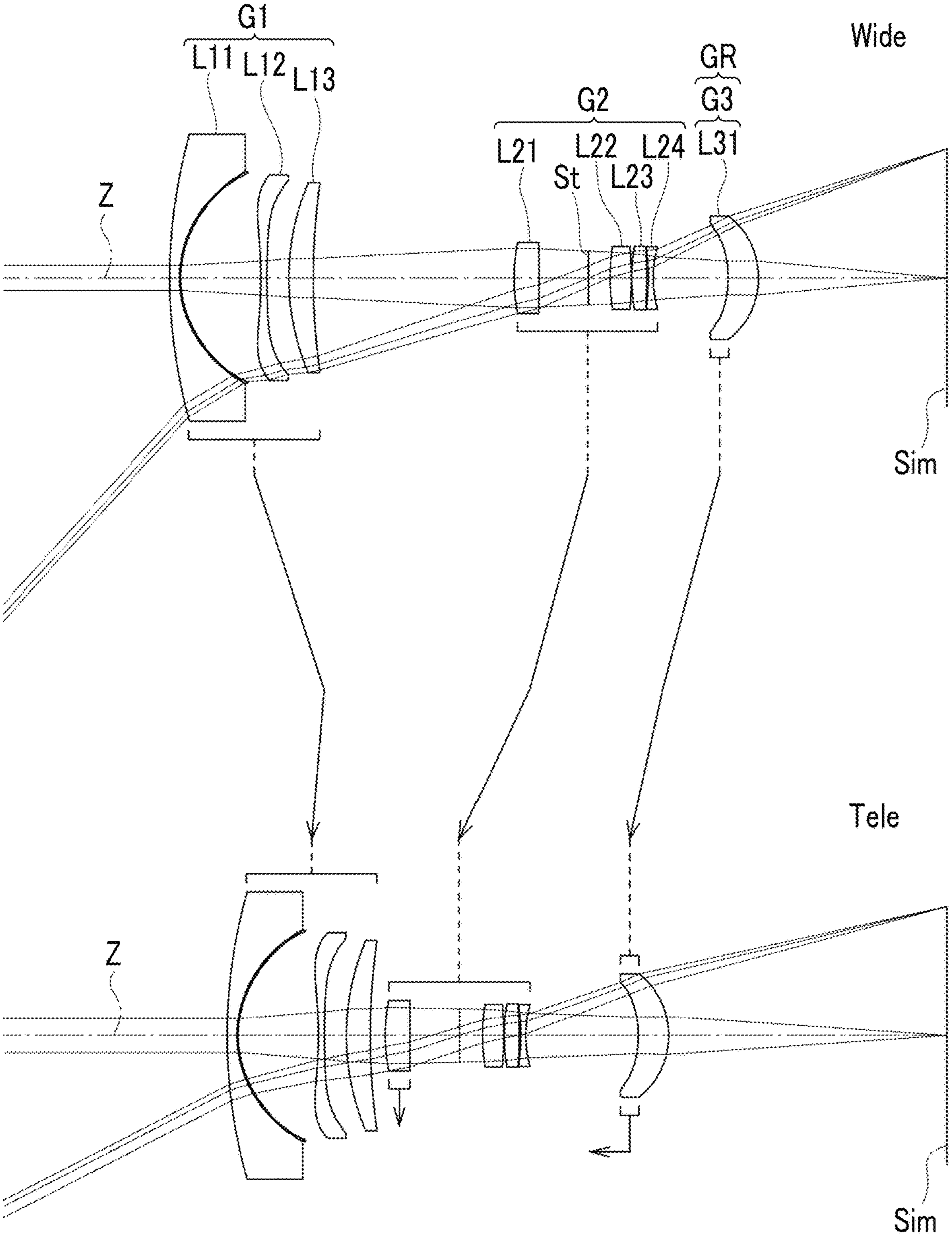
FIG. 5 is a diagram illustrating a cross-sectional view and a moving path of a configuration of a variable magnification optical system of Example 2.

A configuration and a moving path of a variable magnification optical system of Example 2 are illustrated in FIG. 5. The variable magnification optical system of Example 2 consists of, in order from the object side to the image side, the first lens group G1 having a positive refractive power, the second lens group G2 having a negative refractive power, and the third lens group G3 having a positive refractive power. The subsequent group GR consists of the third lens group G3. The first lens group G1 consists of three lenses including the lenses L11 to L13 in order from the object side to the image side. The second lens group G2 consists of the lens L21, the aperture stop St, and lenses L22 to L24 in order from the object side to the image side. The third lens group G3 consists of one lens that is the lens L31. The lens L11 is a compound aspherical lens.

During changing the magnification from the wide angle end to the telephoto end, all lens groups move along the optical axis Z by changing their spacings with respect to their adjacent lens groups. The focusing lens group consists of the third lens group G3. During the focusing from the infinite distance object to the nearest object, the third lens group G3 moves to the object side, and other lens groups are fixed with respect to the image plane Sim. The vibration-proof group consists of the lens L21.

Figure 6:
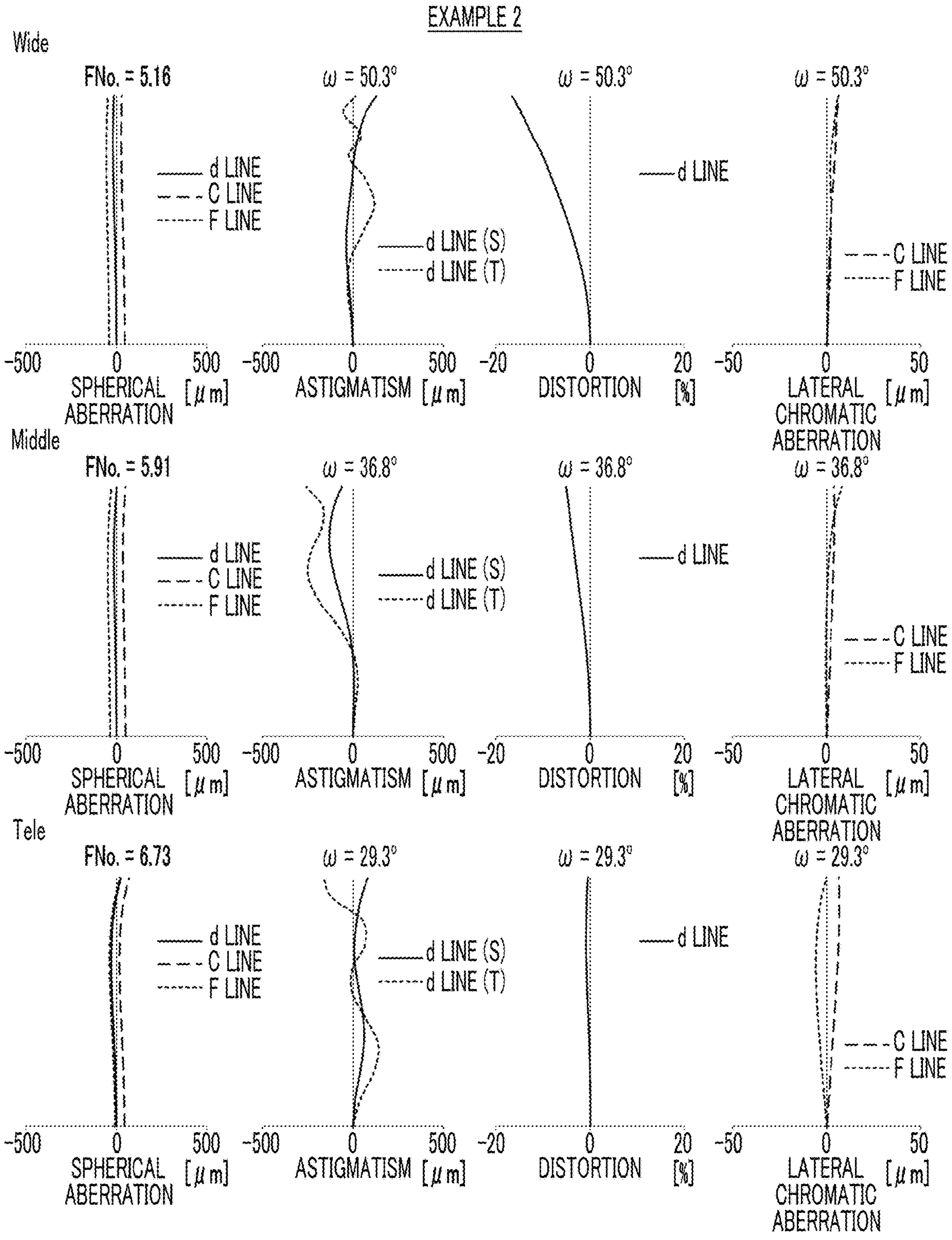
FIG. 6 is each aberration diagram of the variable magnification optical system of Example 2.

For the variable magnification optical system of Example 2, basic lens data is shown in Table 4, specifications and variable surface spacings are shown in Table 5, aspherical coefficients are shown in Table 6, and each aberration diagram is illustrated in FIG. 6.

TABLE 4

| Example 2 | | | | | | | |
|---|---|---|---|---|---|---|---|
| Sn | R | D | Nd | νd | θg, F | ED | NG1L + 0.01 × νG1L |
| 1 | 63.5646 | 0.9998 | 1.75500 | 52.32 | 0.54757 | | 2.27820 |
| 2 | 13.6046 | 0.1000 | 1.51876 | 54.04 | 0.55927 | | |
| *3 | 12.8339 | 8.0407 | | | | 23.00 | |
| *4 | −57.4271 | 0.6134 | 1.53409 | 55.87 | 0.55858 | 22.64 | 2.09279 |
| *5 | 86.1806 | 2.1969 | | | | 21.42 | |
| 6 | 29.0825 | 2.4530 | 1.80518 | 25.42 | 0.61616 | | 2.05938 |
| 7 | 81.6358 | DD[7] | | | | | |
| 8 | 21.3209 | 2.5002 | 1.64000 | 60.08 | 0.53704 | | |
| 9 | −307.5563 | 4.9665 | | | | | |
| 10 (St) | ∞ | 2.2159 | | | | | |
| 11 | 23.5669 | 2.1243 | 1.43875 | 94.66 | 0.53402 | | |
| 12 | −42.1695 | 0.0501 | | | | | |
| 13 | 22.2438 | 1.5035 | 2.00330 | 28.27 | 0.59802 | | |
| 14 | −54.7310 | 0.1552 | | | | | |
| 15 | −26.3701 | 0.4989 | 1.84666 | 23.78 | 0.62054 | | |

TABLE 4-continued

| Example 2 | | | | | | | |
|---|---|---|---|---|---|---|---|
| Sn | R | D | Nd | νd | θg, F | ED | NG1L + 0.01 × νG1L |
| 16 | 13.7741 | DD[16] | | | | | |
| *17 | −13.6908 | 3.0447 | 1.53409 | 55.87 | 0.55858 | | |
| *18 | −10.0899 | DD[18] | | | | | |

TABLE 5

| Example 2 | | | |
|---|---|---|---|
| | Wide | Middle | Tele |
| Zr | 1.0 | 1.4 | 1.8 |
| f | 14.15 | 20.01 | 25.47 |
| Bf | 18.97 | 24.67 | 27.98 |
| FNo. | 5.16 | 5.91 | 6.73 |
| 2ω[°] | 100.6 | 73.6 | 58.6 |
| DD[7] | 20.11 | 7.25 | 1.50 |
| DD[16] | 7.51 | 7.64 | 11.34 |
| DD[18] | 18.97 | 24.67 | 27.98 |

TABLE 6

| Example 2 | | | |
|---|---|---|---|
| | Sn | | |
| | 3 | 4 | 5 |
| KA | 1.0000000E+00 | 1.0000000E+00 | 1.0000000E+00 |
| A4 | −1.4144228E−06 | −7.1608890E−05 | −8.4320691E−05 |
| A6 | −4.0237638E−07 | 3.1754587E−06 | 3.9763276E−06 |
| A8 | −1.4771692E−09 | −2.0972651E−08 | −2.7712795E−08 |
| A10 | 2.4999494E−11 | 6.3029066E−11 | 6.9669402E−11 |

| | Sn | |
|---|---|---|
| | 17 | 18 |
| KA | 1.0000000E+00 | 1.0000000E+00 |
| A4 | −3.0312463E−04 | −1.1704879E−04 |
| A6 | −3.6724154E−07 | −1.3119162E−06 |
| A8 | 1.1031744E−08 | 3.9493446E−08 |
| A10 | −1.0668581E−09 | −6.9261491E−10 |

Example 3

Figure 7:
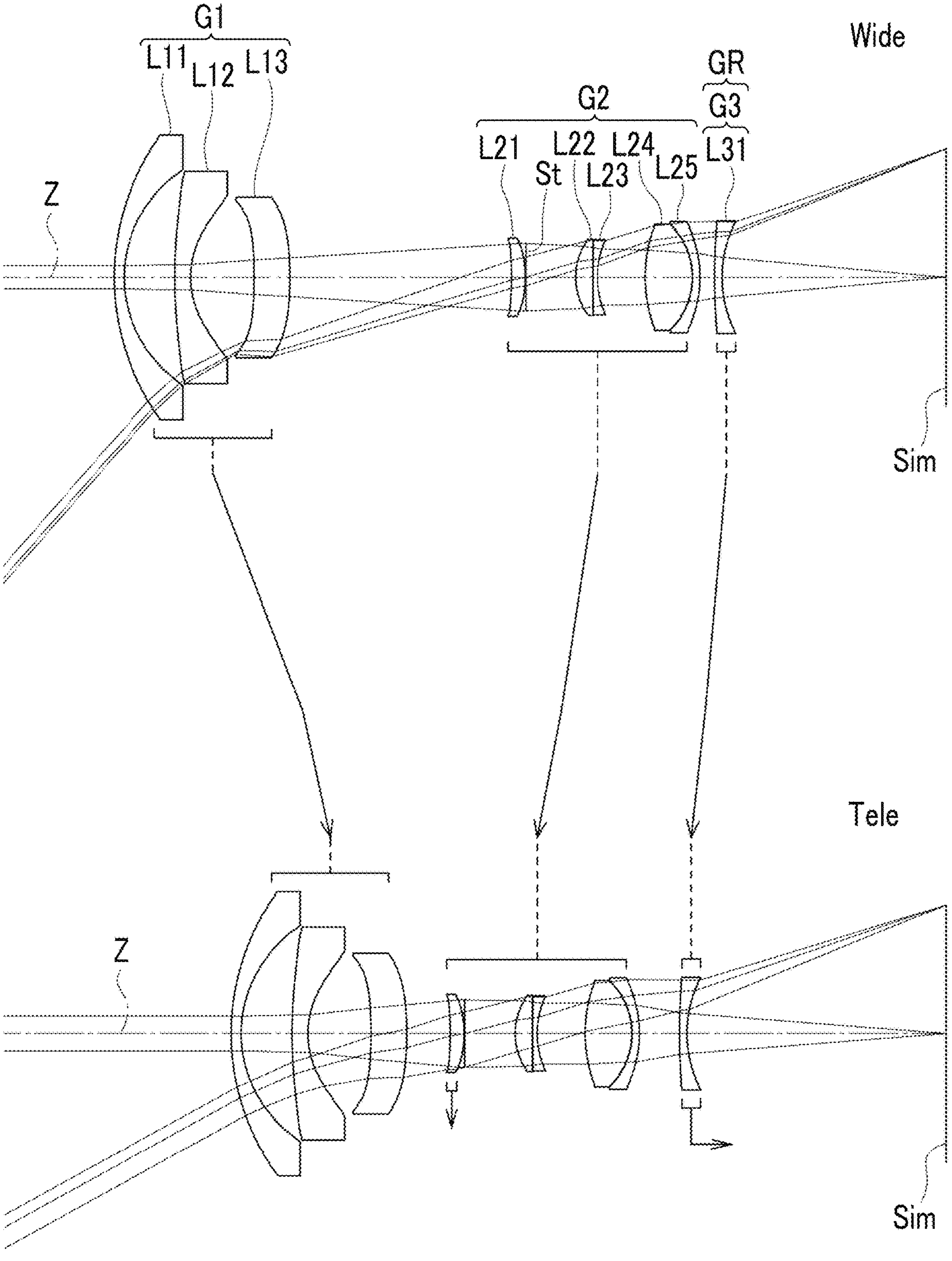
FIG. 7 is a diagram illustrating a cross-sectional view and a moving path of a configuration of a variable magnification optical system of Example 3.

A configuration and a moving path of a variable magnification optical system of Example 3 are illustrated in FIG. 7. The variable magnification optical system of Example 3 consists of, in order from the object side to the image side, the first lens group G1 having a positive refractive power, the second lens group G2 having a negative refractive power, and the third lens group G3 having a negative refractive power. The subsequent group GR consists of the third lens group G3. The first lens group G1 consists of three lenses including the lenses L11 to L13 in order from the object side to the image side. The second lens group G2 consists of the lens L21, the aperture stop St, and lenses L22 to L25 in order from the object side to the image side. The third lens group G3 consists of one lens that is the lens L31.

During changing the magnification from the wide angle end to the telephoto end, all lens groups move along the optical axis Z by changing their spacings with respect to their adjacent lens groups. The focusing lens group consists of the third lens group G3. During the focusing from the infinite distance object to the nearest object, the third lens group G3 moves to the image side, and other lens groups are fixed with respect to the image plane Sim. The vibration-proof group consists of the lens L21.

Figure 8:
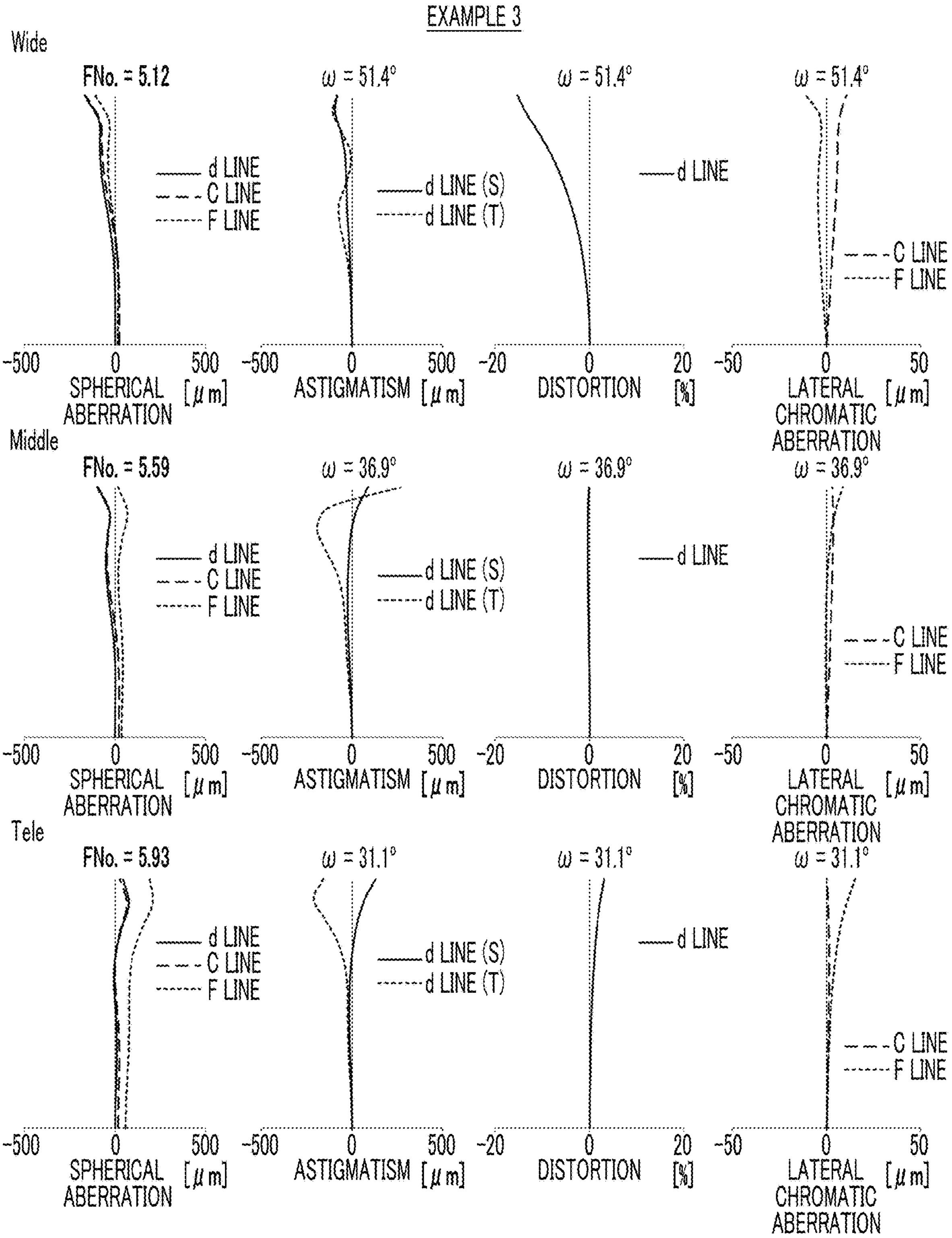
FIG. 8 is each aberration diagram of the variable magnification optical system of Example 3.

For the variable magnification optical system of Example 3, basic lens data is shown in Table 7, specifications and variable surface spacings are shown in Table 8, aspherical coefficients are shown in Table 9, and each aberration diagram is illustrated in FIG. 8.

TABLE 7

| Example 3 | | | | | | | |
|---|---|---|---|---|---|---|---|
| Sn | R | D | Nd | νd | θg, F | ED | NG1L + 0.01 × νG1L |
| 1 | 28.7557 | 0.9998 | 1.48749 | 70.24 | 0.53007 | | 2.18989 |
| 2 | 14.9180 | 5.1212 | | | | 23.81 | |
| *3 | 67.5307 | 1.5924 | 1.54436 | 56.03 | 0.56178 | 23.45 | 2.10466 |
| *4 | 10.6538 | 6.3817 | | | | 18.05 | |
| *5 | −65.7745 | 3.5923 | 1.66121 | 20.35 | 0.66162 | | 1.86471 |
| *6 | −44.6192 | DD[6] | | | | | |
| *7 | −72.8305 | 1.4005 | 1.54436 | 56.03 | 0.56178 | | |
| *8 | −13.7318 | 0.0498 | | | | | |
| 9 (St) | ∞ | 5.0068 | | | | | |
| 10 | 7.7442 | 1.7598 | 1.43875 | 94.66 | 0.53402 | | |
| 11 | 312.6557 | 0.4500 | 1.76385 | 48.49 | 0.55898 | | |
| 12 | 10.5120 | 4.8210 | | | | | |
| 13 | 17.5355 | 4.7602 | 1.52841 | 76.45 | 0.53954 | | |
| 14 | −8.7599 | 0.7502 | 1.72916 | 54.68 | 0.54451 | | |
| *15 | −13.3586 | DD[15] | | | | | |
| 16 | 81.3638 | 0.7498 | 1.81600 | 46.62 | 0.55682 | | |
| 17 | 14.5664 | DD[17] | | | | | |

TABLE 8

| Example 3 | | | |
|---|---|---|---|
| | Wide | Middle | Tele |
| Zr | 1.0 | 1.4 | 1.7 |
| f | 13.40 | 18.95 | 22.78 |
| Bf | 22.56 | 24.68 | 26.09 |
| FNo. | 5.12 | 5.59 | 5.93 |
| 2ω[°] | 102.8 | 73.8 | 62.2 |
| DD[6] | 22.21 | 9.53 | 4.35 |
| DD[15] | 1.46 | 3.01 | 4.01 |
| DD[17] | 22.56 | 24.68 | 26.09 |

TABLE 9

Example 3

| | Sn | | | |
|---|---|---|---|---|
| | 3 | 4 | 5 | 6 |
| KA | 1.0000000E+00 | 1.0000000E+00 | 1.0000000E+00 | 1.0000000E+00 |
| A4 | 4.3733536E−05 | 4.8505410E−06 | −1.4179706E−04 | −1.2747392E−04 |
| A6 | −9.9772455E−07 | −1.2096654E−06 | −1.2463577E−06 | −1.0039121E−06 |
| A8 | 4.9400215E−09 | −2.8986034E−08 | −1.6206553E−08 | 1.0187453E−08 |
| A10 | 0.0000000E+00 | 1.6417486E−10 | 1.9092893E−10 | −1.7909059E−11 |

| | Sn | | |
|---|---|---|---|
| | 7 | 8 | 15 |
| KA | 1.0000000E+00 | 1.0000000E+00 | 1.0000000E+00 |
| A4 | −3.5017847E−04 | −2.4506721E−04 | 1.1469235E−04 |
| A6 | −8.7598411E−06 | −9.2559332E−06 | 5.8915653E−07 |
| A8 | 1.9675551E−07 | 2.9448744E−07 | −1.1854134E−08 |
| A10 | −2.7924194E−08 | −2.5936909E−08 | 1.9541000E−10 |

Example 4

Figure 9:
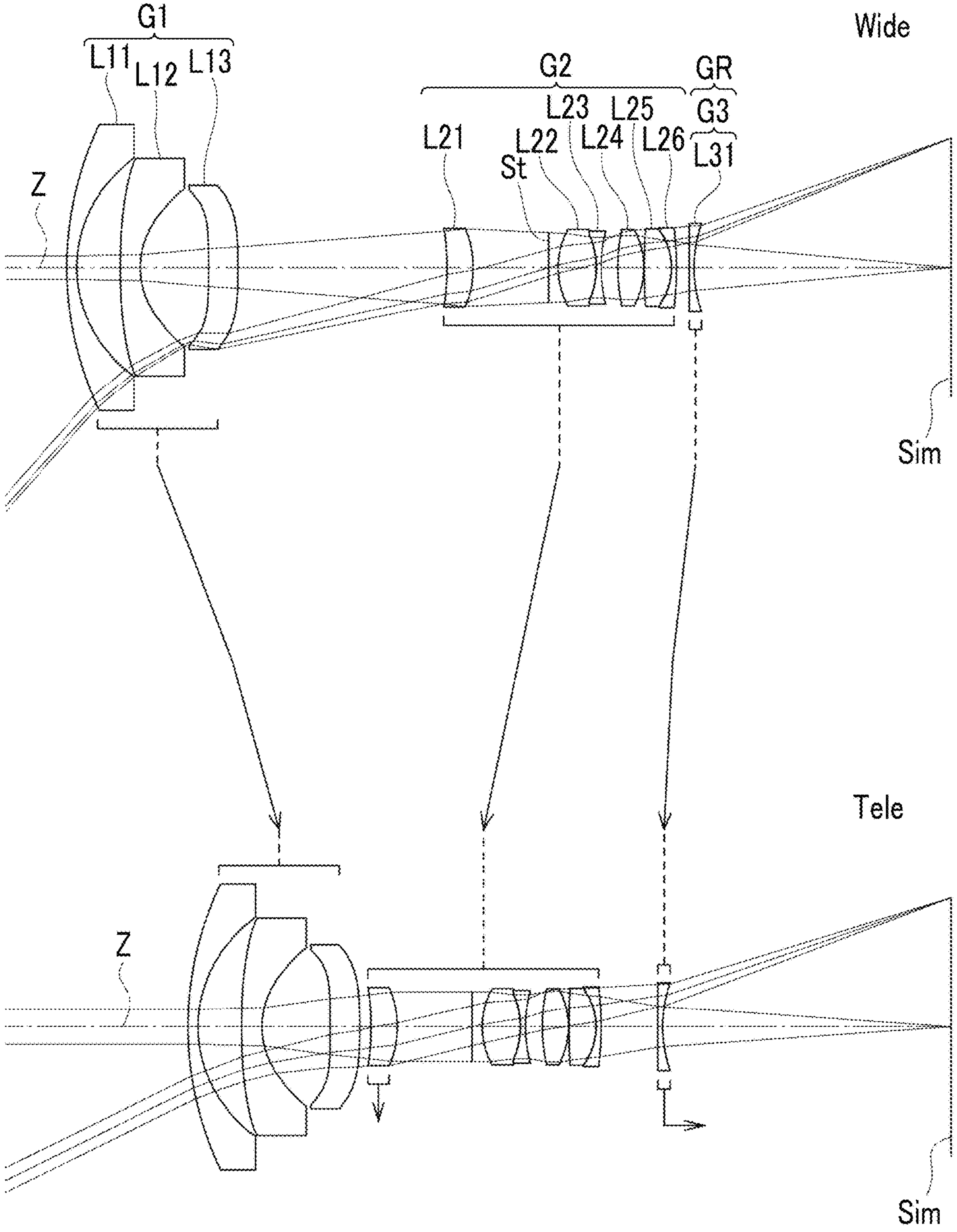
FIG. 9 is a diagram illustrating a cross-sectional view and a moving path of a configuration of a variable magnification optical system of Example 4.

A configuration and a moving path of a variable magnification optical system of Example 4 are illustrated in FIG. 9. The variable magnification optical system of Example 4 consists of, in order from the object side to the image side, the first lens group G1 having a positive refractive power, the second lens group G2 having a negative refractive power, and the third lens group G3 having a negative refractive power. The subsequent group GR consists of the third lens group G3. The first lens group G1 consists of three lenses including the lenses L11 to L13 in order from the object side to the image side. The second lens group G2 consists of the lens L21, the aperture stop St, and lenses L22 to L26 in order from the object side to the image side. The third lens group G3 consists of one lens that is the lens L31.

During changing the magnification from the wide angle end to the telephoto end, all lens groups move along the optical axis Z by changing their spacings with respect to their adjacent lens groups. The focusing lens group consists of the third lens group G3. During the focusing from the infinite distance object to the nearest object, the third lens group G3 moves to the image side, and other lens groups are fixed with respect to the image plane Sim. The vibration-proof group consists of the lens L21.

Figure 10:
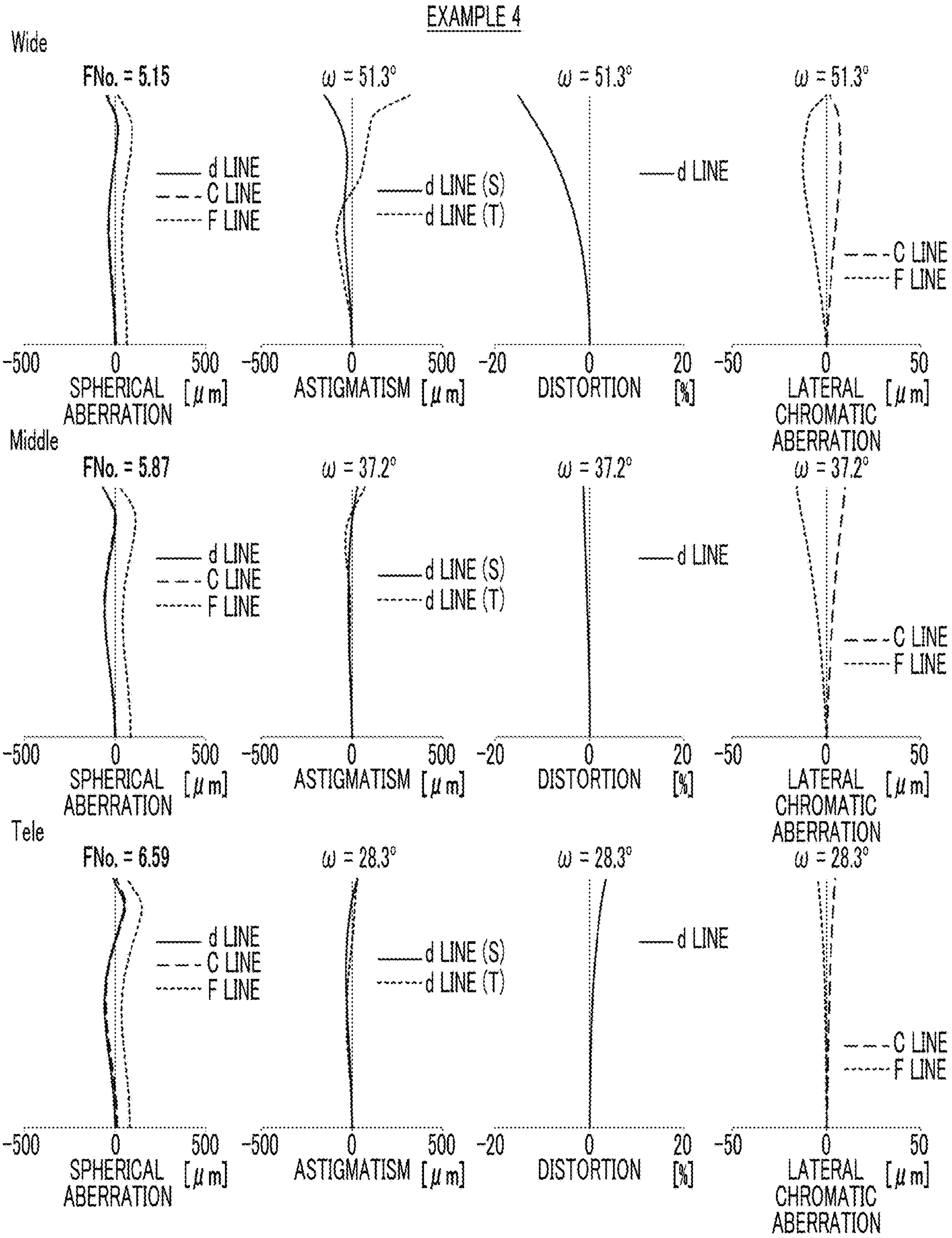
FIG. 10 is each aberration diagram of the variable magnification optical system of Example 4.

For the variable magnification optical system of Example 4, basic lens data is shown in Table 10, specifications and variable surface spacings are shown in Table 11, aspherical coefficients are shown in Table 12, and each aberration diagram is illustrated in FIG. 10.

TABLE 10

Example 4

| Sn | R | D | Nd | νd | θg, F | ED | NG1L + 0.01 × νG1L |
|---|---|---|---|---|---|---|---|
| 1 | 39.5006 | 0.9998 | 1.48749 | 70.24 | 0.53007 | | 2.18989 |
| 2 | 15.5248 | 4.3677 | | | | 24.16 | |
| *3 | 111.6829 | 2.0343 | 1.54436 | 56.03 | 0.56178 | 23.90 | 2.10466 |
| *4 | 9.7455 | 6.8303 | | | | 17.42 | |
| *5 | −897.0953 | 2.9563 | 1.66121 | 20.35 | 0.66162 | | 1.86471 |
| *6 | −98.0427 | DD[6] | | | | | |
| *7 | −49.7201 | 2.6334 | 1.54436 | 56.03 | 0.56178 | | |
| *8 | −12.9781 | 7.4724 | | | | | |
| 9 (St) | ∞ | 0.9510 | | | | | |
| 10 | 9.4687 | 3.8322 | 1.43875 | 94.66 | 0.53402 | | |
| 11 | −9.7447 | 0.4939 | 1.88300 | 39.22 | 0.57288 | | |

TABLE 10-continued

| Example 4 | | | | | | | |
|---|---|---|---|---|---|---|---|
| Sn | R | D | Nd | νd | θg, F | ED | NG1L + 0.01 × νG1L |
| 12 | 16.6413 | 1.6938 | | | | | |
| 13 | 21.5045 | 2.6096 | 1.60342 | 38.03 | 0.58356 | | |
| 14 | −9.5635 | 0.0501 | | | | | |
| 15 | 81.4308 | 2.7263 | 1.52841 | 76.45 | 0.53954 | | |
| 16 | −7.6117 | 0.4998 | 1.72916 | 54.68 | 0.54451 | | |
| *17 | −34.1103 | DD[17] | | | | | |
| 18 | 478.4077 | 0.4947 | 1.81600 | 46.62 | 0.55682 | | |
| 19 | 16.0067 | DD[19] | | | | | |

TABLE 11

| Example 4 | | | |
|---|---|---|---|
| | Wide | Middle | Tele |
| Zr | 1.0 | 1.4 | 1.9 |
| f | 13.39 | 18.94 | 25.45 |
| Bf | 25.77 | 28.05 | 28.90 |
| FNo. | 5.15 | 5.87 | 6.59 |
| 2ω[°] | 102.6 | 74.4 | 56.6 |
| DD[6] | 20.95 | 9.31 | 1.17 |
| DD[17] | 1.26 | 3.07 | 5.71 |
| DD[19] | 25.77 | 28.05 | 28.90 |

TABLE 12

Example 4

| | Sn | | | |
|---|---|---|---|---|
| | 3 | 4 | 5 | 6 |
| KA | 1.0000000E+00 | 1.0000000E+00 | 1.0000000E+00 | 1.0000000E+00 |
| A4 | 1.1262202E−04 | 3.1126466E−05 | −2.4898899E−04 | −2.2590078E−04 |
| A6 | −1.1520767E−06 | −6.6982695E−07 | −1.3418263E−06 | −1.0207478E−06 |
| A8 | 4.7554445E−09 | −3.5239180E−08 | −1.6631813E−08 | 1.1625818E−08 |
| A10 | 0.0000000E+00 | 1.3703850E−10 | 1.9110746E−10 | −2.5814616E−11 |

| | Sn | | |
|---|---|---|---|
| | 7 | 8 | 17 |
| KA | 1.0000000E+00 | 1.0000000E+00 | 1.0000000E+00 |
| A4 | −2.9302824E−04 | −2.0076066E−04 | 8.6766715E−05 |
| A6 | −3.4185996E−06 | −1.9502984E−06 | 5.9211452E−07 |
| A8 | 1.1454678E−08 | −1.1606462E−08 | −1.1963056E−08 |
| A10 | −3.5670603E−09 | −1.7431155E−09 | 1.9541000E−10 |

Example 5

Figure 11:
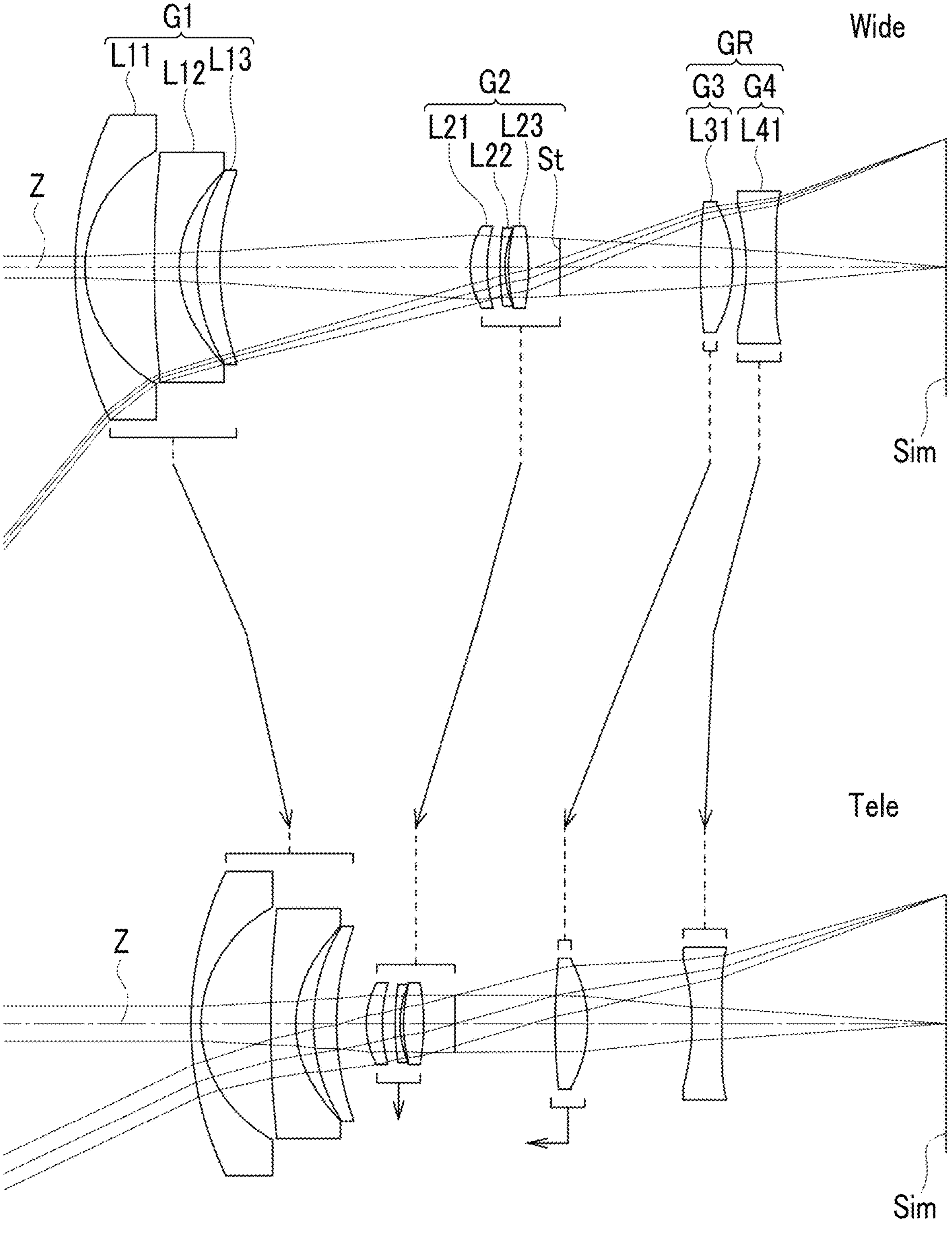
FIG. 11 is a diagram illustrating a cross-sectional view and a moving path of a configuration of a variable magnification optical system of Example 5.

A configuration and a moving path of a variable magnification optical system of Example 5 are illustrated in FIG. 11. The variable magnification optical system of Example 5 consists of, in order from the object side to the image side, the first lens group G1 having a negative refractive power, the second lens group G2 having a positive refractive power, the third lens group G3 having a positive refractive power, and a fourth lens group G4 having a negative refractive power. The subsequent group GR consists of two lens groups including the third lens group G3 and the fourth lens group G4. The first lens group G1 consists of three lenses including the lenses L11 to L13 in order from the object side to the image side. The second lens group G2 consists of three lenses including the lenses L21 to L23 and the aperture stop St in order from the object side to the image side. The third lens group G3 consists of one lens that is the lens L31. The fourth lens group G4 consists of one lens that is a lens L41.

During changing the magnification from the wide angle end to the telephoto end, all lens groups move along the optical axis Z by changing their spacings with respect to their adjacent lens groups. The focusing lens group consists of the third lens group G3. During the focusing from the infinite distance object to the nearest object, the third lens group G3 moves to the object side, and other lens groups are fixed with respect to the image plane Sim. The vibration-proof group consists of three lenses including the lenses L21 to L23.

Figure 12:
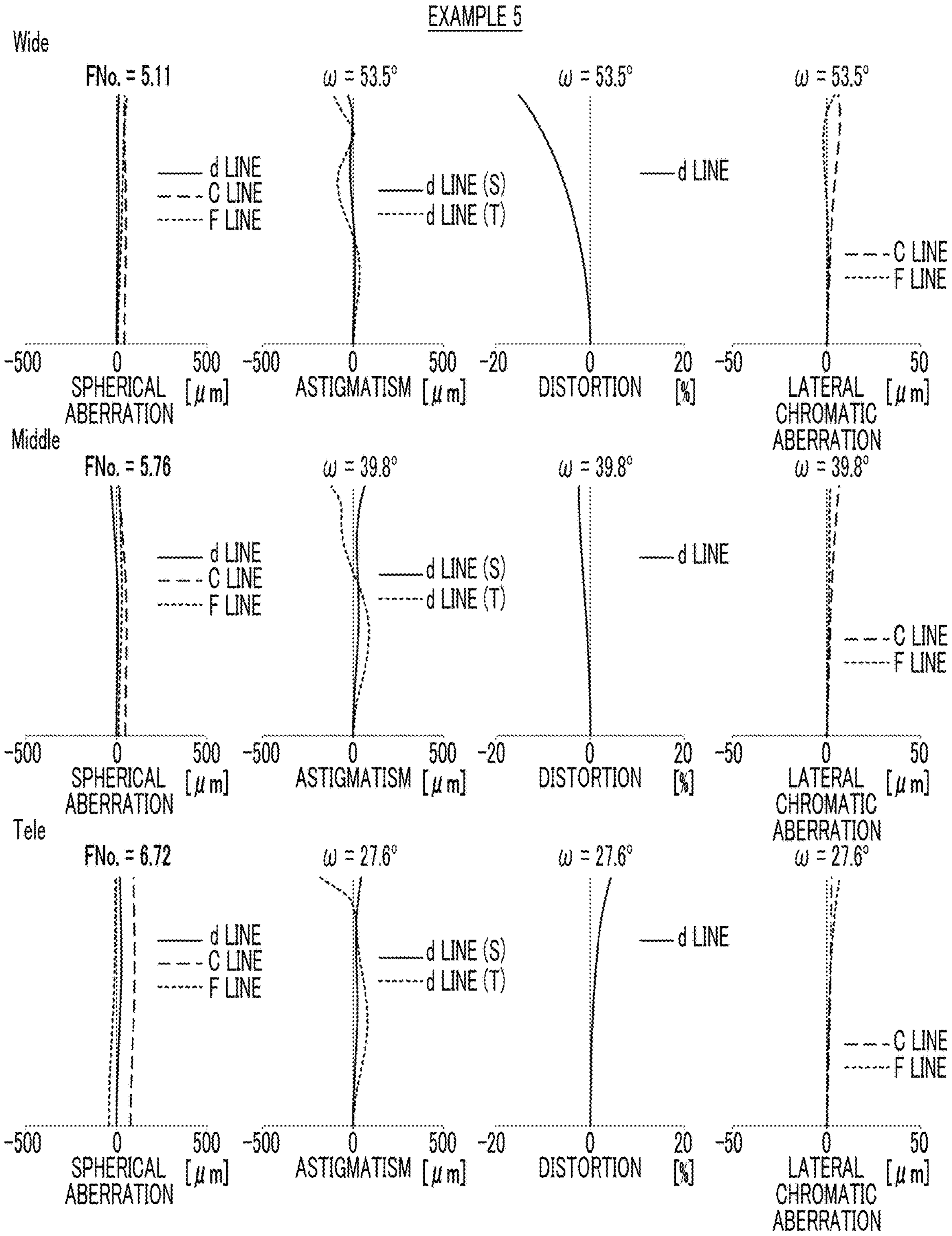
FIG. 12 is each aberration diagram of the variable magnification optical system of Example 5.

For the variable magnification optical system of Example 5, basic lens data is shown in Table 13, specifications and variable surface spacings are shown in Table 14, aspherical coefficients are shown in Table 15, and each aberration diagram is illustrated in FIG. 12.

TABLE 13

Example 5

| Sn | R | D | Nd | νd | θg, F | ED | NG1L + 0.01 × νG1L |
|---|---|---|---|---|---|---|---|
| 1 | 41.9272 | 0.9998 | 1.75500 | 52.32 | 0.54757 | | 2.27820 |
| 2 | 15.0602 | 7.0210 | | | | 25.70 | |
| *3 | 254.7104 | 2.5000 | 1.54436 | 56.03 | 0.56178 | 25.35 | 2.10466 |
| *4 | 13.8159 | 1.7827 | | | | 21.47 | |
| 5 | 21.8371 | 2.3090 | 1.95906 | 17.47 | 0.65993 | | 2.13376 |
| 6 | 33.4734 | DD[6] | | | | | |
| *7 | 10.3948 | 1.6036 | 1.66121 | 20.35 | 0.66162 | | |
| *8 | 18.2077 | 1.2913 | | | | | |
| 9 | 34.1509 | 0.4938 | 2.00272 | 19.32 | 0.64514 | | |
| 10 | 11.8031 | 0.3508 | | | | | |
| 11 | 18.4388 | 2.0135 | 1.72916 | 54.68 | 0.54451 | | |
| 12 | −29.0621 | 3.1669 | | | | | |
| 13 (St) | ∞ | DD[13] | | | | | |
| 14 | 77.0127 | 3.2501 | 1.43875 | 94.66 | 0.53402 | | |
| 15 | −15.6899 | DD[15] | | | | | |
| *16 | −25.2836 | 3.0000 | 1.54436 | 56.03 | 0.56178 | | |
| *17 | −264.3575 | DD[17] | | | | | |

TABLE 14

Example 5

| | Wide | Middle | Tele |
|---|---|---|---|
| Zr | 1.0 | 1.4 | 2.1 |
| f | 12.36 | 17.48 | 25.95 |
| Bf | 17.13 | 21.69 | 22.58 |
| FNo. | 5.11 | 5.76 | 6.72 |
| 2ω[°] | 107.0 | 79.6 | 55.2 |
| DD[6] | 25.21 | 13.22 | 3.05 |
| DD[13] | 14.14 | 11.77 | 9.97 |
| DD[15] | 1.36 | 3.77 | 10.55 |
| DD[17] | 17.13 | 21.69 | 22.58 |

TABLE 15

Example 5

| | Sn | | | |
|---|---|---|---|---|
| | 3 | 4 | 16 | 17 |
| KA | 1.0000000E+00 | 1.0000000E+00 | 1.0000000E+00 | 1.0000000E+00 |
| A4 | 3.6033378E−05 | 6.6795711E−06 | 3.9122941E−05 | 1.1591373E−04 |
| A6 | −2.1999331E−07 | −3.6427945E−07 | 1.0989111E−06 | 6.0773125E−07 |
| A8 | 4.8822084E−10 | −3.2165712E−10 | −3.8622431E−08 | −1.3493986E−08 |
| A10 | −1.0589209E−12 | −5.4220809E−12 | 4.6690187E−10 | 1.0966094E−10 |
| A12 | 1.4071535E−15 | 3.9724374E−15 | −2.4619952E−12 | −4.8517534E−13 |

TABLE 15-continued

| Example 5 | | |
|---|---|---|
| | Sn | |
| | 7 | 8 |
| KA | 1.0000000E+00 | 1.0000000E+00 |
| A4 | 1.4050995E−05 | 5.6135431E−05 |
| A6 | 7.4115657E−07 | 4.2733355E−07 |
| A8 | −1.7581017E−08 | 1.2037813E−08 |
| A10 | 8.7649421E−10 | 3.1110738E−10 |

Example 6

Figure 13:
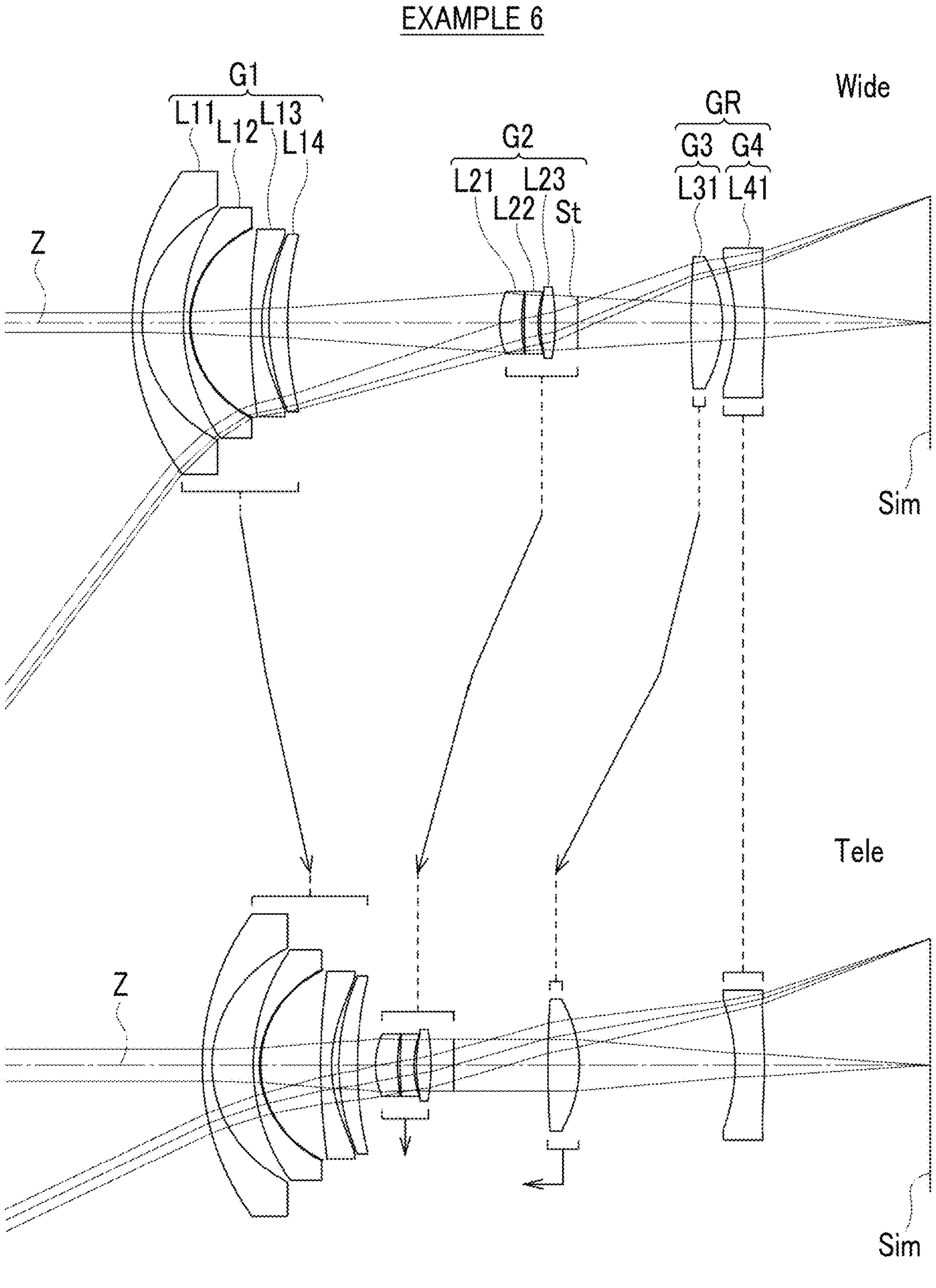
FIG. 13 is a diagram illustrating a cross-sectional view and a moving path of a configuration of a variable magnification optical system of Example 6.

A configuration and a moving path of a variable magnification optical system of Example 6 are illustrated in FIG. 13. The variable magnification optical system of Example 6 consists of, in order from the object side to the image side, the first lens group G1 having a negative refractive power, the second lens group G2 having a positive refractive power, the third lens group G3 having a positive refractive power, and the fourth lens group G4 having a negative refractive power. The subsequent group GR consists of two lens groups including the third lens group G3 and the fourth lens group G4. The first lens group G1 consists of four lenses including the lenses L11 to L14 in order from the object side to the image side. The second lens group G2 consists of three lenses including the lenses L21 to L23 and the aperture stop St in order from the object side to the image side. The third lens group G3 consists of one lens that is the lens L31. The fourth lens group G4 consists of one lens that is the lens L41. The lens L12 is a compound aspherical lens.

During changing the magnification from the wide angle end to the telephoto end, the fourth lens group G4 is fixed with respect to the image plane Sim, and other lens groups move along the optical axis Z by changing their spacings with respect to their adjacent lens groups. The focusing lens group consists of the third lens group G3. During the focusing from the infinite distance object to the nearest object, the third lens group G3 moves to the object side, and other lens groups are fixed with respect to the image plane Sim. The vibration-proof group consists of three lenses including the lenses L21 to L23. In FIG. 13, a lens group that is fixed with respect to the image plane Sim during changing the magnification is illustrated by a straight dotted line in an up-down direction instead of a solid line arrow of the moving path. This illustration method related to the lens group that is fixed with respect to the image plane Sim during changing the magnification also applies to the following examples.

Figure 14:
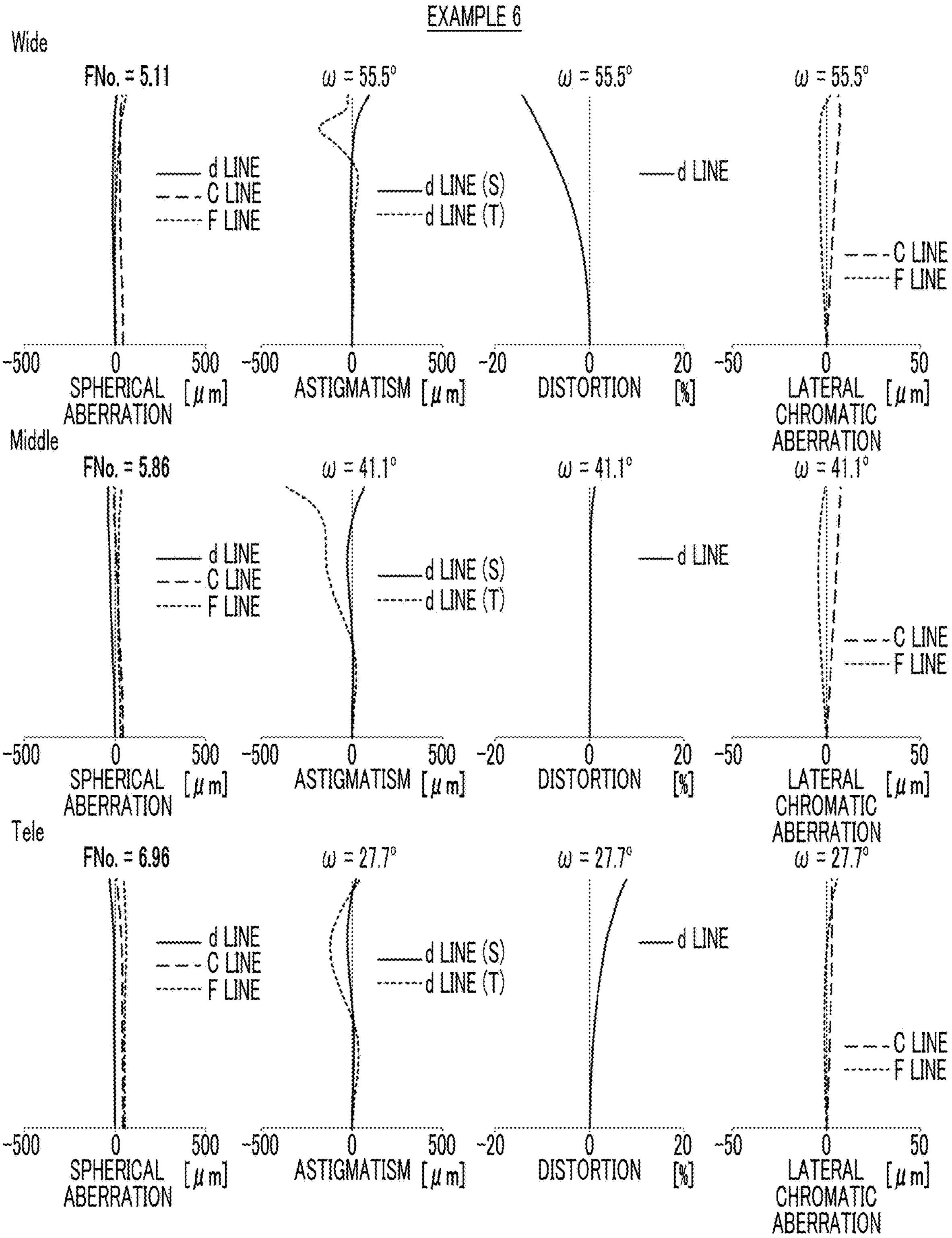
FIG. 14 is each aberration diagram of the variable magnification optical system of Example 6.

For the variable magnification optical system of Example 6, basic lens data is shown in Table 16, specifications and variable surface spacings are shown in Table 17, aspherical coefficients are shown in Table 18, and each aberration diagram is illustrated in FIG. 14.

TABLE 16

| Example 6 | | | | | | | |
|---|---|---|---|---|---|---|---|
| Sn | R | D | Nd | νd | θg, F | ED | NG1L + 0.01 × νG1L |
| 1 | 30.9515 | 0.9998 | 1.65160 | 58.54 | 0.53901 | | 2.23700 |
| 2 | 15.0603 | 4.2253 | | | | 26.31 | |
| 3 | 24.0499 | 0.6490 | 1.64000 | 60.08 | 0.53704 | | 2.24080 |
| 4 | 12.1907 | 0.1000 | 1.51876 | 54.04 | 0.55927 | | |
| *5 | 12.2218 | 6.1419 | | | | | |
| *6 | 78.9960 | 1.1189 | 1.54436 | 56.03 | 0.56178 | 21.05 | 2.10466 |
| *7 | 16.8044 | 0.7480 | | | | 20.03 | |
| 8 | 27.0672 | 1.8998 | 1.95906 | 17.47 | 0.65993 | | 2.13376 |
| 9 | 43.5278 | DD[9] | | | | | |
| *10 | 9.6945 | 2.2560 | 1.66121 | 20.35 | 0.66162 | | |
| *11 | 20.9241 | 0.2602 | | | | | |
| 12 | 57.4672 | 1.4169 | 2.00272 | 19.32 | 0.64514 | | |
| 13 | 11.3095 | 0.2376 | | | | | |
| 14 | 16.7101 | 1.5083 | 1.72916 | 54.68 | 0.54451 | | |
| 15 | −24.3191 | 2.3063 | | | | | |
| 16 (St) | ∞ | DD[16] | | | | | |
| 17 | 125.5293 | 3.2095 | 1.43875 | 94.66 | 0.53402 | | |
| 18 | −15.7059 | DD[18] | | | | | |
| *19 | −21.1372 | 3.0000 | 1.54436 | 56.03 | 0.56178 | | |
| *20 | −52.2299 | 17.0300 | | | | | |

TABLE 17

| Example 6 | | | |
|---|---|---|---|
| | Wide | Middle | Tele |
| Zr | 1.0 | 1.4 | 2.2 |
| f | 11.38 | 16.09 | 25.03 |
| Bf | 17.03 | 17.03 | 17.03 |
| FNo. | 5.11 | 5.86 | 6.96 |
| 2ω [°] | 111.0 | 82.2 | 55.4 |
| DD[9] | 21.67 | 12.01 | 1.90 |
| DD[16] | 11.65 | 14.69 | 9.57 |
| DD[18] | 1.29 | 5.31 | 15.99 |

TABLE 18

Example 6

| Sn | 5 | 6 | 7 |
|---|---|---|---|
| KA | 1.0000000E+00 | 1.0000000E+00 | 1.0000000E+00 |
| A4 | −1.5349362E−05 | −7.9562570E−06 | −5.1201558E−05 |
| A6 | 2.1763740E−07 | 1.9020094E−07 | −3.8333535E−07 |
| A8 | −1.4083218E−10 | −3.2570118E−09 | 1.5249139E−09 |
| A10 | 8.7175931E−13 | 3.5023109E−11 | −1.2541753E−11 |
| A12 | 1.7117746E−14 | −1.7793642E−13 | −4.2603422E−14 |

| Sn | 10 | 11 |
|---|---|---|
| KA | 1.0000000E+00 | 1.0000000E+00 |
| A4 | 2.0693933E−05 | 9.3486498E−05 |
| A6 | −2.0028603E−07 | 7.2501884E−07 |
| A8 | 2.9531644E−08 | −4.8399286E−08 |
| A10 | 2.1111292E−11 | 3.5882195E−09 |

| Sn | 19 | 20 |
|---|---|---|
| KA | 1.0000000E+00 | 1.0000000E+00 |
| A4 | 3.3136192E−05 | 1.1658830E−04 |
| A6 | 7.5953225E−07 | 1.3146276E−07 |

TABLE 18-continued

| Sn | 19 | 20 |
|---|---|---|
| A8 | −3.5954715E−08 | −9.2076502E−09 |
| A10 | 5.4638274E−10 | 1.2984352E−10 |
| A12 | −3.4392209E−12 | −7.2127433E−13 |

Example 7

Figure 15:
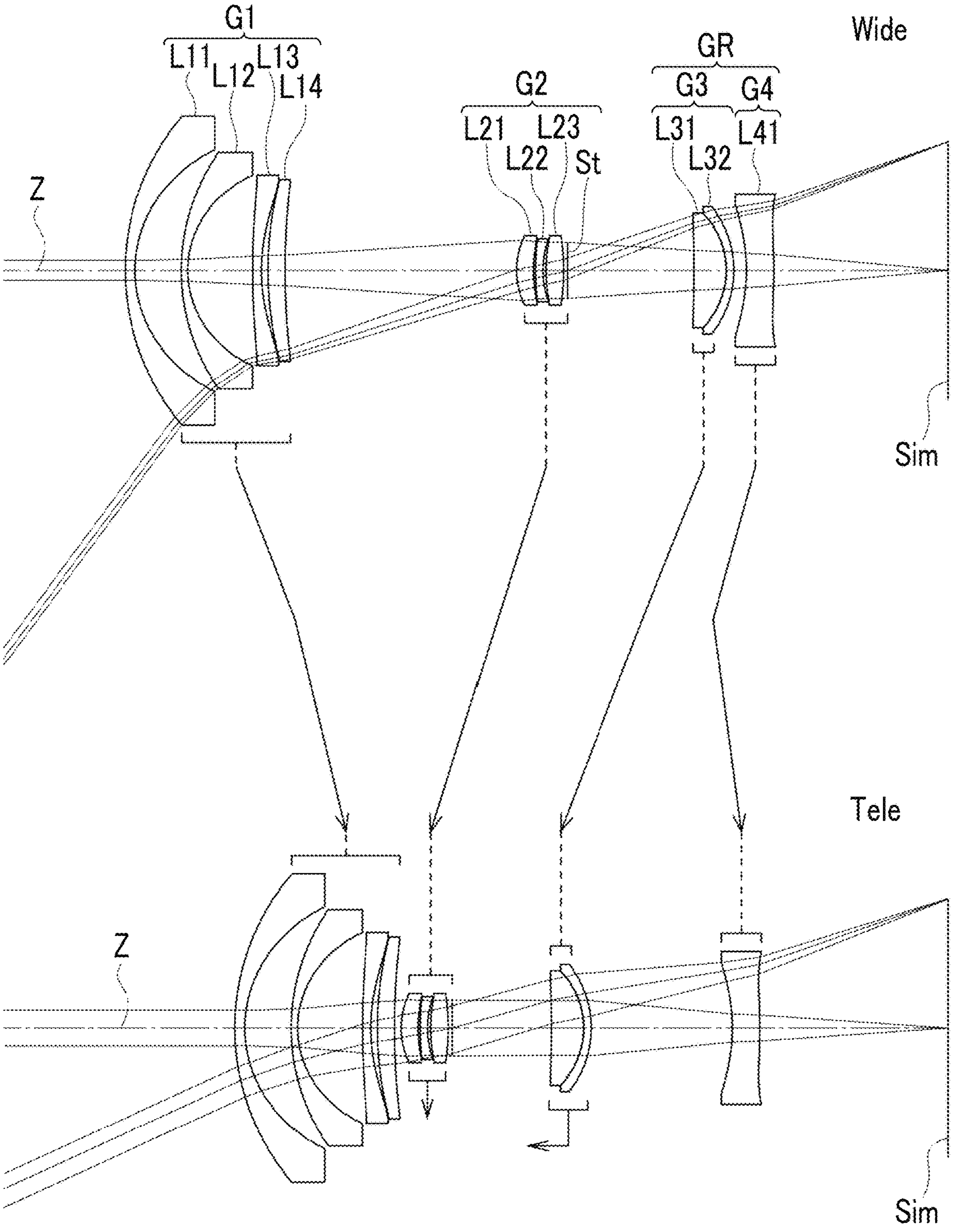
FIG. 15 is a diagram illustrating a cross-sectional view and a moving path of a configuration of a variable magnification optical system of Example 7.

A configuration and a moving path of a variable magnification optical system of Example 7 are illustrated in FIG. 15. The variable magnification optical system of Example 7 consists of, in order from the object side to the image side, the first lens group G1 having a negative refractive power, the second lens group G2 having a positive refractive power, the third lens group G3 having a positive refractive power, and the fourth lens group G4 having a negative refractive power. The subsequent group GR consists of two lens groups including the third lens group G3 and the fourth lens group G4. The first lens group G1 consists of four lenses including the lenses L11 to L14 in order from the object side to the image side. The second lens group G2 consists of three lenses including the lenses L21 to L23 and the aperture stop St in order from the object side to the image side. The third lens group G3 consists of two lenses including lenses L31 and L32 in order from the object side to the image side. The fourth lens group G4 consists of one lens that is the lens L41.

During changing the magnification from the wide angle end to the telephoto end, all lens groups move along the optical axis Z by changing their spacings with respect to their adjacent lens groups. The focusing lens group consists of the third lens group G3. During the focusing from the infinite distance object to the nearest object, the third lens group G3 moves to the object side, and other lens groups are fixed with respect to the image plane Sim. The vibration-proof group consists of three lenses including the lenses L21 to L23.

Figure 16:
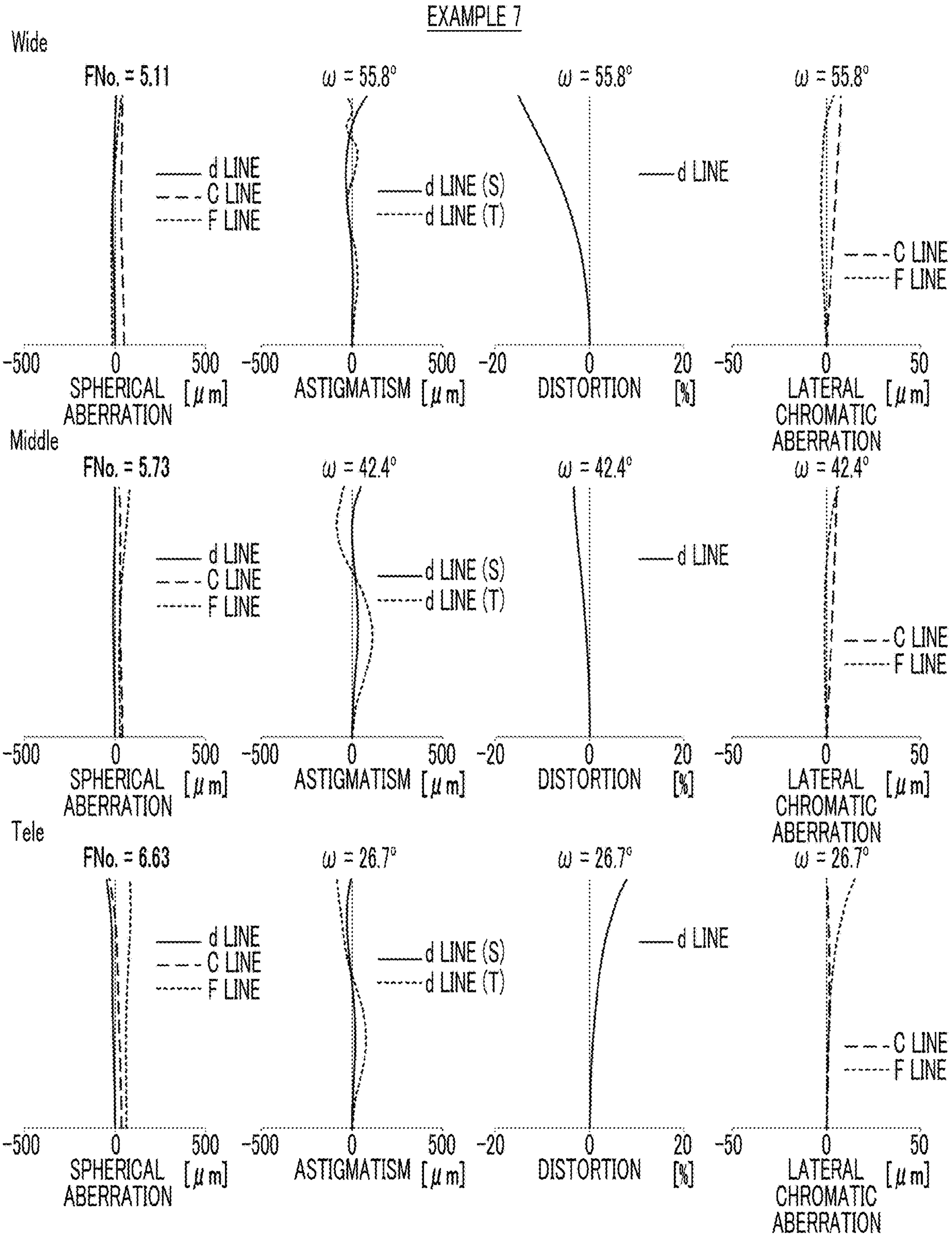
FIG. 16 is each aberration diagram of the variable magnification optical system of Example 7.

For the variable magnification optical system of Example 7, basic lens data is shown in Table 19, specifications and variable surface spacings are shown in Table 20, aspherical coefficients are shown in Table 21, and each aberration diagram is illustrated in FIG. 16.

TABLE 19

Example 7

| Sn | R | D | Nd | νd | θg, F | ED | NG1L + 0.01 × νG1L |
|---|---|---|---|---|---|---|---|
| 1 | 28.1549 | 1.0074 | 1.65160 | 58.54 | 0.53901 | | 2.23700 |
| 2 | 15.0603 | 4.6440 | | | | 26.60 | |
| 3 | 24.5707 | 0.6467 | 1.64000 | 60.08 | 0.53704 | | 2.24080 |
| 4 | 11.7364 | 6.5085 | | | | | |
| *5 | 91.3532 | 0.8749 | 1.54436 | 56.03 | 0.56178 | 20.75 | 2.10466 |
| *6 | 21.3895 | 0.6649 | | | | 20.04 | |
| 7 | 42.9233 | 1.7135 | 1.95906 | 17.47 | 0.65993 | | 2.13376 |
| 8 | 89.9532 | DD[8] | | | | | |
| *9 | 9.5846 | 1.7024 | 1.66121 | 20.35 | 0.66162 | | |
| *10 | 18.0273 | 0.1888 | | | | | |
| 11 | 29.5851 | 0.7465 | 2.00272 | 19.32 | 0.64514 | | |
| 12 | 10.7466 | 0.3099 | | | | | |
| 13 | 18.7253 | 1.7718 | 1.72916 | 54.68 | 0.54451 | | |
| 14 | −26.1858 | 0.3979 | | | | | |
| 15 (St) | ∞ | DD[15] | | | | | |
| 16 | −225.8891 | 3.2600 | 1.49700 | 81.54 | 0.53748 | | |
| 17 | −9.6927 | 0.7499 | 1.90525 | 35.04 | 0.58486 | | |
| 18 | −12.1780 | DD[18] | | | | | |
| *19 | −20.8224 | 2.7458 | 1.54436 | 56.03 | 0.56178 | | |
| *20 | −62.0097 | DD[20] | | | | | |

TABLE 20

| Example 7 | | | |
|---|---|---|---|
| | Wide | Middle | Tele |
| Zr | 1.0 | 1.4 | 2.3 |
| f | 11.36 | 16.06 | 26.12 |
| Bf | 17.53 | 21.76 | 18.93 |
| FNo. | 5.11 | 5.73 | 6.63 |
| 2ω [°] | 111.6 | 84.8 | 53.4 |
| DD[8] | 23.17 | 12.46 | 0.67 |
| DD[15] | 12.70 | 11.40 | 9.84 |
| DD[18] | 1.25 | 3.15 | 14.19 |
| DD[20] | 17.53 | 21.76 | 18.93 |

TABLE 21

Example 7

| | Sn | | | |
|---|---|---|---|---|
| | 5 | 6 | 19 | 20 |
| KA | 1.0000000E+00 | 1.0000000E+00 | 1.0000000E+00 | 1.0000000E+00 |
| A4 | −5.9755217E−06 | −4.4705476E−05 | 6.9220809E−05 | 1.4805795E−04 |
| A6 | 6.1678896E−08 | −2.2801537E−07 | 7.9362784E−07 | 1.9672505E−07 |
| A8 | −2.9075639E−09 | 7.8969626E−10 | −3.7402804E−08 | −9.4639577E−09 |
| A10 | 3.5816906E−11 | −8.9221503E−12 | 6.1379722E−10 | 1.5122740E−10 |
| A12 | −1.8225297E−13 | −5.3187853E−14 | −3.9212122E−12 | −8.6798362E−13 |

| | Sn | |
|---|---|---|
| | 9 | 10 |
| KA | 1.0000000E+00 | 1.0000000E+00 |
| A4 | 1.6138717E−05 | 6.2618362E−05 |
| A6 | −1.2522888E−07 | 7.4092425E−07 |
| A8 | 3.5149200E−08 | −2.0139856E−08 |
| A10 | −4.4555075E−10 | 1.2338528E−09 |

Example 8

Figure 17:
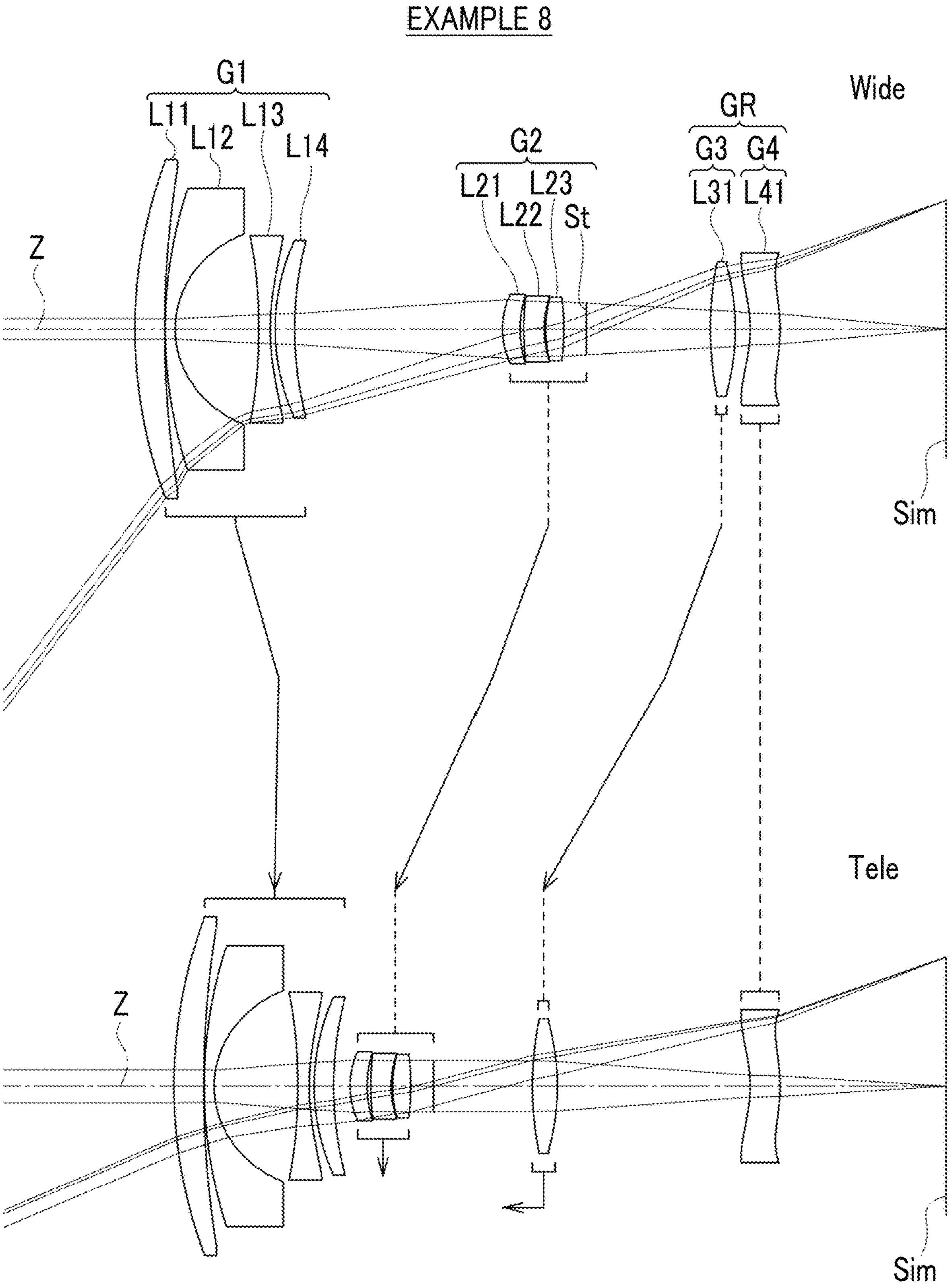
FIG. 17 is a diagram illustrating a cross-sectional view and a moving path of a configuration of a variable magnification optical system of Example 8.

A configuration and a moving path of a variable magnification optical system of Example 8 are illustrated in FIG. 17. The variable magnification optical system of Example 8 consists of, in order from the object side to the image side, the first lens group G1 having a negative refractive power, the second lens group G2 having a positive refractive power, the third lens group G3 having a positive refractive power, and the fourth lens group G4 having a negative refractive power. The subsequent group GR consists of two lens groups including the third lens group G3 and the fourth lens group G4. The first lens group G1 consists of four lenses including the lenses L11 to L14 in order from the object side to the image side. The second lens group G2 consists of three lenses including the lenses L21 to L23 and the aperture stop St in order from the object side to the image side. The third lens group G3 consists of one lens that is the lens L31. The fourth lens group G4 consists of one lens that is the lens L41.

During changing the magnification from the wide angle end to the telephoto end, the fourth lens group G4 is fixed with respect to the image plane Sim, and other lens groups move along the optical axis Z by changing their spacings with respect to their adjacent lens groups. The focusing lens group consists of the third lens group G3. During the focusing from the infinite distance object to the nearest object, the third lens group G3 moves to the object side, and other lens groups are fixed with respect to the image plane Sim. The vibration-proof group consists of three lenses including the lenses L21 to L23.

Figure 18:
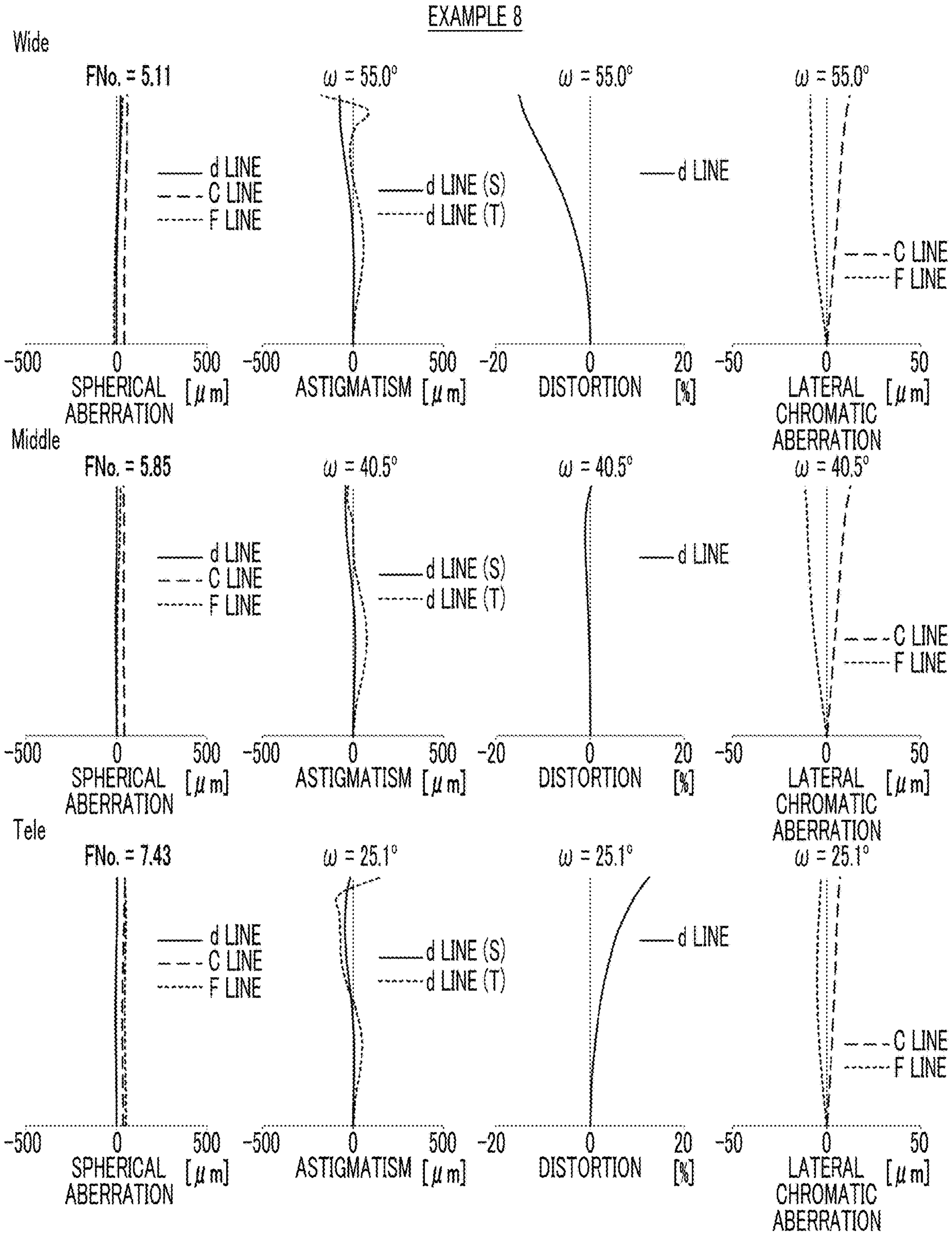
FIG. 18 is each aberration diagram of the variable magnification optical system of Example 8.

For the variable magnification optical system of Example 8, basic lens data is shown in Table 22, specifications and variable surface spacings are shown in Table 23, aspherical coefficients are shown in Table 24, and each aberration diagram is illustrated in FIG. 18.

TABLE 22

Example 8

| Sn | R | D | Nd | νd | θg, F | ED | NG1L + 0.01 × νG1L |
|---|---|---|---|---|---|---|---|
| 1 | 58.0502 | 2.9855 | 1.48749 | 70.24 | 0.53007 | | 2.18989 |
| 2 | 122.3975 | 0.0500 | | | | | |
| 3 | 54.6086 | 1.0000 | 1.75500 | 52.32 | 0.54757 | | 2.27820 |
| 4 | 11.4381 | 8.3925 | | | | 21.02 | |
| *5 | −77.3072 | 1.1512 | 1.54436 | 56.03 | 0.56178 | 20.65 | 2.10466 |
| *6 | 28.2014 | 0.5001 | | | | 19.85 | |
| 7 | 25.6954 | 1.9524 | 1.95906 | 17.47 | 0.65993 | | 2.13376 |

TABLE 22-continued

| Example 8 | | | | | | | |
|---|---|---|---|---|---|---|---|
| Sn | R | D | Nd | νd | θg, F | ED | NG1L + 0.01 × νG1L |
| 8 | 42.0031 | DD[8] | | | | | |
| *9 | 9.8684 | 1.7710 | 1.66121 | 20.35 | 0.66162 | | |
| *10 | 13.7826 | 0.3581 | | | | | |
| 11 | 30.5666 | 2.0501 | 2.00272 | 19.32 | 0.64514 | | |
| 12 | 11.7395 | 0.1585 | | | | | |
| 13 | 14.7771 | 1.8124 | 1.72916 | 54.68 | 0.54451 | | |
| 14 | −30.4967 | 2.2790 | | | | | |
| 15 (St) | ∞ | DD[15] | | | | | |
| 16 | 41.0204 | 2.5005 | 1.43875 | 94.66 | 0.53402 | | |
| 17 | −28.8036 | DD[17] | | | | | |
| *18 | −15.8489 | 3.0000 | 1.54436 | 56.03 | 0.56178 | | |
| *19 | −19.9697 | 16.7300 | | | | | |

TABLE 23

| Example 8 | | | |
|---|---|---|---|
| | Wide | Middle | Tele |
| Zr | 1.0 | 1.4 | 2.3 |
| f | 11.73 | 16.58 | 26.97 |
| Bf | 16.73 | 16.73 | 16.73 |
| FNo. | 5.11 | 5.85 | 7.43 |
| 2ω [°] | 110.0 | 81.0 | 50.2 |
| DD[8] | 20.84 | 10.93 | 1.65 |
| DD[15] | 12.49 | 12.43 | 9.86 |
| DD[17] | 1.49 | 7.15 | 19.40 |

TABLE 24

| Example 8 | | | | |
|---|---|---|---|---|
| | Sn | | | |
| | 5 | 6 | 18 | 19 |
| KA | 1.0000000E+00 | 1.0000000E+00 | 1.0000000E+00 | 1.0000000E+00 |
| A4 | −2.8964777E−05 | −6.1246923E−05 | 3.2980077E−04 | 3.4349034E−04 |
| A6 | 9.9230973E−08 | 2.5957763E−08 | 6.7804200E−07 | 7.7831456E−07 |
| A8 | 1.0287633E−10 | 6.1825164E−10 | −4.0067226E−08 | −1.5671603E−08 |
| A10 | 1.0082632E−11 | 1.0949247E−11 | 4.7546341E−10 | 9.3739793E−11 |
| A12 | −8.5746587E−14 | −1.4831158E−13 | −2.1384872E−12 | −1.2606162E−13 |

| | Sn | |
|---|---|---|
| | 9 | 10 |
| KA | 1.0000000E+00 | 1.0000000E+00 |
| A4 | 2.8895245E−06 | 7.3488641E−05 |
| A6 | 6.9658700E−07 | 1.6492673E−06 |
| A8 | 7.0862634E−08 | 4.9045973E−08 |
| A10 | −2.2426313E−09 | −1.5099422E−09 |

Example 9

Figure 19:
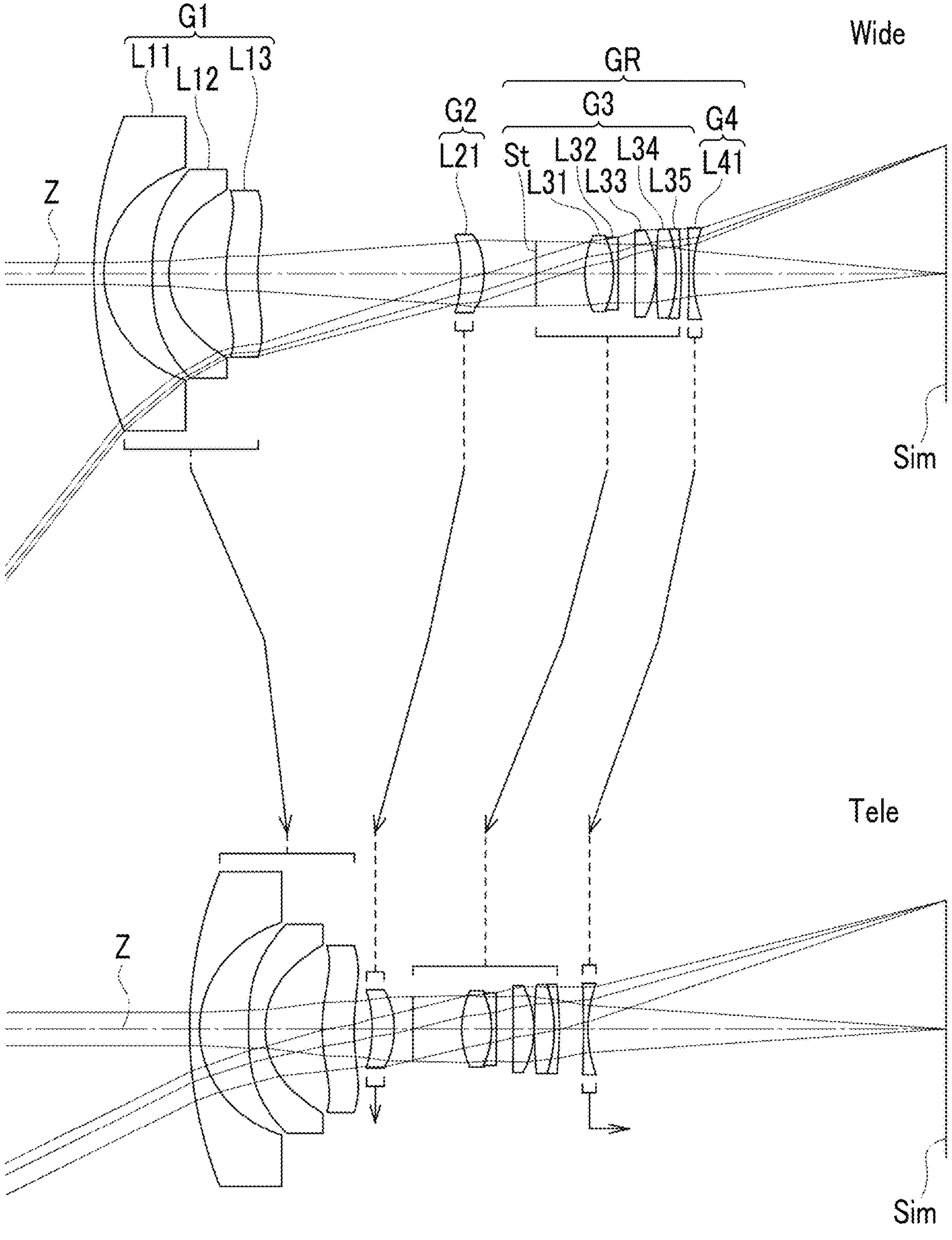
FIG. 19 is a diagram illustrating a cross-sectional view and a moving path of a configuration of a variable magnification optical system of Example 9.

A configuration and a moving path of a variable magnification optical system of Example 9 are illustrated in FIG. 19. The variable magnification optical system of Example 9 consists of, in order from the object side to the image side, the first lens group G1 having a negative refractive power, the second lens group G2 having a positive refractive power, the third lens group G3 having a positive refractive power, and the fourth lens group G4 having a negative refractive power. The subsequent group GR consists of two lens groups including the third lens group G3 and the fourth lens group G4. The first lens group G1 consists of three lenses including the lenses L11 to L13 in order from the object side to the image side. The second lens group G2 consists of one lens that is the lens L21. The third lens group G3 consists of the aperture stop St and five lenses including lenses L31 to L35 in order from the object side to the image side. The fourth lens group G4 consists of one lens that is the lens L41.

During changing the magnification from the wide angle end to the telephoto end, all lens groups move along the optical axis Z by changing their spacings with respect to their adjacent lens groups. The focusing lens group consists of the fourth lens group G4. During the focusing from the infinite distance object to the nearest object, the fourth lens group G4 moves to the image side, and other lens groups are fixed with respect to the image plane Sim. The vibration-proof group consists of the second lens group G2.

Figure 20:
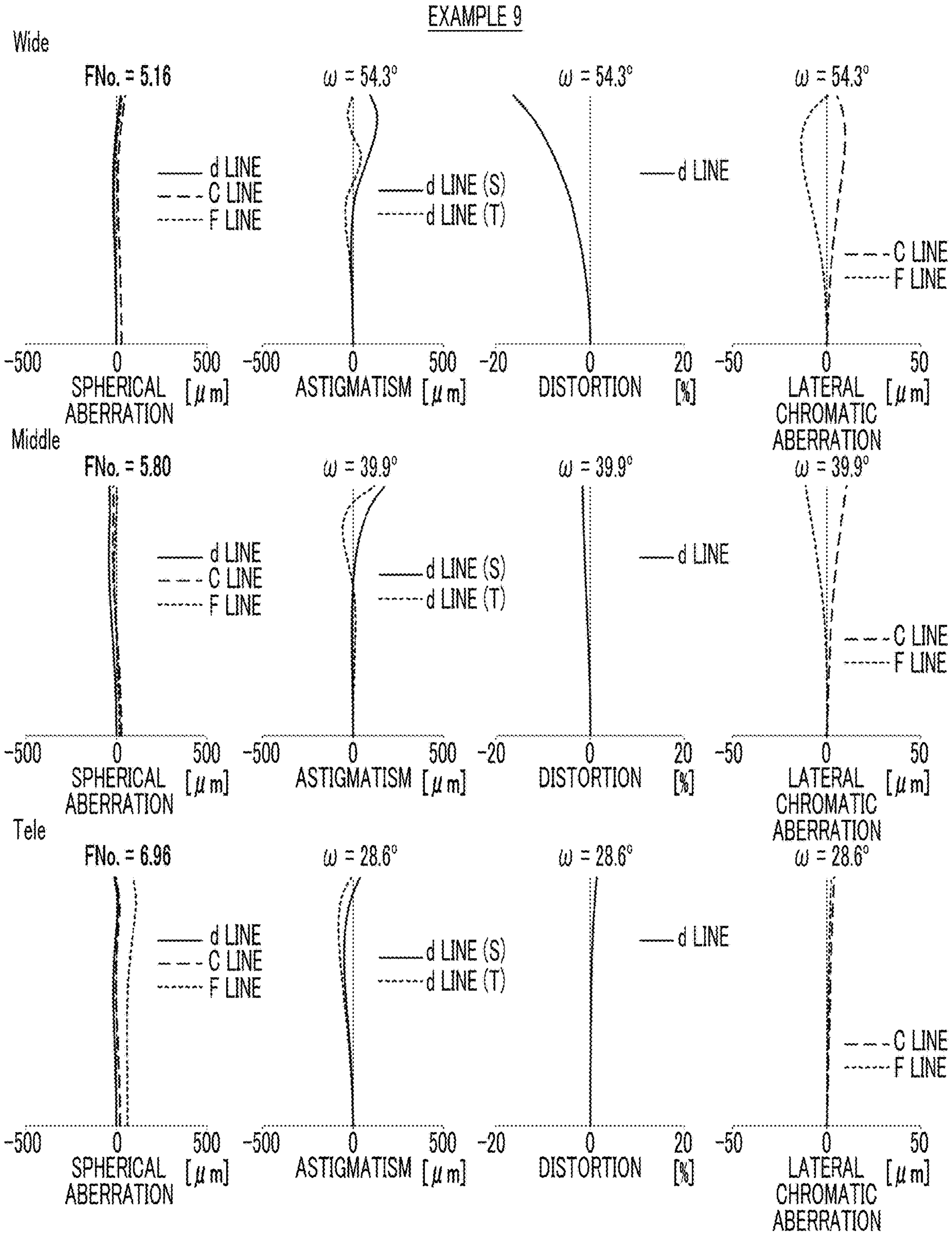
FIG. 20 is each aberration diagram of the variable magnification optical system of Example 9.

For the variable magnification optical system of Example 9, basic lens data is shown in Table 25, specifications and variable surface spacings are shown in Table 26, aspherical coefficients are shown in Table 27, and each aberration diagram is illustrated in FIG. 20.

TABLE 25

| Example 9 | | | | | | | |
|---|---|---|---|---|---|---|---|
| Sn | R | D | Nd | νd | θg, F | ED | NG1L + 0.01 × νG1L |
| 1 | 51.2932 | 1.0002 | 1.48749 | 70.24 | 0.53007 | | 2.18989 |
| 2 | 12.4999 | 4.9263 | | | | 23.52 | |
| *3 | 45.8716 | 1.6767 | 1.54436 | 56.03 | 0.56178 | 23.09 | 2.10466 |
| *4 | 10.7063 | 5.7315 | | | | 18.61 | |
| *5 | 19.3149 | 3.2097 | 1.66121 | 20.35 | 0.66162 | | 1.86471 |
| *6 | 25.4331 | DD[6] | | | | | |
| *7 | −20.4673 | 2.2304 | 1.54436 | 56.03 | 0.56178 | | |
| *8 | −10.6539 | DD[8] | | | | | |
| 9 (St) | ∞ | 4.9167 | | | | | |
| 10 | 11.1434 | 2.9303 | 1.43875 | 94.66 | 0.53402 | | |
| 11 | −10.2336 | 0.4761 | 1.88300 | 39.22 | 0.57288 | | |
| 12 | −603.1516 | 1.7041 | | | | | |
| 13 | −288.4823 | 2.0725 | 1.60342 | 38.03 | 0.58356 | | |
| 14 | −11.0389 | 0.0502 | | | | | |
| 15 | 60.2318 | 2.0098 | 1.52841 | 76.45 | 0.53954 | | |
| 16 | −16.6380 | 0.4998 | 1.72916 | 54.68 | 0.54451 | | |
| *17 | −37.7346 | DD[17] | | | | | |
| 18 | −135.5969 | 0.4412 | 1.77535 | 50.31 | 0.55042 | | |
| 19 | 15.7746 | DD[19] | | | | | |

TABLE 26

| Example 9 | | | |
|---|---|---|---|
| | Wide | Middle | Tele |
| Zr | 1.0 | 1.4 | 2.1 |
| f | 12.22 | 17.28 | 25.67 |
| Bf | 25.48 | 29.15 | 36.13 |
| FNo. | 5.16 | 5.80 | 6.96 |
| 2ω [°] | 108.6 | 79.8 | 57.2 |

TABLE 26-continued

| Example 9 | | | |
|---|---|---|---|
| | Wide | Middle | Tele |
| DD[6] | 20.48 | 9.46 | 1.86 |
| DD[8] | 5.25 | 4.33 | 1.87 |
| DD[17] | 0.77 | 1.64 | 2.43 |
| DD[19] | 25.48 | 29.15 | 36.13 |

TABLE 27

| Example 9 | | | | |
|---|---|---|---|---|
| | Sn | | | |
| | 3 | 4 | 5 | 6 |
| KA | 1.0000000E+00 | 1.0000000E+00 | 1.0000000E+00 | 1.0000000E+00 |
| A4 | 2.4609490E−04 | 1.6579350E−04 | −2.2817861E−04 | −2.3758865E−04 |
| A6 | −1.2458317E−06 | 6.5067691E−07 | −7.9652574E−08 | −4.9091030E−07 |
| A8 | 2.8181619E−09 | −2.0117588E−08 | −9.4334848E−09 | 7.1129287E−09 |
| A10 | 0.0000000E+00 | −2.7063806E−11 | 6.7249834E−11 | −1.9223715E−11 |

| | Sn | | |
|---|---|---|---|
| | 7 | 8 | 17 |
| KA | 1.0000000E+00 | 1.0000000E+00 | 1.0000000E+00 |
| A4 | −4.1132025E−04 | −2.5549446E−04 | 1.4348698E−04 |
| A6 | −5.4718127E−06 | −3.6337742E−06 | 9.3304013E−07 |
| A8 | −2.0173520E−08 | 2.4117375E−09 | −2.0844378E−09 |
| A10 | −6.4383003E−09 | −3.5250322E−09 | 1.9541000E−10 |

Example 10

Figure 21:
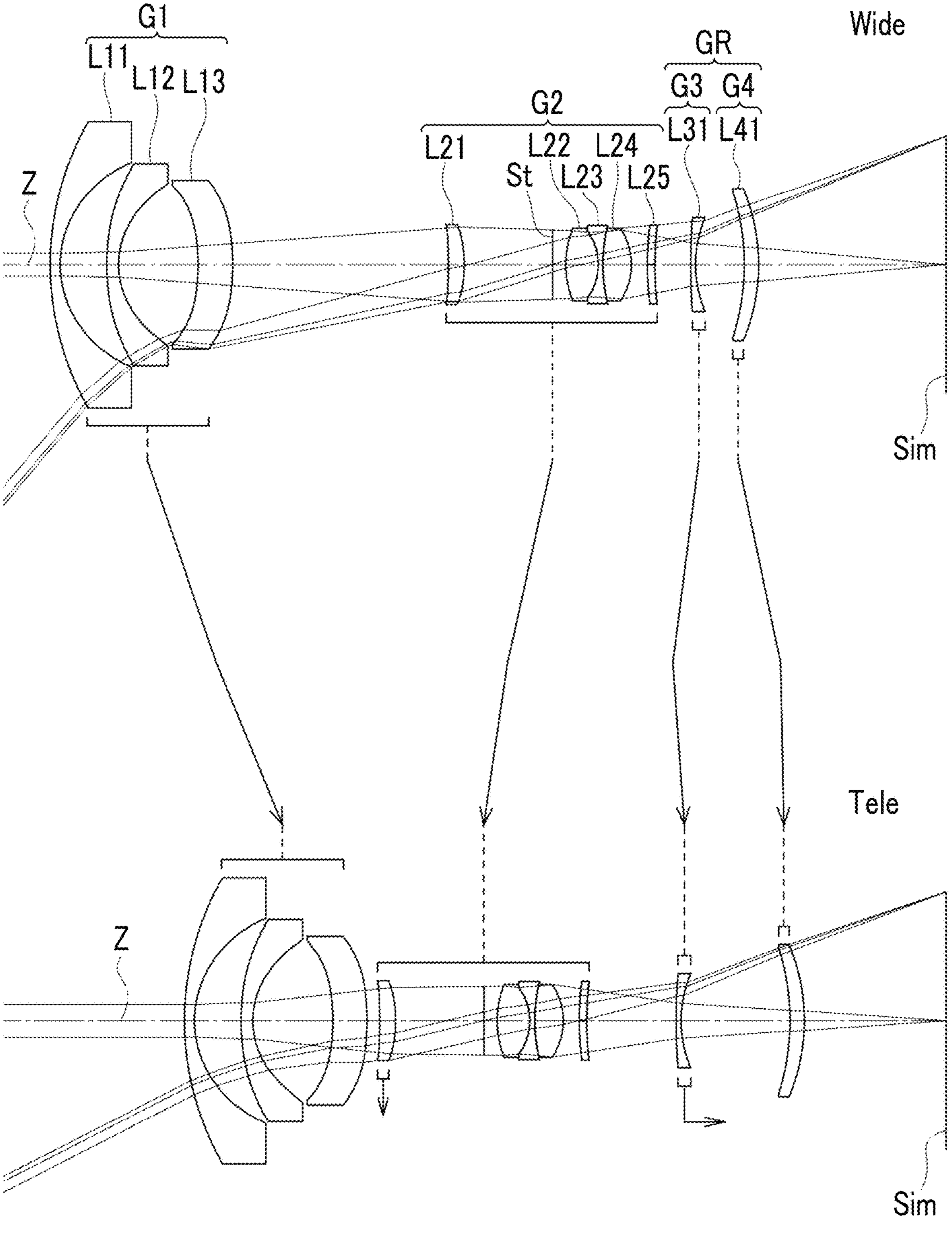
FIG. 21 is a diagram illustrating a cross-sectional view and a moving path of a configuration of a variable magnification optical system of Example 10.

A configuration and a moving path of a variable magnification optical system of Example 10 are illustrated in FIG. 21. The variable magnification optical system of Example 10 consists of, in order from the object side to the image side, the first lens group G1 having a negative refractive power, the second lens group G2 having a positive refractive power, the third lens group G3 having a negative refractive power, and the fourth lens group G4 having a positive refractive power. The subsequent group GR consists of two lens groups including the third lens group G3 and the fourth lens group G4. The first lens group G1 consists of three lenses including the lenses L11 to L13 in order from the object side to the image side. The second lens group G2 consists of the lens L21, the aperture stop St, and the lenses L22 to L25 in order from the object side to the image side. The third lens group G3 consists of one lens that is the lens L31. The fourth lens group G4 consists of one lens that is the lens L41.

During changing the magnification from the wide angle end to the telephoto end, all lens groups move along the optical axis Z by changing their spacings with respect to their adjacent lens groups. The focusing lens group consists of the third lens group G3. During the focusing from the infinite distance object to the nearest object, the third lens group G3 moves to the image side, and other lens groups are fixed with respect to the image plane Sim. The vibration-proof group consists of the lens L21.

Figure 22:
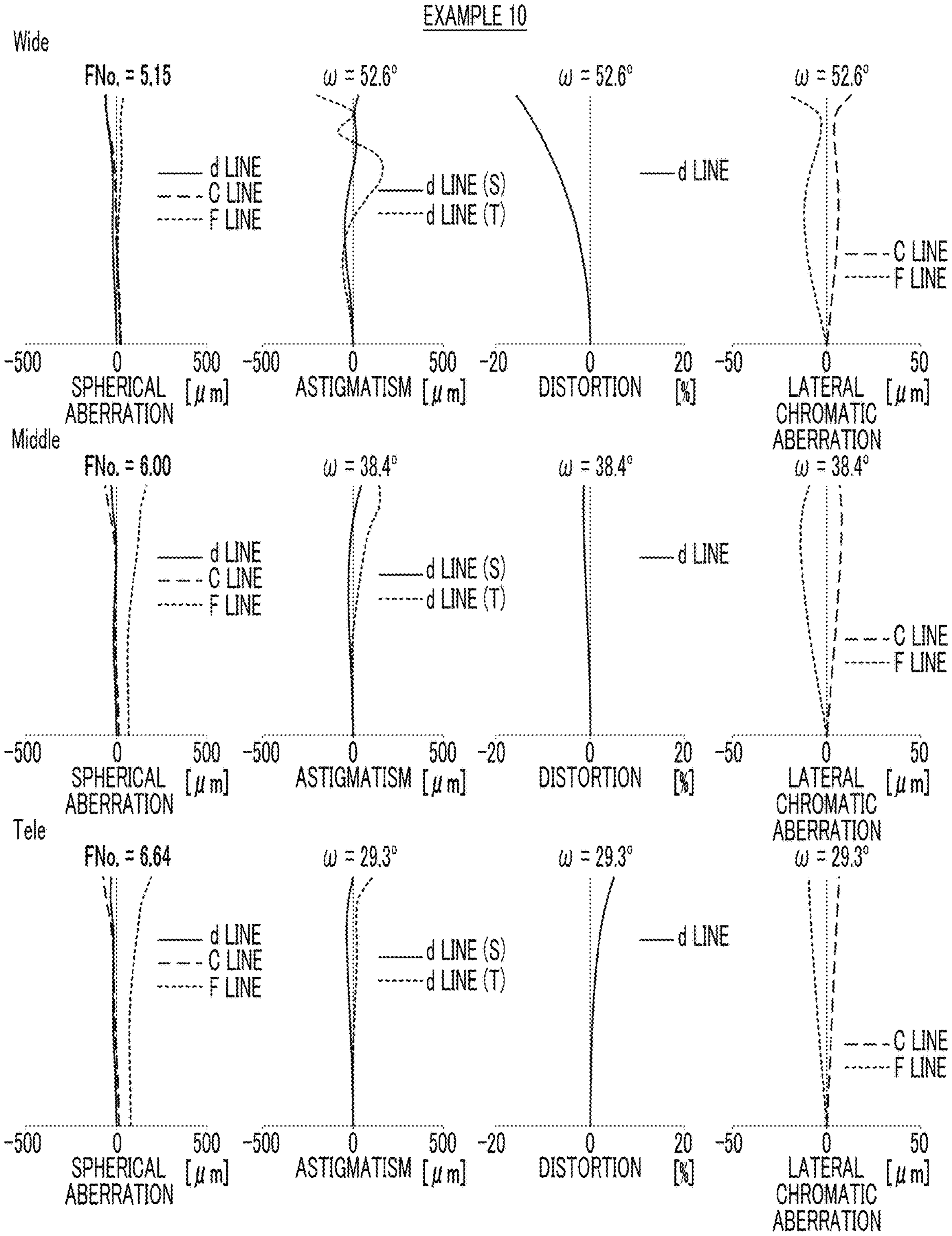
FIG. 22 is each aberration diagram of the variable magnification optical system of Example 10.

For the variable magnification optical system of Example 10, basic lens data is shown in Table 28, specifications and variable surface spacings are shown in Table 29, aspherical coefficients are shown in Table 30, and each aberration diagram is illustrated in FIG. 22.

TABLE 28

| Example 10 | | | | | | | |
|---|---|---|---|---|---|---|---|
| Sn | R | D | Nd | νd | θg, F | ED | NG1L + 0.01 × νG1L |
| 1 | 34.6204 | 0.9999 | 1.48749 | 70.24 | 0.53007 | | 2.18989 |
| 2 | 12.5001 | 4.6865 | | | | 22.61 | |
| *3 | 29.3939 | 1.1770 | 1.53409 | 55.87 | 0.55858 | 22.27 | 2.09279 |
| *4 | 9.9200 | 8.0358 | | | | 17.92 | |
| *5 | −26.4469 | 3.4807 | 1.66121 | 20.35 | 0.66162 | | 1.86471 |
| *6 | −29.2948 | DD[6] | | | | | |
| *7 | −110.5349 | 1.6024 | 1.53409 | 55.87 | 0.55858 | | |
| *8 | −16.5423 | 8.7802 | | | | | |
| 9 (St) | ∞ | 1.3360 | | | | | |
| 10 | 11.6956 | 3.2887 | 1.43875 | 94.66 | 0.53402 | | |
| 11 | −6.6643 | 0.4944 | 1.88300 | 39.22 | 0.57288 | | |
| 12 | 19.7261 | 2.8563 | 1.62004 | 36.26 | 0.58800 | | |
| 13 | −7.8036 | 1.6138 | | | | | |
| *14 | 37.7165 | 0.7502 | 1.43875 | 94.66 | 0.53402 | | |
| *15 | 55.8885 | DD[15] | | | | | |
| 16 | 74.2464 | 0.4959 | 1.85150 | 40.78 | 0.56958 | | |
| 17 | 14.4958 | DD[17] | | | | | |
| 18 | −28.6513 | 1.4378 | 1.48749 | 70.24 | 0.53007 | | |
| 19 | −23.6233 | DD[19] | | | | | |

TABLE 29

| Example 10 | | | |
|---|---|---|---|
| | Wide | Middle | Tele |
| Zr | 1.0 | 1.4 | 1.9 |
| f | 12.86 | 18.19 | 24.05 |
| Bf | 18.88 | 14.61 | 14.29 |
| FNo. | 5.15 | 6.00 | 6.64 |
| 2ω [°] | 105.2 | 76.8 | 58.6 |
| DD[6] | 21.70 | 10.32 | 1.27 |
| DD[15] | 3.58 | 5.49 | 9.03 |
| DD[17] | 4.90 | 11.76 | 10.94 |
| DD[19] | 18.88 | 14.61 | 14.29 |

TABLE 30

| Example 10 | | | | |
|---|---|---|---|---|
| | Sn | | | |
| | 3 | 4 | 5 | 6 |
| KA | 1.0000000E+00 | 1.0000000E+00 | 1.0000000E+00 | 1.0000000E+00 |
| A4 | 5.0921846E−05 | 1.3240384E−05 | −1.3351261E−04 | −1.2424635E−04 |
| A6 | 4.3327815E−07 | 5.5524520E−07 | −9.6003628E−07 | −4.5058342E−07 |

TABLE 30-continued

| | | | | |
|---|---|---|---|---|
| A8 | −1.0017594E−08 | −1.4917513E−08 | −3.1246901E−09 | 4.6203345E−09 |
| A10 | 4.4859494E−11 | −1.2182318E−10 | 1.0283004E−10 | 1.0505720E−11 |

| | Sn | | | |
|---|---|---|---|---|
| | 7 | 8 | 14 | 15 |
| KA | 1.0000000E+00 | 1.0000000E+00 | 1.0000000E+00 | 1.0000000E+00 |
| A4 | −2.5777300E−04 | −2.1547724E−04 | 2.2894507E−05 | 2.0034505E−04 |
| A6 | −2.6113718E−06 | −1.6646947E−06 | −2.4271520E−06 | −2.8651768E−06 |
| A8 | −2.5110334E−08 | −6.2767732E−08 | −1.1525576E−07 | −1.1327398E−07 |
| A10 | −3.7004710E−09 | −1.9842423E−09 | 1.2049261E−08 | 1.2568097E−08 |

Example 11

Figure 23:
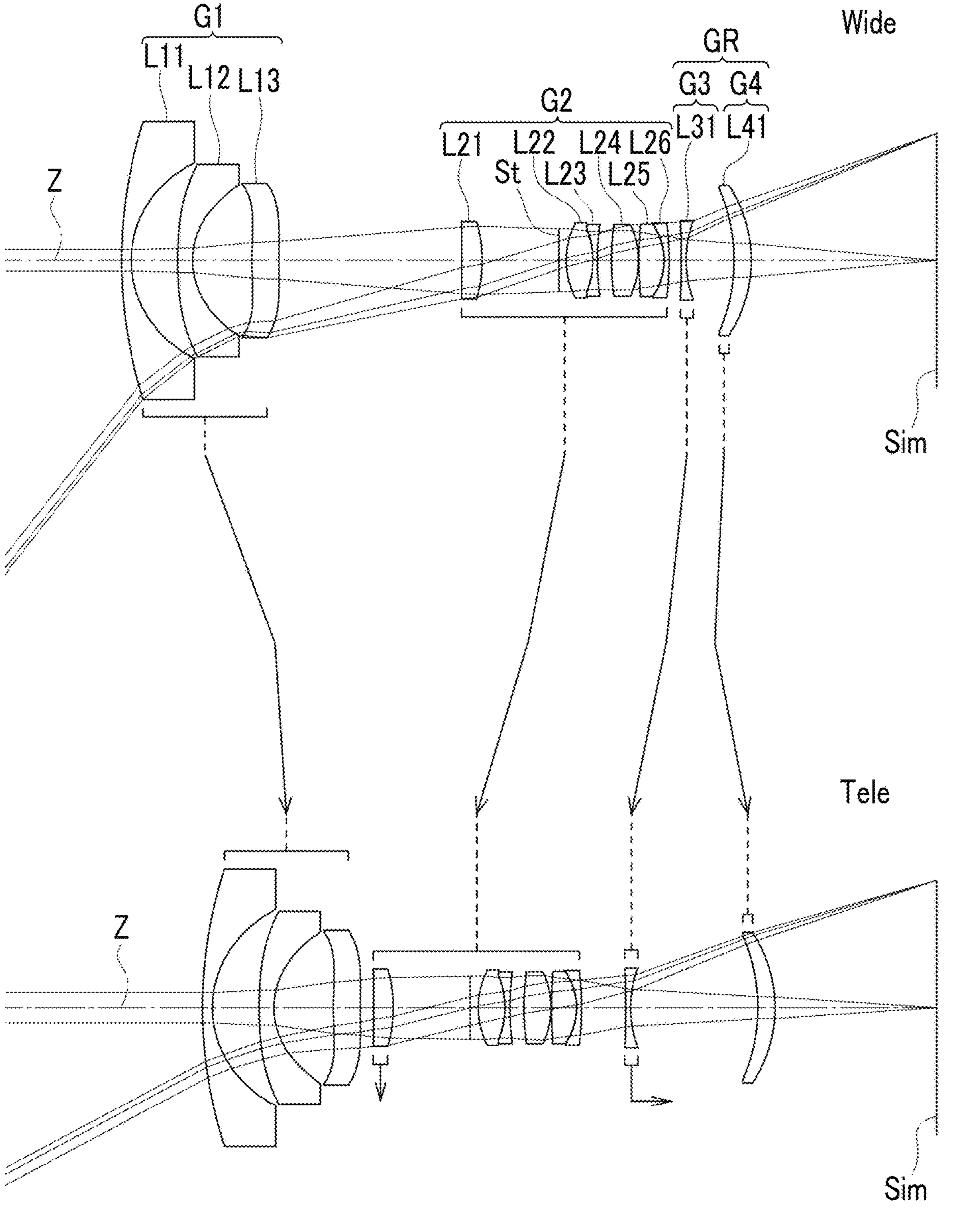
FIG. 23 is a diagram illustrating a cross-sectional view and a moving path of a configuration of a variable magnification optical system of Example 11.

A configuration and a moving path of a variable magnification optical system of Example 11 are illustrated in FIG. 23. The variable magnification optical system of Example 11 consists of, in order from the object side to the image side, the first lens group G1 having a negative refractive power, the second lens group G2 having a positive refractive power, the third lens group G3 having a negative refractive power, and the fourth lens group G4 having a positive refractive power. The subsequent group GR consists of two lens groups including the third lens group G3 and the fourth lens group G4. The first lens group G1 consists of three lenses including the lenses L11 to L13 in order from the object side to the image side. The second lens group G2 consists of the lens L21, the aperture stop St, and the lenses L22 to L26 in order from the object side to the image side. The third lens group G3 consists of one lens that is the lens L31. The fourth lens group G4 consists of one lens that is the lens L41.

During changing the magnification from the wide angle end to the telephoto end, all lens groups move along the optical axis Z by changing their spacings with respect to their adjacent lens groups. The focusing lens group consists of the third lens group G3. During the focusing from the infinite distance object to the nearest object, the third lens group G3 moves to the image side, and other lens groups are fixed with respect to the image plane Sim. The vibration-proof group consists of the lens L21.

Figure 24:
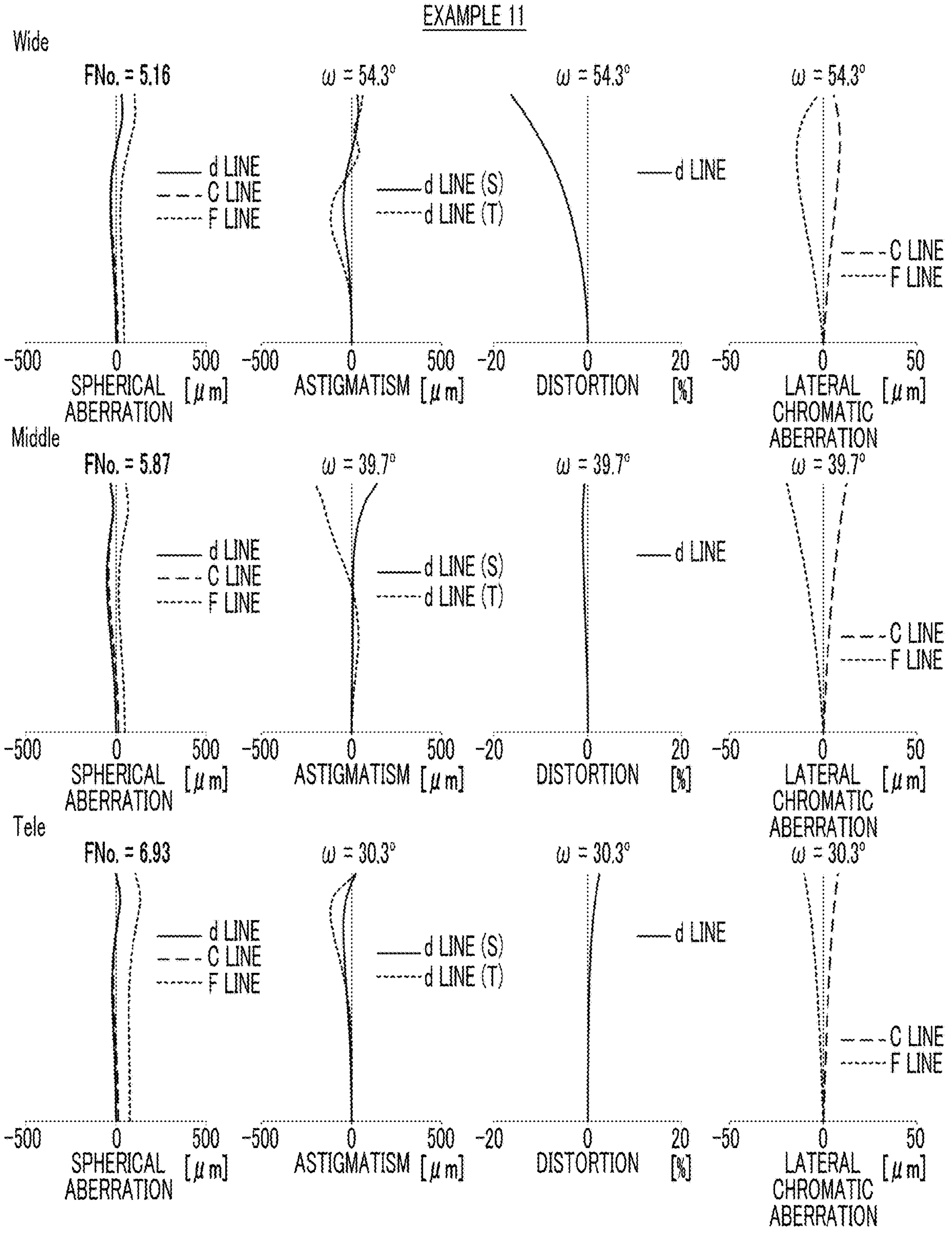
FIG. 24 is each aberration diagram of the variable magnification optical system of Example 11.

For the variable magnification optical system of Example 11, basic lens data is shown in Table 31, specifications and variable surface spacings are shown in Table 32, aspherical coefficients are shown in Table 33, and each aberration diagram is illustrated in FIG. 24.

TABLE 3

| Example 11 | | | | | | | |
|---|---|---|---|---|---|---|---|
| Sn | R | D | Nd | νd | θg, F | ED | NG1L + 0.01 × νG1L |
| 1 | 54.8432 | 0.9998 | 1.48749 | 70.24 | 0.53007 | | 2.18989 |
| 2 | 12.4999 | 4.7588 | | | | 21.87 | |
| *3 | 60.3447 | 1.5025 | 1.53409 | 55.87 | 0.55858 | 21.50 | 2.09279 |
| *4 | 9.5469 | 6.0342 | | | | 16.91 | |
| *5 | 55.7358 | 2.7498 | 1.66121 | 20.35 | 0.66162 | | 1.86471 |
| *6 | 168.6312 | DD[6] | | | | | |
| *7 | 339.9584 | 2.0002 | 1.53409 | 55.87 | 0.55858 | | |
| *8 | −17.7508 | 7.8068 | | | | | |
| 9 (St) | ∞ | 0.7416 | | | | | |
| 10 | 9.9305 | 2.7307 | 1.43875 | 94.66 | 0.53402 | | |
| 11 | −9.9354 | 0.4918 | 1.88300 | 39.22 | 0.57288 | | |
| 12 | 33.6210 | 1.4243 | | | | | |
| 13 | 30.9337 | 2.7498 | 1.60342 | 38.03 | 0.58356 | | |
| 14 | −10.0997 | 0.0498 | | | | | |
| 15 | 56.6205 | 2.5585 | 1.52841 | 76.45 | 0.53954 | | |
| 16 | −7.6603 | 0.5002 | 1.72916 | 54.68 | 0.54451 | | |
| *17 | −32.3471 | DD[17] | | | | | |
| 18 | −104.2153 | 0.4932 | 1.77535 | 50.31 | 0.55042 | | |
| 19 | 13.6890 | DD[19] | | | | | |
| 20 | −21.8770 | 1.7502 | 1.48749 | 70.24 | 0.53007 | | |
| 21 | −16.5444 | DD[21] | | | | | |

TABLE 32

| Example 11 | | | |
|---|---|---|---|
| | Wide | Middle | Tele |
| Zr | 1.0 | 1.4 | 1.9 |
| f | 12.21 | 17.27 | 23.68 |
| Bf | 18.88 | 19.81 | 16.46 |
| FNo. | 5.16 | 5.87 | 6.93 |
| 2ω [°] | 108.6 | 79.4 | 60.6 |
| DD[6] | 18.61 | 7.76 | 1.39 |
| DD[17] | 1.23 | 2.88 | 4.54 |
| DD[19] | 4.88 | 6.04 | 12.93 |
| DD[21] | 18.88 | 19.81 | 16.46 |

TABLE 33

| Example 11 | | | | |
|---|---|---|---|---|
| | Sn | | | |
| | 3 | 4 | 5 | 6 |
| KA | 1.0000000E+00 | 1.0000000E+00 | 1.0000000E+00 | 1.0000000E+00 |
| A4 | 1.5877090E−04 | 6.6891819E−05 | −2.4561559E−04 | −2.4428915E−04 |
| A6 | −1.1277355E−06 | −5.0349980E−07 | −9.7111551E−07 | −1.0468202E−06 |
| A8 | 3.6422008E−09 | −1.2516224E−08 | −7.9864755E−09 | 1.5049568E−08 |
| A10 | 0.0000000E+00 | −1.1669958E−10 | 1.2245401E−10 | −5.2599700E−11 |

| | Sn | | |
|---|---|---|---|
| | 7 | 8 | 17 |
| KA | 1.0000000E+00 | 1.0000000E+00 | 1.0000000E+00 |
| A4 | −1.4300874E−04 | −1.1721099E−04 | 1.2895451E−04 |
| A6 | −1.2583880E−07 | −1.4729359E−07 | 2.9329475E−07 |
| A8 | −3.8842063E−09 | 3.6461431E−08 | −7.2870323E−09 |
| A10 | −4.8701887E−10 | −1.7166805E−09 | 1.9541000E−10 |

Example 12

Figure 25:
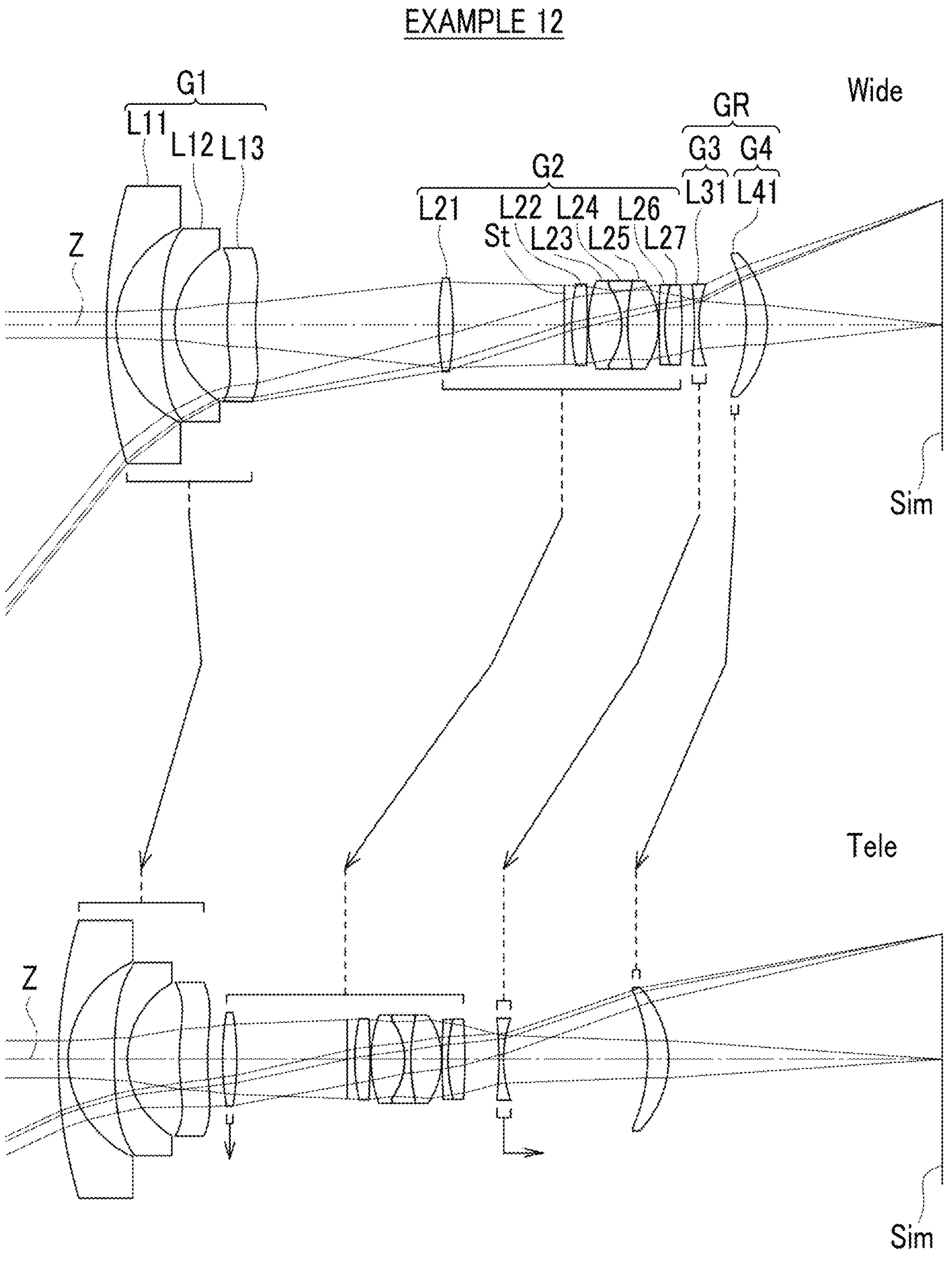
FIG. 25 is a diagram illustrating a cross-sectional view and a moving path of a configuration of a variable magnification optical system of Example 12.

A configuration and a moving path of a variable magnification optical system of Example 12 are illustrated in FIG. 25. The variable magnification optical system of Example 12 consists of, in order from the object side to the image side, the first lens group G1 having a negative refractive power, the second lens group G2 having a positive refractive power, the third lens group G3 having a negative refractive power, and the fourth lens group G4 having a positive refractive power. The subsequent group GR consists of two lens groups including the third lens group G3 and the fourth lens group G4. The first lens group G1 consists of three lenses including the lenses L11 to L13 in order from the object side to the image side. The second lens group G2 consists of the lens L21, the aperture stop St, and lenses L22 to L27 in order from the object side to the image side. The third lens group G3 consists of one lens that is the lens L31. The fourth lens group G4 consists of one lens that is the lens L41.

During changing the magnification from the wide angle end to the telephoto end, all lens groups move along the optical axis Z by changing their spacings with respect to their adjacent lens groups. The focusing lens group consists of the third lens group G3. During the focusing from the infinite distance object to the nearest object, the third lens group G3 moves to the image side, and other lens groups are fixed with respect to the image plane Sim. The vibration-proof group consists of the lens L21.

Figure 26:
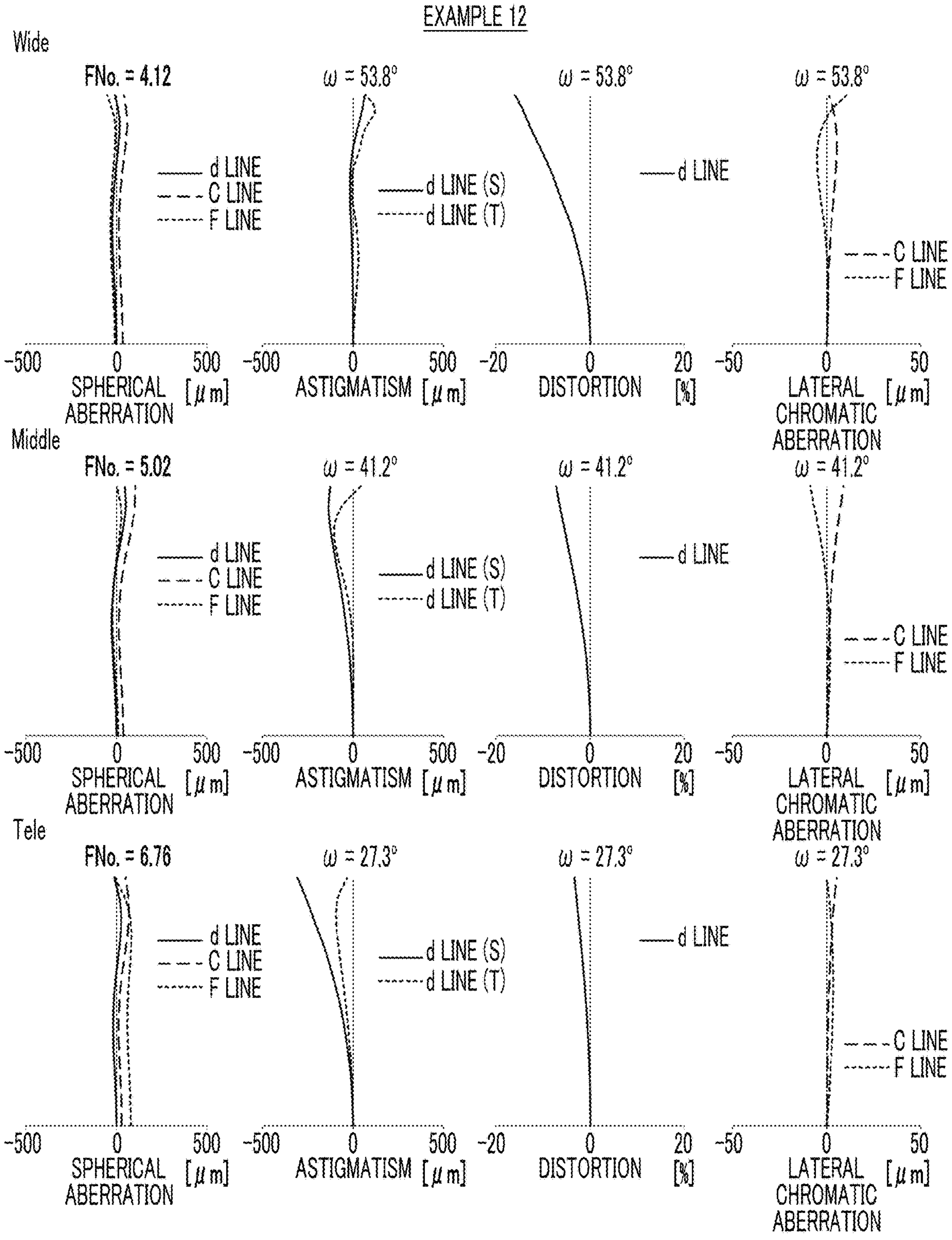
FIG. 26 is each aberration diagram of the variable magnification optical system of Example 12.

For the variable magnification optical system of Example 12, basic lens data is shown in Table 34, specifications and variable surface spacings are shown in Table 35, aspherical coefficients are shown in Table 36, and each aberration diagram is illustrated in FIG. 26.

TABLE 34

| Example 12 | | | | | | | |
|---|---|---|---|---|---|---|---|
| Sn | R | D | Nd | νd | θg, F | ED | NG1L + 0.01 × νG1L |
| 1 | 60.2744 | 0.9998 | 1.48749 | 70.24 | 0.53007 | | 2.18989 |
| 2 | 12.5181 | 4.7818 | | | | 22.19 | |
| *3 | 67.4008 | 1.3431 | 1.53409 | 55.87 | 0.55858 | 21.93 | 2.09279 |
| *4 | 10.1077 | 5.4298 | | | | 17.32 | |
| *5 | 24.9590 | 2.9265 | 1.66121 | 20.35 | 0.66162 | | 1.86471 |
| *6 | 29.5738 | DD[6] | | | | | |
| *7 | 33.4320 | 1.4759 | 1.53409 | 55.87 | 0.55858 | | |
| *8 | −36.7163 | 11.4232 | | | | | |
| 9 (St) | ∞ | 0.7800 | | | | | |

TABLE 34-continued

| Example 12 | | | | | | | |
|---|---|---|---|---|---|---|---|
| Sn | R | D | Nd | νd | θg, F | ED | NG1L + 0.01 × νG1L |
| 10 | 23.1240 | 1.6283 | 1.43875 | 94.66 | 0.53402 | | |
| 11 | −95.0148 | 0.1000 | | | | | |
| 12 | 15.5560 | 3.5092 | 1.43875 | 94.66 | 0.53402 | | |
| 13 | −7.9835 | 0.6146 | 1.88300 | 39.22 | 0.57288 | | |
| 14 | 23.8173 | 3.2011 | 1.64769 | 33.79 | 0.59393 | | |
| 15 | −9.5009 | 0.0498 | | | | | |
| 16 | 101.0289 | 0.6098 | 1.52841 | 76.45 | 0.53954 | | |
| 17 | 19.6123 | 1.7449 | 1.60342 | 38.03 | 0.58356 | | |
| *18 | −50.9593 | DD[18] | | | | | |
| 19 | −46.3738 | 0.4641 | 2.00100 | 29.14 | 0.59974 | | |
| 20 | 14.9109 | DD[20] | | | | | |
| 21 | −20.3593 | 2.1810 | 1.48749 | 70.24 | 0.53007 | | |
| 22 | −12.5785 | DD[22] | | | | | |

TABLE 35

| Example 12 | | | |
|---|---|---|---|
| | Wide | Middle | Tele |
| Zr | 1.0 | 1.4 | 2.3 |
| f | 12.36 | 17.48 | 28.42 |
| Bf | 18.16 | 19.09 | 28.35 |
| FNo. | 4.12 | 5.02 | 6.76 |
| 2ω [°] | 107.6 | 82.4 | 54.6 |
| DD[6] | 19.01 | 10.52 | 1.55 |
| DD[18] | 1.29 | 2.14 | 3.45 |
| DD[20] | 4.89 | 10.34 | 14.96 |
| DD[22] | 18.16 | 19.09 | 28.35 |

TABLE 36

Example 12

| | Sn | | | |
|---|---|---|---|---|
| | 3 | 4 | 5 | 6 |
| KA | 1.0000000E+00 | 1.0000000E+00 | 1.0000000E+00 | 1.0000000E+00 |
| A4 | 7.3832725E−05 | −3.4777524E−05 | −2.9653522E−04 | −3.0391279E−04 |
| A6 | −1.6016039E−07 | 2.0864297E−07 | −7.7688148E−07 | −4.9976964E−07 |
| A8 | 2.3350858E−09 | −1.3147514E−08 | −6.4926116E−09 | 1.0218913E−08 |
| A10 | 0.0000000E+00 | 1.2037335E−10 | 1.0794603E−10 | −2.2298397E−11 |

| | Sn | | |
|---|---|---|---|
| | 7 | 8 | 18 |
| KA | 1.0000000E+00 | 1.0000000E+00 | 1.0000000E+00 |
| A4 | −3.6669886E−05 | −3.2797319E−05 | 1.3752563E−04 |
| A6 | 3.2617785E−07 | 5.0050357E−07 | 3.5325374E−07 |
| A8 | −6.2280553E−09 | −1.2096583E−08 | −2.0783381E−08 |
| A10 | 4.1526666E−10 | 4.5940436E−10 | 1.9541000E−10 |

Example 13

Figure 27:
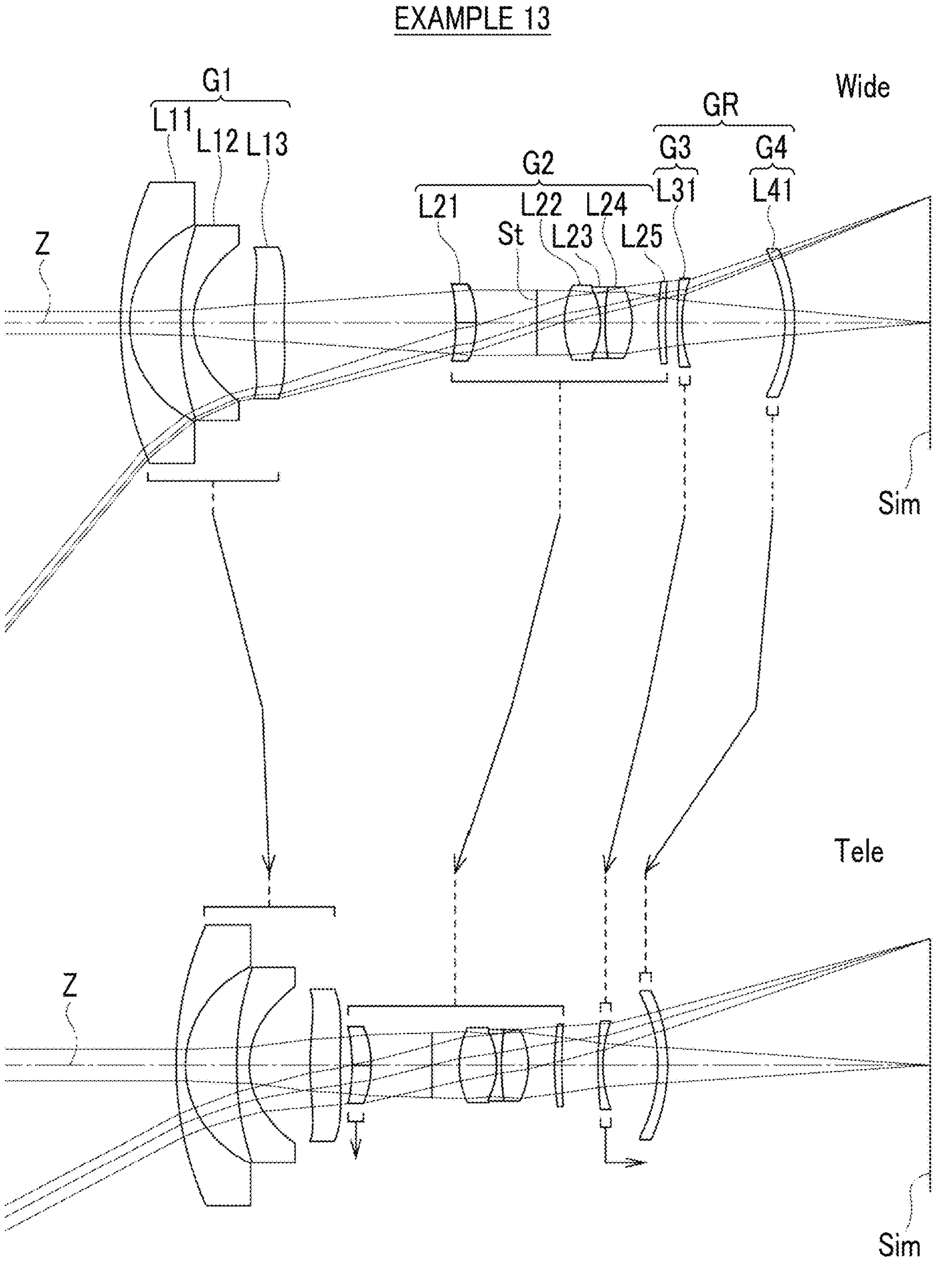
FIG. 27 is a diagram illustrating a cross-sectional view and a moving path of a configuration of a variable magnification optical system of Example 13.

A configuration and a moving path of a variable magnification optical system of Example 13 are illustrated in FIG. 27. The variable magnification optical system of Example 13 consists of, in order from the object side to the image side, the first lens group G1 having a negative refractive power, the second lens group G2 having a positive refractive power, the third lens group G3 having a negative refractive power, and the fourth lens group G4 having a negative refractive power. The subsequent group GR consists of two lens groups including the third lens group G3 and the fourth lens group G4. The first lens group G1 consists of three lenses including the lenses L11 to L13 in order from the object side to the image side. The second lens group G2 consists of the lens L21, the aperture stop St, and the lenses L22 to L25 in order from the object side to the image side. The third lens group G3 consists of one lens that is the lens L31. The fourth lens group G4 consists of one lens that is the lens L41.

During changing the magnification from the wide angle end to the telephoto end, all lens groups move along the optical axis Z by changing their spacings with respect to their adjacent lens groups. The focusing lens group consists of the third lens group G3. During the focusing from the infinite distance object to the nearest object, the third lens group G3 moves to the image side, and other lens groups are fixed with respect to the image plane Sim. The vibration-proof group consists of the lens L21.

Figure 28:
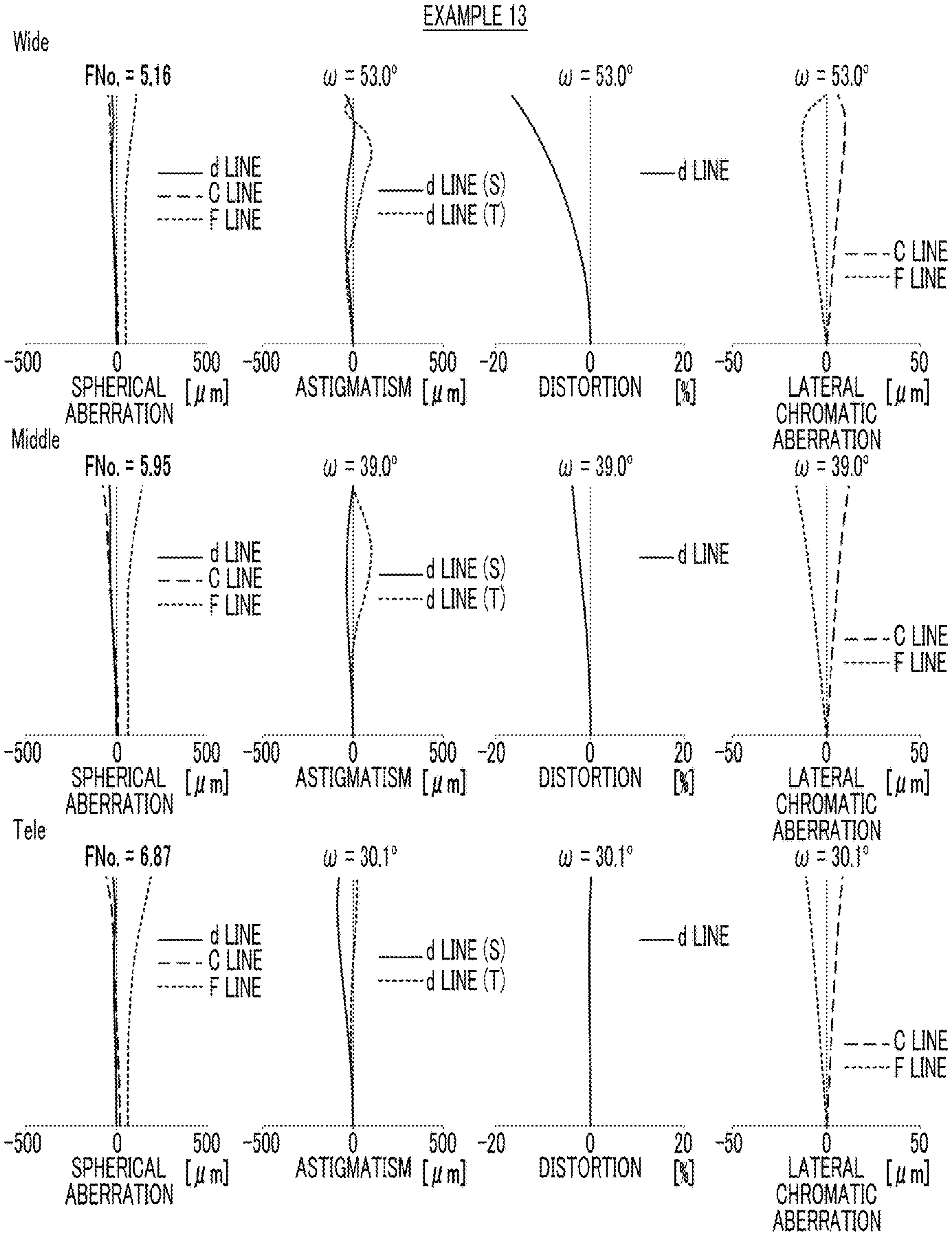
FIG. 28 is each aberration diagram of the variable magnification optical system of Example 13.

For the variable magnification optical system of Example 13, basic lens data is shown in Table 37, specifications and variable surface spacings are shown in Table 38, aspherical coefficients are shown in Table 39, and each aberration diagram is illustrated in FIG. 28.

TABLE 37

Example 13

| Sn | R | D | Nd | νd | θg, F | ED | NG1L + 0.01 × νG1L |
|---|---|---|---|---|---|---|---|
| 1 | 42.4976 | 0.9470 | 1.48749 | 70.24 | 0.53007 | | 2.18989 |
| 2 | 12.5000 | 5.2567 | | | | 22.10 | |
| *3 | 57.8420 | 1.2831 | 1.53409 | 55.87 | 0.55858 | 21.91 | 2.09279 |
| *4 | 10.2605 | 6.2241 | | | | 17.65 | |
| *5 | 43.0964 | 3.0937 | 1.66121 | 20.35 | 0.66162 | | 1.86471 |
| *6 | 129.4942 | DD[6] | | | | | |
| *7 | −29.9826 | 2.0002 | 1.49700 | 81.54 | 0.53748 | | |
| *8 | −13.1221 | 6.2360 | | | | | |
| 9 (St) | ∞ | 2.7836 | | | | | |
| 10 | 10.9139 | 3.7600 | 1.43875 | 94.66 | 0.53402 | | |
| 11 | −8.7511 | 0.4732 | 1.88300 | 39.22 | 0.57288 | | |
| 12 | 29.0559 | 2.7601 | 1.60342 | 38.03 | 0.58356 | | |
| 13 | −9.8636 | 2.6764 | | | | | |
| *14 | 33.8392 | 0.7501 | 1.53409 | 55.87 | 0.55858 | | |
| *15 | 125.7765 | DD[15] | | | | | |
| 16 | 53.1115 | 0.4900 | 1.77535 | 50.31 | 0.55042 | | |
| 17 | 15.3592 | DD[17] | | | | | |
| 18 | −18.4120 | 0.9998 | 1.48749 | 70.24 | 0.53007 | | |
| 19 | −21.3727 | DD[19] | | | | | |

TABLE 38

Example 13

| | Wide | Middle | Tele |
|---|---|---|---|
| Zr | 1.0 | 1.4 | 1.9 |
| f | 12.86 | 18.19 | 24.44 |
| Bf | 13.92 | 15.61 | 26.92 |
| FNo. | 5.16 | 5.95 | 6.87 |
| 2ω [°] | 106.0 | 78.0 | 60.2 |

TABLE 38-continued

Example 13

| | Wide | Middle | Tele |
|---|---|---|---|
| DD[6] | 17.60 | 7.54 | 1.19 |
| DD[15] | 1.19 | 2.22 | 3.76 |
| DD[17] | 10.53 | 12.81 | 5.62 |
| DD[19] | 13.92 | 15.61 | 26.92 |

TABLE 39

Example 13

| Sn | 3 | 4 | 5 | 6 |
|---|---|---|---|---|
| KA | 1.0000000E+00 | 1.0000000E+00 | 1.0000000E+00 | 1.0000000E+00 |
| A4 | 1.1974923E−04 | 1.0065031E−04 | −6.7253122E−05 | −1.0648038E−04 |
| A6 | −1.1184244E−06 | −5.4455344E−07 | −1.3729278E−06 | −1.4050329E−06 |
| A8 | 3.4939609E−09 | −2.1617484E−08 | 1.0758193E−09 | 1.1420789E−08 |
| A10 | 0.0000000E+00 | 3.0446393E−11 | −5.7244838E−12 | −5.2707175E−11 |

| Sn | 7 | 8 | 14 | 15 |
|---|---|---|---|---|
| KA | 1.0000000E+00 | 1.0000000E+00 | 1.0000000E+00 | 1.0000000E+00 |
| A4 | −2.7876711E−04 | −1.8924951E−04 | −2.3857464E−05 | 1.3158512E−04 |
| A6 | 3.8709538E−08 | −3.9396139E−08 | 4.9126277E−08 | 1.1534650E−06 |
| A8 | −6.4462637E−08 | −2.6355724E−08 | 3.7660767E−08 | 2.5538765E−08 |
| A10 | −1.5535226E−09 | −1.7688698E−09 | −1.0355652E−09 | −5.7863146E−10 |

Example 14

Figure 29:
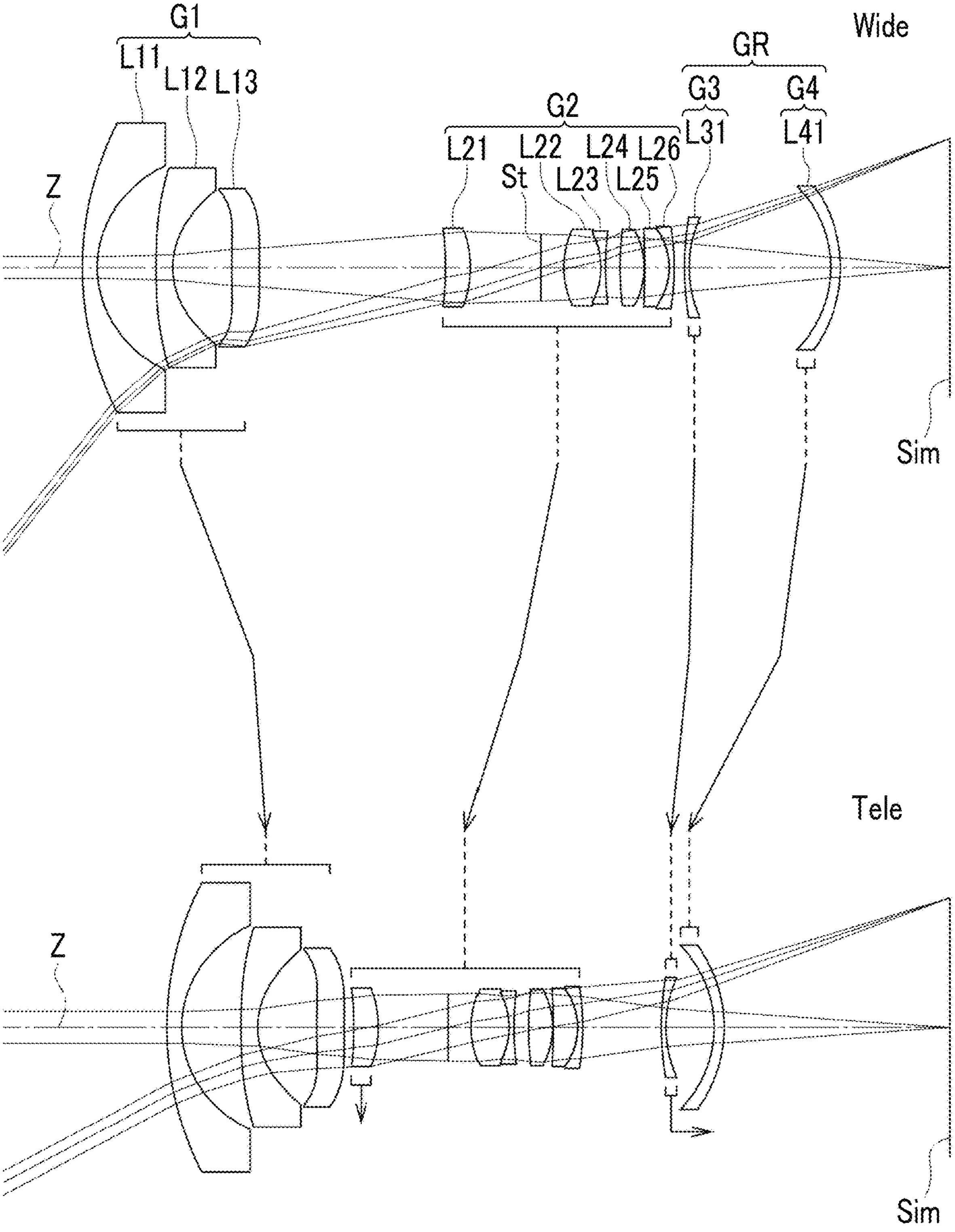
FIG. 29 is a diagram illustrating a cross-sectional view and a moving path of a configuration of a variable magnification optical system of Example 14.

A configuration and a moving path of a variable magnification optical system of Example 14 are illustrated in FIG. 29. The variable magnification optical system of Example 14 consists of, in order from the object side to the image side, the first lens group G1 having a negative refractive power, the second lens group G2 having a positive refractive power, the third lens group G3 having a negative refractive power, and the fourth lens group G4 having a negative refractive power. The subsequent group GR consists of two lens groups including the third lens group G3 and the fourth lens group G4. The first lens group G1 consists of three lenses including the lenses L11 to L13 in order from the object side to the image side. The second lens group G2 consists of the lens L21, the aperture stop St, and the lenses L22 to L26 in order from the object side to the image side. The third lens group G3 consists of one lens that is the lens L31. The fourth lens group G4 consists of one lens that is the lens L41.

During changing the magnification from the wide angle end to the telephoto end, all lens groups move along the optical axis Z by changing their spacings with respect to their adjacent lens groups. The focusing lens group consists of the third lens group G3. During the focusing from the infinite distance object to the nearest object, the third lens group G3 moves to the image side, and other lens groups are fixed with respect to the image plane Sim. The vibration-proof group consists of the lens L21.

Figure 30:
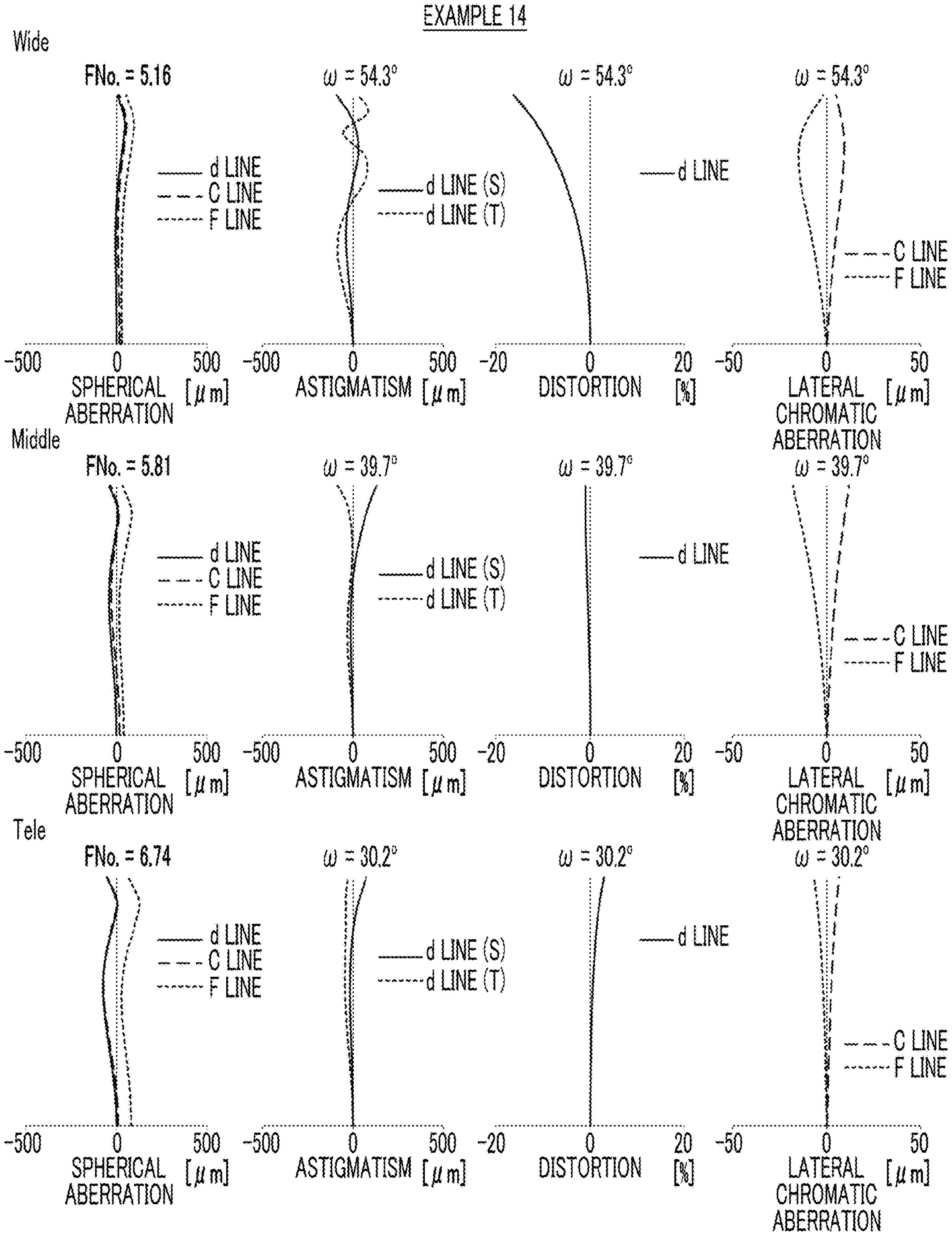
FIG. 30 is each aberration diagram of the variable magnification optical system of Example 14.

For the variable magnification optical system of Example 14, basic lens data is shown in Table 40, specifications and variable surface spacings are shown in Table 41, aspherical coefficients are shown in Table 42, and each aberration diagram is illustrated in FIG. 30.

TABLE 40

Example 14

| Sn | R | D | Nd | νd | θg, F | ED | NG1L + 0.01 × νG1L |
|---|---|---|---|---|---|---|---|
| 1 | 38.0063 | 1.4847 | 1.48749 | 70.24 | 0.53007 | | 2.18989 |
| 2 | 12.5889 | 5.9423 | | | | 22.41 | |
| *3 | 124.6995 | 1.6631 | 1.54436 | 56.03 | 0.56178 | 21.92 | 2.10466 |
| *4 | 9.6067 | 5.8857 | | | | 16.99 | |
| *5 | 58.4420 | 2.7579 | 1.66121 | 20.35 | 0.66162 | | 1.86471 |
| *6 | 222.1949 | DD[6] | | | | | |
| *7 | −73.5027 | 2.4999 | 1.54436 | 56.03 | 0.56178 | | |
| *8 | −14.4329 | 6.9965 | | | | | |
| 9 (St) | ∞ | 2.2789 | | | | | |
| 10 | 10.6602 | 3.7354 | 1.43875 | 94.66 | 0.53402 | | |
| 11 | −8.6940 | 0.4883 | 1.88300 | 39.22 | 0.57288 | | |
| 12 | 37.1113 | 1.4517 | | | | | |
| 13 | 38.7637 | 2.4030 | 1.60342 | 38.03 | 0.58356 | | |
| 14 | −9.3570 | 0.0498 | | | | | |
| 15 | −92.9511 | 2.4658 | 1.52841 | 76.45 | 0.53954 | | |
| 16 | −7.7275 | 0.5000 | 1.72916 | 54.68 | 0.54451 | | |
| *17 | −27.2595 | DD[17] | | | | | |
| 18 | 35.8231 | 0.4648 | 1.77535 | 50.31 | 0.55042 | | |
| 19 | 14.4853 | DD[19] | | | | | |
| 20 | −13.6641 | 0.9998 | 1.48749 | 70.24 | 0.53007 | | |
| 21 | −16.4636 | DD[21] | | | | | |

TABLE 41

| Example 14 | | | |
|---|---|---|---|
| | Wide | Middle | Tele |
| Zr | 1.0 | 1.4 | 1.9 |
| f | 12.21 | 17.27 | 23.69 |
| Bf | 10.96 | 13.55 | 22.61 |
| FNo. | 5.16 | 5.81 | 6.74 |
| 2ω [°] | 108.6 | 79.4 | 60.4 |
| DD[6] | 18.65 | 7.66 | 0.96 |
| DD[17] | 1.02 | 4.25 | 7.91 |
| DD[19] | 14.16 | 12.10 | 4.82 |
| DD[21] | 10.96 | 13.55 | 22.61 |

TABLE 42

Example 14

| | Sn | | | |
|---|---|---|---|---|
| | 3 | 4 | 5 | 6 |
| KA | 1.0000000E+00 | 1.0000000E+00 | 1.0000000E+00 | 1.0000000E+00 |
| A4 | 1.4352238E−04 | 1.8003658E−05 | −2.8775269E−04 | −2.8073833E−04 |
| A6 | −1.2621186E−06 | −2.1692614E−07 | −1.0412130E−06 | −7.8421313E−07 |
| A8 | 4.3160907E−09 | −3.3328091E−08 | −1.0930508E−08 | 1.3066798E−08 |
| A10 | 0.0000000E+00 | 3.4281449E−11 | 1.6329655E−10 | −3.8094602E−11 |

| | Sn | | |
|---|---|---|---|
| | 7 | 8 | 17 |
| KA | 1.0000000E+00 | 1.0000000E+00 | 1.0000000E+00 |
| A4 | −2.9330193E−04 | −2.1988579E−04 | 9.0665436E−05 |
| A6 | −1.9971326E−06 | −1.6966843E−06 | 9.5780100E−07 |
| A8 | −1.6088401E−08 | 9.3827963E−09 | −1.6353750E−08 |
| A10 | −3.0850278E−09 | −2.5648487E−09 | 1.9541000E−10 |

Example 15

Figure 31:
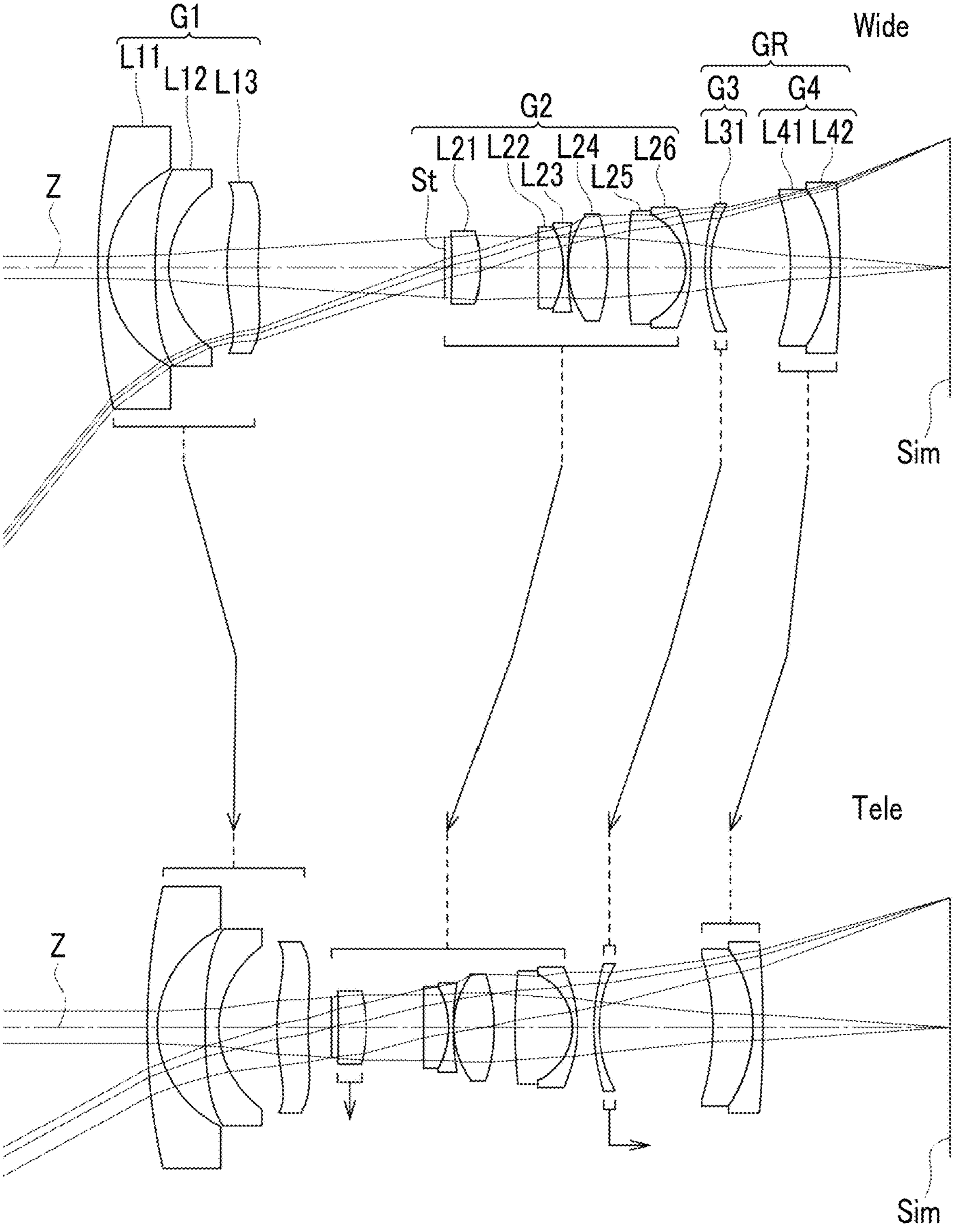
FIG. 31 is a diagram illustrating a cross-sectional view and a moving path of a configuration of a variable magnification optical system of Example 15.

A configuration and a moving path of a variable magnification optical system of Example 15 are illustrated in FIG. 31. The variable magnification optical system of Example 15 consists of, in order from the object side to the image side, the first lens group G1 having a negative refractive power, the second lens group G2 having a positive refractive power, the third lens group G3 having a negative refractive power, and the fourth lens group G4 having a negative refractive power. The subsequent group GR consists of two lens groups including the third lens group G3 and the fourth lens group G4. The first lens group G1 consists of three lenses including the lenses L11 to L13 in order from the object side to the image side. The second lens group G2 consists of the aperture stop St and six lenses including the lenses L21 to L26 in order from the object side to the image side. The third lens group G3 consists of one lens that is the lens L31. The fourth lens group G4 consists of two lenses including lenses L41 and L42 in order from the object side to the image side.

During changing the magnification from the wide angle end to the telephoto end, all lens groups move along the optical axis Z by changing their spacings with respect to their adjacent lens groups. The focusing lens group consists of the third lens group G3. During the focusing from the infinite distance object to the nearest object, the third lens group G3 moves to the image side, and other lens groups are fixed with respect to the image plane Sim. The vibration-proof group consists of the lens L21.

Figure 32:
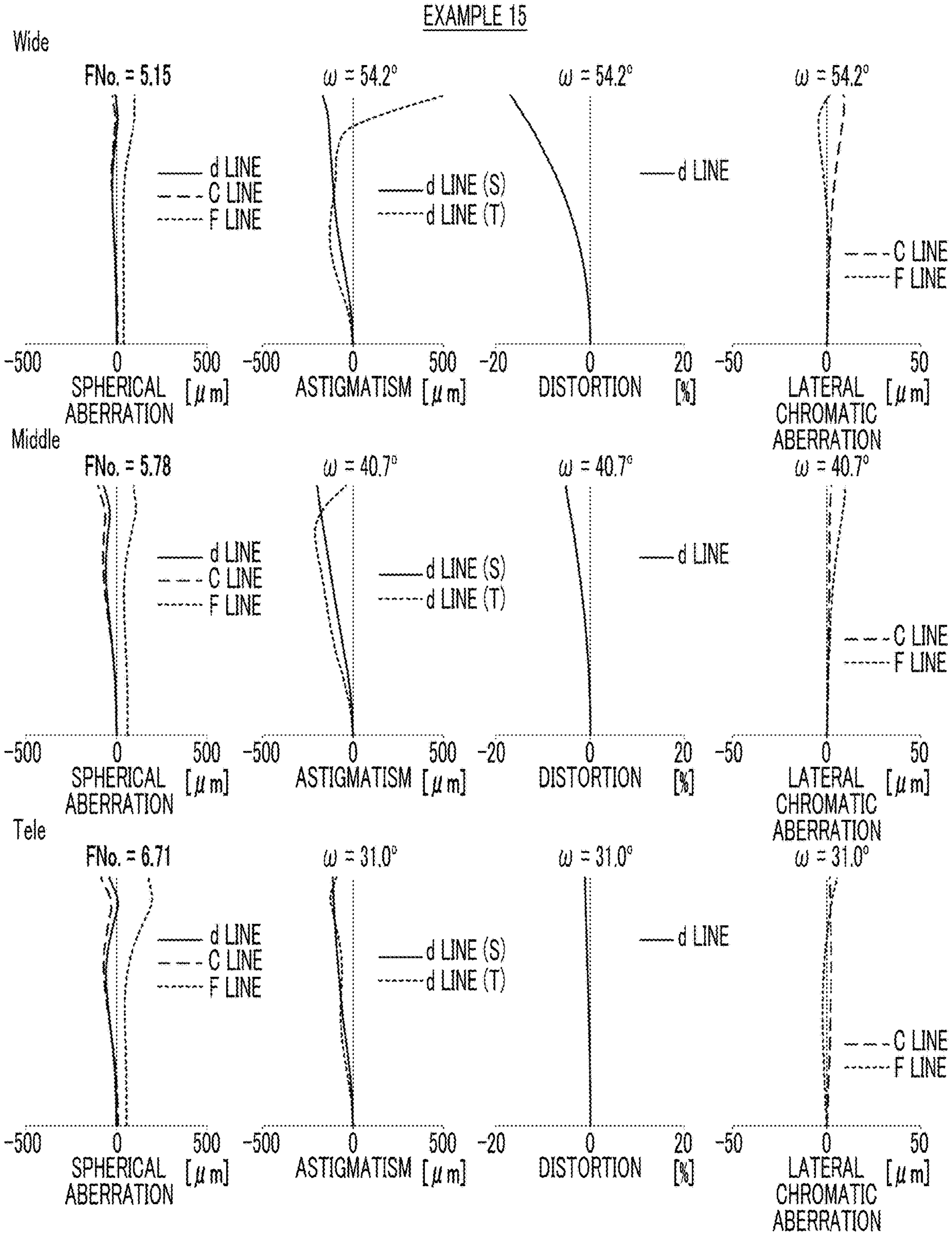
FIG. 32 is each aberration diagram of the variable magnification optical system of Example 15.

For the variable magnification optical system of Example 15, basic lens data is shown in Table 43, specifications and variable surface spacings are shown in Table 44, aspherical coefficients are shown in Table 45, and each aberration diagram is illustrated in FIG. 32.

TABLE 43

Example 15

| Sn | R | D | Nd | νd | θg, F | ED | NG1L + 0.01 × νG1L |
|---|---|---|---|---|---|---|---|
| 1 | 77.0103 | 1.0000 | 1.48749 | 70.24 | 0.53007 | | 2.18989 |
| 2 | 12.5109 | 4.7920 | | | | 21.77 | |
| *3 | 73.9593 | 1.3596 | 1.53409 | 55.87 | 0.55858 | 21.57 | 2.09279 |
| *4 | 10.7314 | 5.8080 | | | | 17.82 | |
| *5 | 23.8312 | 3.1314 | 1.66121 | 20.35 | 0.66162 | | 1.86471 |
| *6 | 58.9120 | DD[6] | | | | | |
| 7 (St) | ∞ | 0.7000 | | | | | |
| *8 | −155.8595 | 2.7969 | 1.53409 | 55.87 | 0.55858 | | |

TABLE 43-continued

| Example 15 | | | | | | | |
|---|---|---|---|---|---|---|---|
| Sn | R | D | Nd | νd | θg, F | ED | NG1L + 0.01 × νG1L |
| *9 | −17.0033 | 5.7694 | | | | | |
| 10 | 816.0146 | 2.5099 | 1.43875 | 94.66 | 0.53402 | | |
| 11 | −10.1445 | 0.4500 | 1.72916 | 54.68 | 0.54451 | | |
| 12 | 31.2710 | 0.0500 | | | | | |
| 13 | 10.5952 | 3.9759 | 1.48749 | 70.24 | 0.53007 | | |
| 14 | −20.3428 | 2.0656 | | | | | |
| 15 | 63.8046 | 5.7597 | 1.60311 | 60.64 | 0.54148 | | |
| 16 | −6.6391 | 0.5000 | 1.88300 | 39.22 | 0.57288 | | |
| *17 | −14.9640 | DD[17] | | | | | |
| 18 | 24.4068 | 0.5486 | 1.75500 | 52.32 | 0.54757 | | |
| 19 | 15.6287 | DD[19] | | | | | |
| 20 | −28.5535 | 3.9999 | 1.95906 | 17.47 | 0.65993 | | |
| 21 | −16.4197 | 1.0100 | 1.88300 | 39.22 | 0.57288 | | |
| 22 | −121.0649 | DD[22] | | | | | |

TABLE 44

| Example 15 | | | |
|---|---|---|---|
| | Wide | Middle | Tele |
| Zr | 1.0 | 1.4 | 1.9 |
| f | 12.32 | 17.42 | 23.90 |
| Bf | 11.01 | 13.15 | 18.77 |
| FNo. | 5.15 | 5.78 | 6.71 |
| 2ω [°] | 108.4 | 81.4 | 62.0 |
| DD[6] | 18.70 | 8.48 | 2.32 |
| DD[17] | 1.42 | 1.17 | 1.64 |
| DD[19] | 8.00 | 11.09 | 11.40 |
| DD[22] | 11.01 | 13.15 | 18.77 |

TABLE 45

Example 15

| | Sn | | | |
|---|---|---|---|---|
| | 3 | 4 | 5 | 6 |
| KA | 1.0000000E+00 | 1.0000000E+00 | 1.0000000E+00 | 1.0000000E+00 |
| A4 | 6.2841854E−05 | −7.3787961E−05 | −1.3794522E−04 | −1.2667846E−04 |
| A6 | −8.8224365E−08 | 7.2201427E−08 | −6.4957653E−07 | −5.5173294E−07 |
| A8 | 1.4707419E−09 | −1.8400991E−09 | −6.4727460E−10 | −3.3088719E−09 |
| A10 | 0.0000000E+00 | 1.5314617E−11 | −3.9113094E−11 | 5.6679484E−12 |

| | Sn | | |
|---|---|---|---|
| | 8 | 9 | 17 |
| KA | 1.0000000E+00 | 1.0000000E+00 | 1.0000000E+00 |
| A4 | −9.6088192E−05 | −3.2872390E−05 | 6.2296419E−05 |
| A6 | −2.2402146E−07 | −6.8967354E−07 | 5.5167392E−07 |
| A8 | 7.5748695E−08 | 1.5022311E−07 | −4.9347515E−09 |
| A10 | −2.0123997E−09 | −5.0288045E−09 | 1.9541000E−10 |

Example 16

Figure 33:
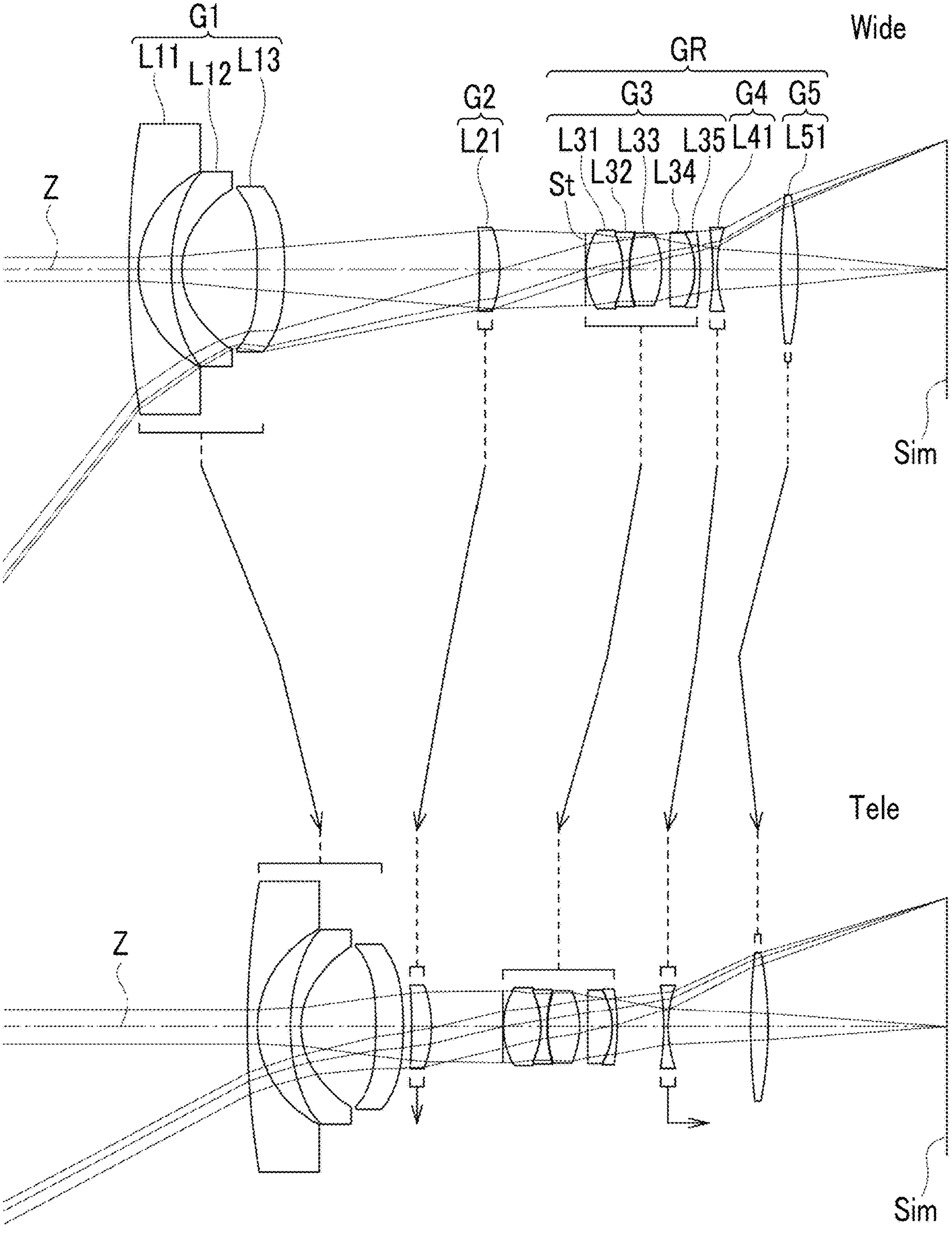
FIG. 33 is a diagram illustrating a cross-sectional view and a moving path of a configuration of a variable magnification optical system of Example 16.

A configuration and a moving path of a variable magnification optical system of Example 16 are illustrated in FIG. 33. The variable magnification optical system of Example 16 consists of, in order from the object side to the image side, the first lens group G1 having a negative refractive power, the second lens group G2 having a positive refractive power, the third lens group G3 having a positive refractive power, the fourth lens group G4 having a negative refractive power, and a fifth lens group G5 having a positive refractive power. The subsequent group GR consists of three lens groups including the third lens group G3, the fourth lens group G4, and the fifth lens group G5. The first lens group G1 consists of three lenses including the lenses L11 to L13 in order from the object side to the image side. The second lens group G2 consists of one lens that is the lens L21. The third lens group G3 consists of the aperture stop St and five lenses including the lenses L31 to L35 in order from the object side to the image side. The fourth lens group G4 consists of one lens that is the lens L41. The fifth lens group G5 consists of one lens that is a lens L51.

During changing the magnification from the wide angle end to the telephoto end, all lens groups move along the optical axis Z by changing their spacings with respect to their adjacent lens groups. The focusing lens group consists of the fourth lens group G4. During the focusing from the infinite distance object to the nearest object, the fourth lens group G4 moves to the image side, and other lens groups are fixed with respect to the image plane Sim. The vibration-proof group consists of the second lens group G2.

Figure 34:
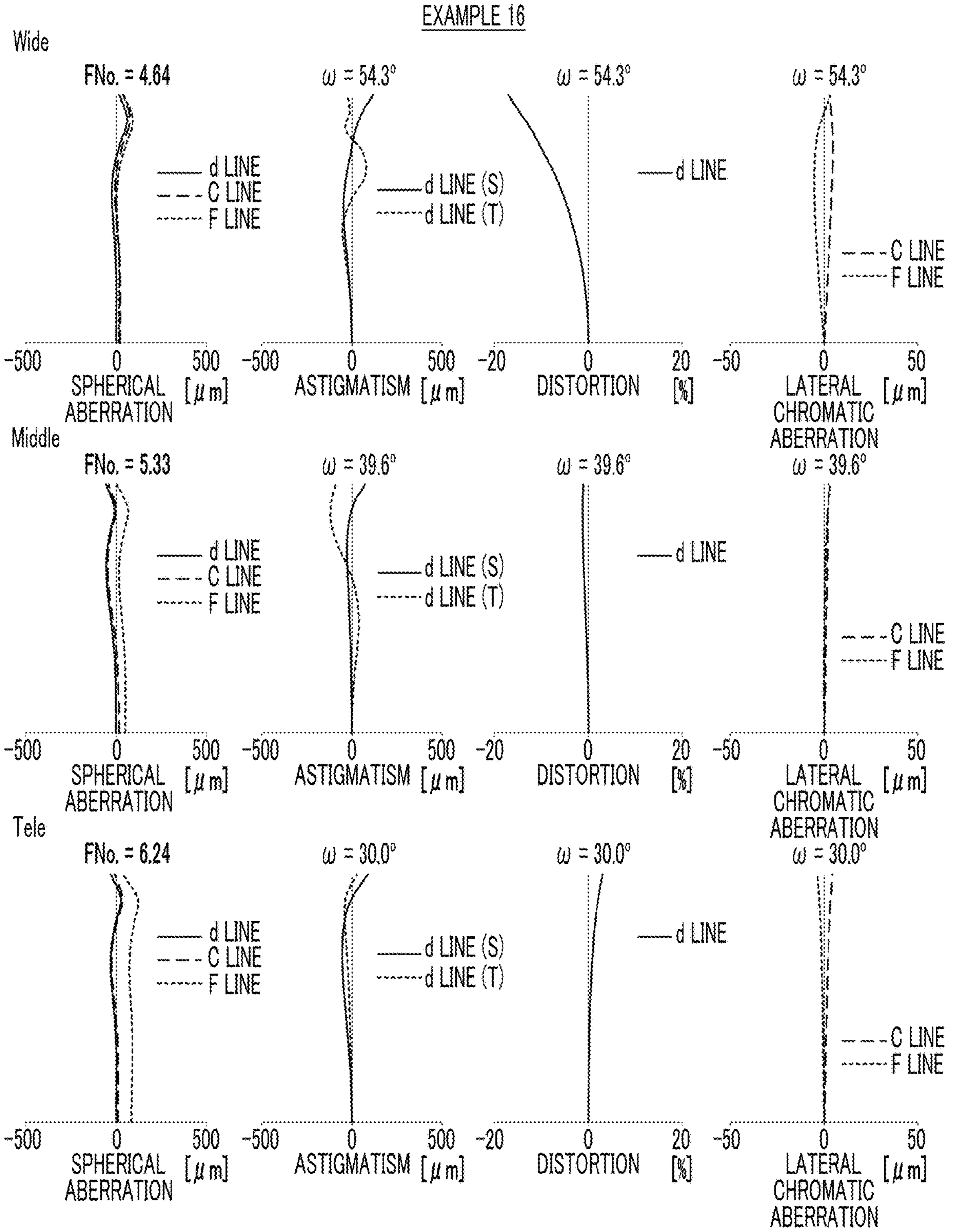
FIG. 34 is each aberration diagram of the variable magnification optical system of Example 16.

For the variable magnification optical system of Example 16, basic lens data is shown in Table 46, specifications and variable surface spacings are shown in Table 47, aspherical coefficients are shown in Table 48, and each aberration diagram is illustrated in FIG. 34.

TABLE 46

| Example 16 | | | | | | | |
|---|---|---|---|---|---|---|---|
| Sn | R | D | Nd | νd | θg, F | ED | NG1L + 0.01 × νG1L |
| 1 | 107.9316 | 1.0001 | 1.48749 | 70.24 | 0.53007 | | 2.18989 |
| 2 | 12.4999 | 3.3191 | | | | 21.60 | |
| *3 | 29.6661 | 1.0554 | 1.53409 | 55.87 | 0.55858 | 21.45 | 2.09279 |
| *4 | 9.7183 | 7.5555 | | | | 17.66 | |
| *5 | −51.1177 | 2.7490 | 1.66121 | 20.35 | 0.66162 | | 1.86471 |
| *6 | −39.0384 | DD[6] | | | | | |
| *7 | −210.6221 | 2.0002 | 1.53409 | 55.87 | 0.55858 | | |
| *8 | −16.4519 | DD[8] | | | | | |
| 9 (St) | ∞ | 0.0500 | | | | | |
| 10 | 9.0618 | 3.7600 | 1.43875 | 94.66 | 0.53402 | | |
| 11 | −9.8676 | 0.6251 | 1.95375 | 32.32 | 0.59056 | | |
| 12 | 16.2074 | 0.0502 | | | | | |
| 13 | 14.3570 | 3.2006 | 1.71736 | 29.52 | 0.60483 | | |
| 14 | −10.6426 | 0.8317 | | | | | |
| 15 | 881.5853 | 2.5099 | 1.49700 | 81.54 | 0.53748 | | |
| 16 | −8.7400 | 0.5001 | 1.80400 | 46.53 | 0.55775 | | |
| *17 | −22.8093 | DD[17] | | | | | |
| 18 | −32.0621 | 0.4426 | 1.77535 | 50.31 | 0.55042 | | |
| 19 | 15.0724 | DD[19] | | | | | |
| 20 | 78.1026 | 1.7502 | 1.48749 | 70.24 | 0.53007 | | |
| 21 | −46.5828 | DD[21] | | | | | |

TABLE 47

| Example 16 | | | |
|---|---|---|---|
| | Wide | Middle | Tele |
| Zr | 1.0 | 1.4 | 1.9 |
| f | 12.28 | 17.37 | 23.83 |
| Bf | 14.97 | 19.85 | 17.98 |
| FNo. | 4.64 | 5.33 | 6.24 |
| 2ω [°] | 108.6 | 79.2 | 60.0 |
| DD[6] | 19.52 | 8.10 | 0.83 |
| DD[8] | 8.63 | 8.98 | 7.09 |
| DD[17] | 1.29 | 2.58 | 4.66 |
| DD[19] | 6.36 | 3.56 | 8.27 |
| DD[21] | 14.97 | 19.85 | 17.98 |

TABLE 48

| Example 16 | | | | |
|---|---|---|---|---|
| | Sn | | | |
| | 3 | 4 | 5 | 6 |
| KA | 1.0000000E+00 | 1.0000000E+00 | 1.0000000E+00 | 1.0000000E+00 |
| A4 | 1.6777015E−04 | 1.1992882E−04 | −9.3602490E−05 | −9.6608503E−05 |
| A6 | −2.2957206E−06 | −2.1330736E−06 | −1.6179738E−06 | −1.4574428E−06 |
| A8 | 1.3277977E−08 | −3.1526966E−08 | −1.2503161E−08 | 8.4062370E−09 |
| A10 | 0.0000000E+00 | 2.8343686E−10 | 1.7378989E−10 | 2.5478204E−13 |

TABLE 48-continued

| Example 16 | | | |
|---|---|---|---|
| | Sn | | |
| | 7 | 8 | 17 |
| KA | 1.0000000E+00 | 1.0000000E+00 | 1.0000000E+00 |
| A4 | −1.8431456E−04 | −1.4402061E−04 | 1.7152636E−04 |
| A6 | −2.9637152E−06 | −3.2736086E−06 | 1.7650740E−06 |
| A8 | 4.2666330E−08 | 9.7442379E−08 | 3.1550724E−08 |
| A10 | −2.2698593E−09 | −3.1564561E−09 | 1.9541000E−10 |

Example 17

Figure 35:
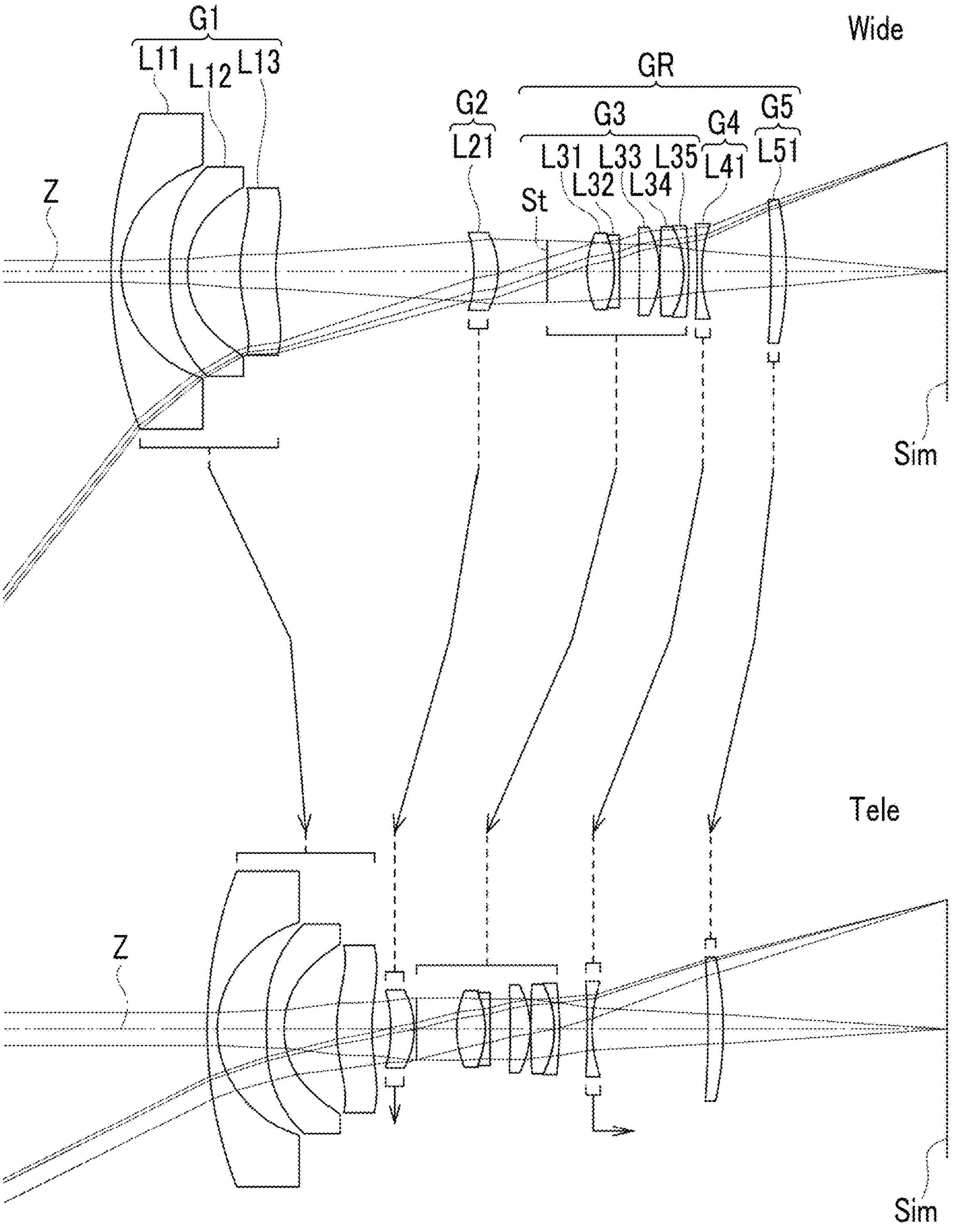
FIG. 35 is a diagram illustrating a cross-sectional view and a moving path of a configuration of a variable magnification optical system of Example 17.

A configuration and a moving path of a variable magnification optical system of Example 17 are illustrated in FIG. 35. The variable magnification optical system of Example 17 consists of, in order from the object side to the image side, the first lens group G1 having a negative refractive power, the second lens group G2 having a positive refractive power, the third lens group G3 having a positive refractive power, the fourth lens group G4 having a negative refractive power, and the fifth lens group G5 having a positive refractive power. The subsequent group GR consists of three lens groups including the third lens group G3, the fourth lens group G4, and the fifth lens group G5. The first lens group G1 consists of three lenses including the lenses L11 to L13 in order from the object side to the image side. The second lens group G2 consists of one lens that is the lens L21. The third lens group G3 consists of the aperture stop St and five lenses including the lenses L31 to L35 in order from the object side to the image side. The fourth lens group G4 consists of one lens that is the lens L41. The fifth lens group G5 consists of one lens that is the lens L51.

During changing the magnification from the wide angle end to the telephoto end, all lens groups move along the optical axis Z by changing their spacings with respect to their adjacent lens groups. The focusing lens group consists of the fourth lens group G4. During the focusing from the infinite distance object to the nearest object, the fourth lens group G4 moves to the image side, and other lens groups are fixed with respect to the image plane Sim. The vibration-proof group consists of the second lens group G2.

Figure 36:
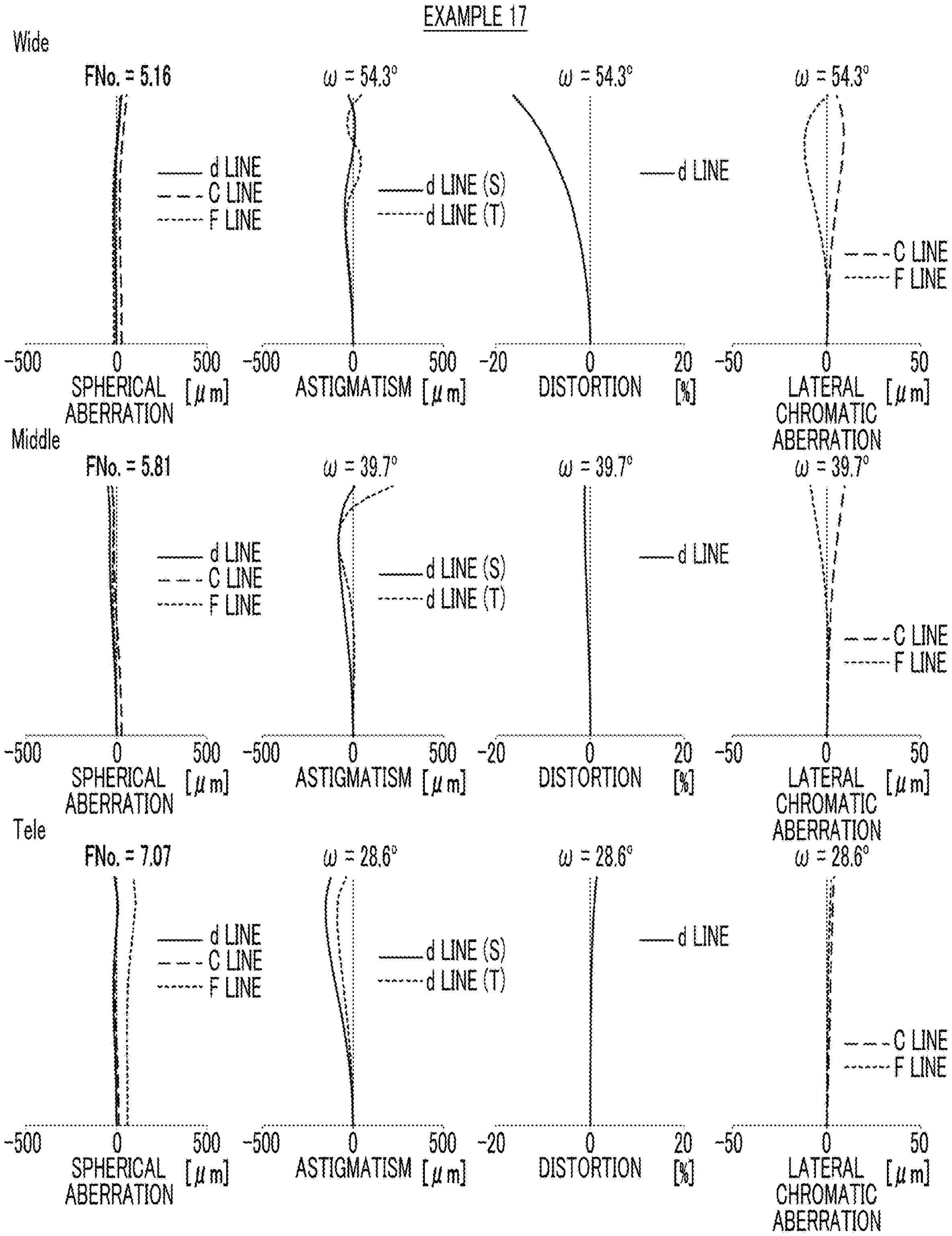
FIG. 36 is each aberration diagram of the variable magnification optical system of Example 17.

For the variable magnification optical system of Example 17, basic lens data is shown in Table 49, specifications and variable surface spacings are shown in Table 50, aspherical coefficients are shown in Table 51, and each aberration diagram is illustrated in FIG. 36.

TABLE 49

| Example 17 | | | | | | | |
|---|---|---|---|---|---|---|---|
| Sn | R | D | Nd | νd | θg, F | ED | NG1L + 0.01 × νG1L |
| 1 | 52.7167 | 0.9998 | 1.48749 | 70.24 | 0.53007 | | 2.18989 |
| 2 | 12.5000 | 4.9355 | | | | 23.50 | |
| *3 | 51.2284 | 1.7717 | 1.54436 | 56.03 | 0.56178 | 23.09 | 2.10466 |
| *4 | 11.1388 | 5.2755 | | | | 18.61 | |
| *5 | 17.7873 | 3.5871 | 1.66121 | 20.35 | 0.66162 | | 1.86471 |
| *6 | 23.5115 | DD[6] | | | | | |
| *7 | −23.4204 | 2.3410 | 1.54436 | 56.03 | 0.56178 | | |
| *8 | −10.6133 | DD[8] | | | | | |
| 9 (St) | ∞ | 4.0300 | | | | | |
| 10 | 11.5345 | 2.7887 | 1.43875 | 94.66 | 0.53402 | | |
| 11 | −10.9243 | 0.4837 | 1.88300 | 39.22 | 0.57288 | | |
| 12 | −649.1500 | 2.0179 | | | | | |
| 13 | −126.4172 | 2.0090 | 1.65412 | 39.68 | 0.57378 | | |
| 14 | −11.2655 | 0.0574 | | | | | |
| 15 | 106.4768 | 2.3769 | 1.52841 | 76.45 | 0.53954 | | |
| 16 | −11.2543 | 0.4999 | 1.72916 | 54.68 | 0.54451 | | |
| *17 | −36.2178 | DD[17] | | | | | |
| 18 | −89.6103 | 0.4754 | 1.77535 | 50.31 | 0.55042 | | |
| 19 | 16.6187 | DD[19] | | | | | |
| 20 | −115.8088 | 1.5264 | 1.51680 | 64.20 | 0.53430 | | |
| 21 | −41.1177 | DD[21] | | | | | |

TABLE 50

| Example 17 | | | |
|---|---|---|---|
| | Wide | Middle | Tele |
| Zr | 1.0 | 1.4 | 2.1 |
| f | 12.22 | 17.29 | 25.67 |
| Bf | 16.19 | 18.06 | 22.50 |
| FNo. | 5.16 | 5.81 | 7.07 |
| 2ω [°] | 108.6 | 79.4 | 57.2 |
| DD[6] | 19.91 | 8.93 | 1.88 |
| DD[8] | 4.92 | 3.28 | 0.24 |
| DD[17] | 0.83 | 2.00 | 2.79 |
| DD[19] | 6.94 | 8.36 | 11.68 |
| DD[21] | 16.19 | 18.06 | 22.50 |

TABLE 51

| Example 17 | Sn | | | |
|---|---|---|---|---|
| | 3 | 4 | 5 | 6 |
| KA | 1.0000000E+00 | 1.0000000E+00 | 1.0000000E+00 | 1.0000000E+00 |
| A4 | 2.4217097E−04 | 1.5532071E−04 | −2.3248836E−04 | −2.3986047E−04 |
| A6 | −1.2216001E−06 | 6.0333283E−07 | −7.6012719E−08 | −3.1843532E−07 |
| A8 | 3.1880085E−09 | −1.8864786E−08 | −7.4608966E−09 | 5.6916655E−09 |
| A10 | 0.0000000E+00 | 1.9453327E−11 | 5.2900039E−11 | −1.3581954E−11 |

| | Sn | | |
|---|---|---|---|
| | 7 | 8 | 17 |
| KA | 1.0000000E+00 | 1.0000000E+00 | 1.0000000E+00 |
| A4 | −4.1515322E−04 | −2.5106257E−04 | 1.2726560E−04 |
| A6 | −6.2834472E−06 | −3.9302514E−06 | 8.4938501E−07 |
| A8 | 3.5115942E−08 | 2.9342254E−08 | −4.6135685E−09 |
| A10 | −8.4925832E−09 | −4.6394777E−09 | 1.9541000E−10 |

Example 18

Figure 37:
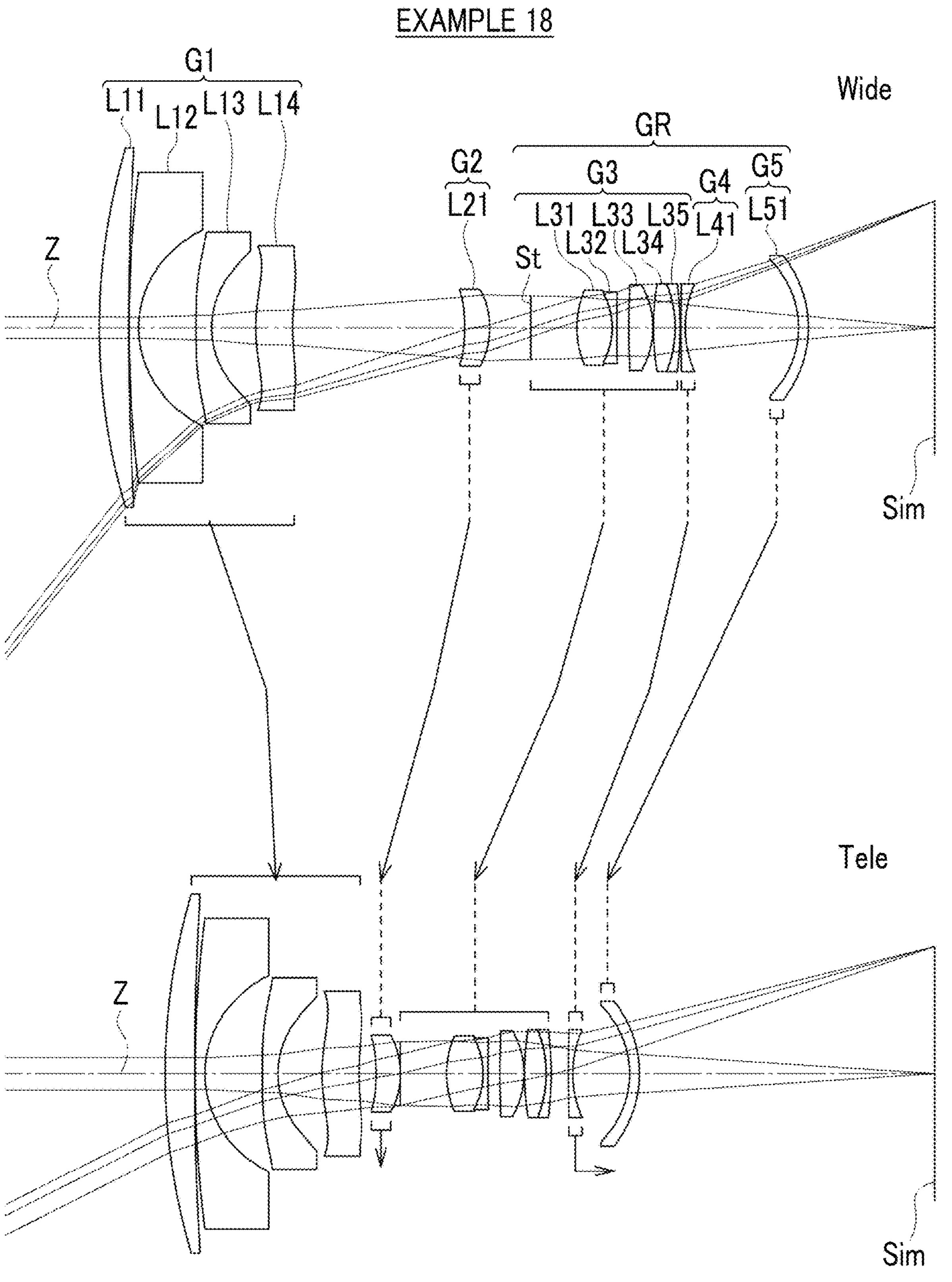
FIG. 37 is a diagram illustrating a cross-sectional view and a moving path of a configuration of a variable magnification optical system of Example 18.

A configuration and a moving path of a variable magnification optical system of Example 18 are illustrated in FIG. 37. The variable magnification optical system of Example 18 consists of, in order from the object side to the image side, the first lens group G1 having a negative refractive power, the second lens group G2 having a positive refractive power, the third lens group G3 having a positive refractive power, the fourth lens group G4 having a negative refractive power, and the fifth lens group G5 having a negative refractive power. The subsequent group GR consists of three lens groups including the third lens group G3, the fourth lens group G4, and the fifth lens group G5. The first lens group G1 consists of four lenses including the lenses L11 to L14 in order from the object side to the image side. The second lens group G2 consists of one lens that is the lens L21. The third lens group G3 consists of the aperture stop St and five lenses including the lenses L31 to L35 in order from the object side to the image side. The fourth lens group G4 consists of one lens that is the lens L41. The fifth lens group G5 consists of one lens that is the lens L51.

During changing the magnification from the wide angle end to the telephoto end, all lens groups move along the optical axis Z by changing their spacings with respect to their adjacent lens groups. The focusing lens group consists of the fourth lens group G4. During the focusing from the infinite distance object to the nearest object, the fourth lens group G4 moves to the image side, and other lens groups are fixed with respect to the image plane Sim. The vibration-proof group consists of the second lens group G2.

Figure 38:
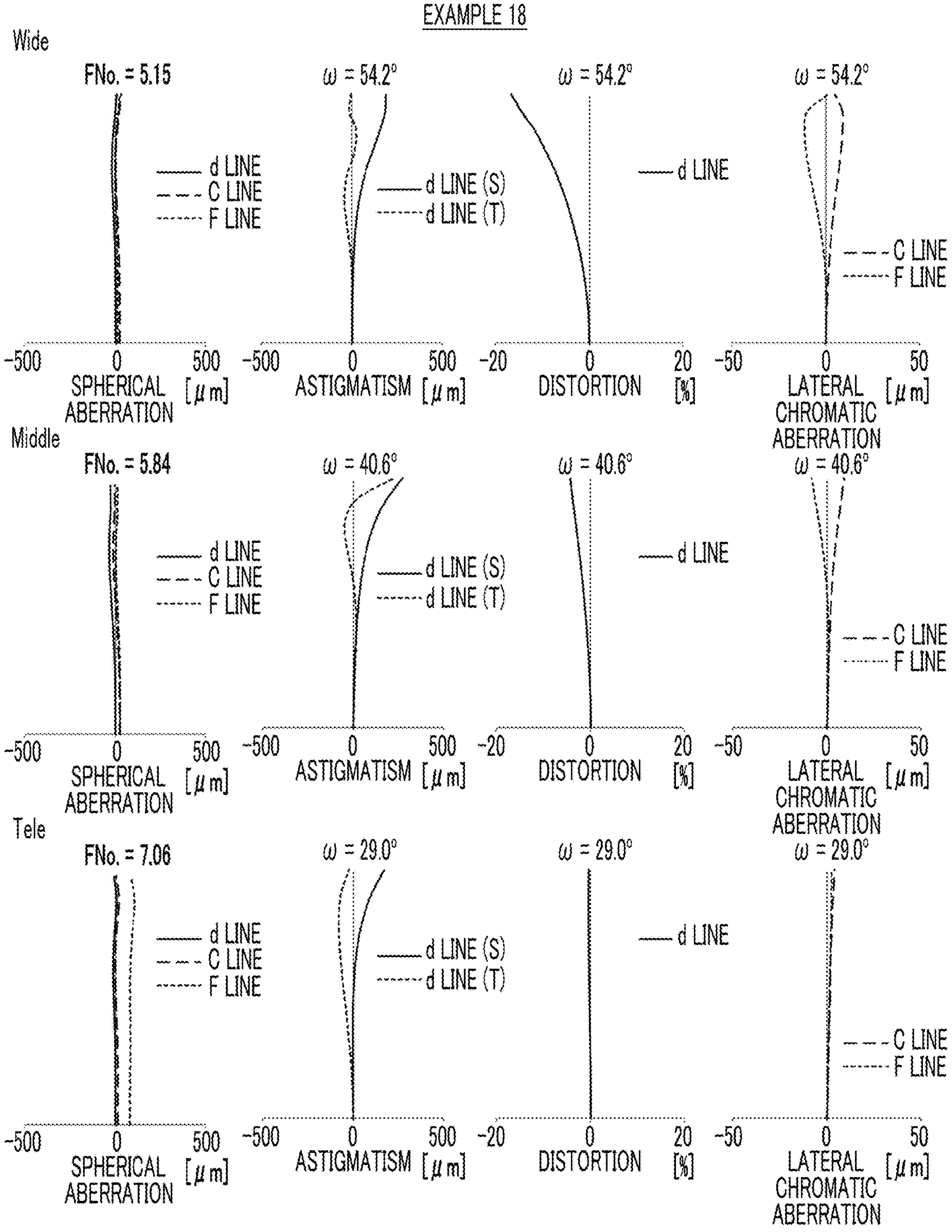
FIG. 38 is each aberration diagram of the variable magnification optical system of Example 18.

For the variable magnification optical system of Example 18, basic lens data is shown in Table 52, specifications and variable surface spacings are shown in Table 53, aspherical coefficients are shown in Table 54, and each aberration diagram is illustrated in FIG. 38.

TABLE 52

| Example 18 | | | | | | | |
|---|---|---|---|---|---|---|---|
| Sn | R | D | Nd | νd | θg, F | ED | NG1L + 0.01 × νG1L |
| 1 | 77.0925 | 3.0000 | 1.75500 | 52.32 | 0.54757 | | 2.27820 |
| 2 | 354.1374 | 0.0500 | | | | | |
| 3 | 152.7158 | 0.9998 | 1.51680 | 64.20 | 0.53430 | | 2.15880 |
| 4 | 12.4999 | 5.8467 | | | | 21.95 | |
| *5 | 187.5760 | 1.5963 | 1.54436 | 56.03 | 0.56178 | 21.41 | 2.10466 |
| *6 | 10.8190 | 4.4844 | | | | 17.22 | |

TABLE 52-continued

| Example 18 | | | | | | | |
|---|---|---|---|---|---|---|---|
| Sn | R | D | Nd | νd | θg, F | ED | NG1L + 0.01 × νG1L |
| *7 | 20.8810 | 3.7713 | 1.66121 | 20.35 | 0.66162 | | 1.86471 |
| *8 | 31.5660 | DD[8] | | | | | |
| *9 | −24.7294 | 2.4718 | 1.54436 | 56.03 | 0.56178 | | |
| *10 | −10.7807 | DD[10] | | | | | |
| 11 (St) | ∞ | 4.7075 | | | | | |
| 12 | 11.6866 | 3.6476 | 1.43875 | 94.66 | 0.53402 | | |
| 13 | −8.8436 | 0.4870 | 1.88300 | 39.22 | 0.57288 | | |
| 14 | 267.2920 | 1.2121 | | | | | |
| 15 | 116.3163 | 2.4521 | 1.60342 | 38.03 | 0.58356 | | |
| 16 | −10.3308 | 0.0498 | | | | | |
| 17 | 32.7417 | 2.2208 | 1.52841 | 76.45 | 0.53954 | | |
| 18 | −14.2566 | 0.4998 | 1.72916 | 54.68 | 0.54451 | | |
| *19 | −33.5592 | DD[19] | | | | | |
| 20 | 381.0956 | 0.4342 | 1.77535 | 50.31 | 0.55042 | | |
| 21 | 13.0792 | DD[21] | | | | | |
| 22 | −11.4008 | 0.9998 | 1.48749 | 70.24 | 0.53007 | | |
| 23 | −13.9341 | DD[23] | | | | | |

TABLE 53

| Example 18 | | | |
|---|---|---|---|
| | Wide | Middle | Tele |
| Zr | 1.0 | 1.4 | 2.1 |
| f | 12.26 | 17.34 | 25.74 |
| Bf | 12.91 | 20.92 | 30.11 |
| FNo. | 5.15 | 5.84 | 7.06 |
| 2ω [°] | 108.4 | 81.2 | 58.0 |
| DD[8] | 17.55 | 8.11 | 1.78 |

TABLE 53-continued

| Example 18 | | | |
|---|---|---|---|
| | Wide | Middle | Tele |
| DD[10] | 4.17 | 2.95 | 0.01 |
| DD[19] | 0.08 | 1.04 | 1.76 |
| DD[21] | 11.54 | 7.45 | 5.84 |
| DD[23] | 12.91 | 20.92 | 30.11 |

TABLE 54

| Example 18 | | | | |
|---|---|---|---|---|
| | Sn | | | |
| | 5 | 6 | 7 | 8 |
| KA | 1.0000000E+00 | 1.0000000E+00 | 1.0000000E+00 | 1.0000000E+00 |
| A4 | 1.7672566E−04 | 7.0721380E−05 | −2.3354429E−04 | −2.2587478E−04 |
| A6 | −1.3524715E−06 | 2.3166618E−07 | −1.0335805E−07 | −4.8332442E−07 |
| A8 | 2.6415974E−09 | −2.0733995E−08 | −8.4848505E−09 | 8.7439855E−09 |
| A10 | 0.0000000E+00 | −7.7103234E−11 | 6.0438959E−11 | −2.1374773E−12 |

| | Sn | | |
|---|---|---|---|
| | 9 | 10 | 19 |
| KA | 1.0000000E+00 | 1.0000000E+00 | 1.0000000E+00 |
| A4 | −3.8825691E−04 | −2.2515159E−04 | 1.2915608E−04 |
| A6 | −4.8832035E−06 | −3.6869311E−06 | 7.4747940E−07 |
| A8 | −3.5311225E−08 | 2.5756266E−08 | −4.5460297E−09 |
| A10 | −5.5641473E−09 | −3.8154995E−09 | 1.9541000E−10 |

Example 19

Figure 39:
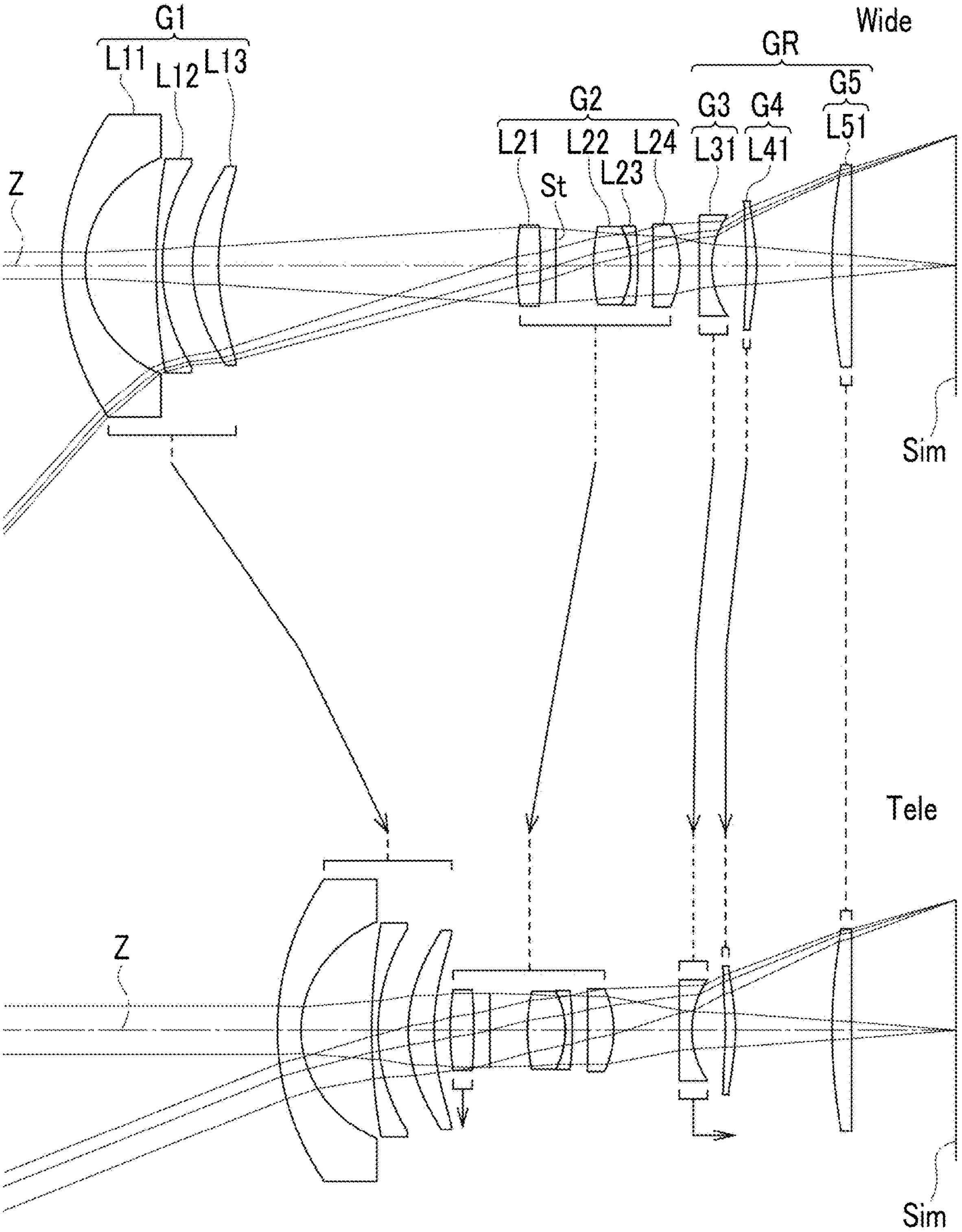
FIG. 39 is a diagram illustrating a cross-sectional view and a moving path of a configuration of a variable magnification optical system of Example 19.

A configuration and a moving path of a variable magnification optical system of Example 19 are illustrated in FIG. 39. The variable magnification optical system of Example 19 consists of, in order from the object side to the image side, the first lens group G1 having a negative refractive power, the second lens group G2 having a positive refractive power, the third lens group G3 having a negative refractive power, the fourth lens group G4 having a positive refractive power, and the fifth lens group G5 having a positive refractive power. The subsequent group GR consists of three lens groups including the third lens group G3, the fourth lens group G4, and the fifth lens group G5. The first lens group G1 consists of three lenses including the lenses L11 to L13 in order from the object side to the image side. The second lens group G2 consists of the lens L21, the aperture stop St, and the lenses L22 to L24 in order from the object side to the image side. The third lens group G3 consists of one lens that is the lens L31. The fourth lens group G4 consists of one lens that is the lens L41. The fifth lens group G5 consists of one lens that is the lens L51.

During changing the magnification from the wide angle end to the telephoto end, the fifth lens group G5 is fixed with respect to the image plane Sim, and other lens groups move along the optical axis Z by changing their spacings with respect to their adjacent lens groups. The focusing lens group consists of the third lens group G3. During the focusing from the infinite distance object to the nearest object, the third lens group G3 moves to the image side, and other lens groups are fixed with respect to the image plane Sim. The vibration-proof group consists of the lens L21.

Figure 40:
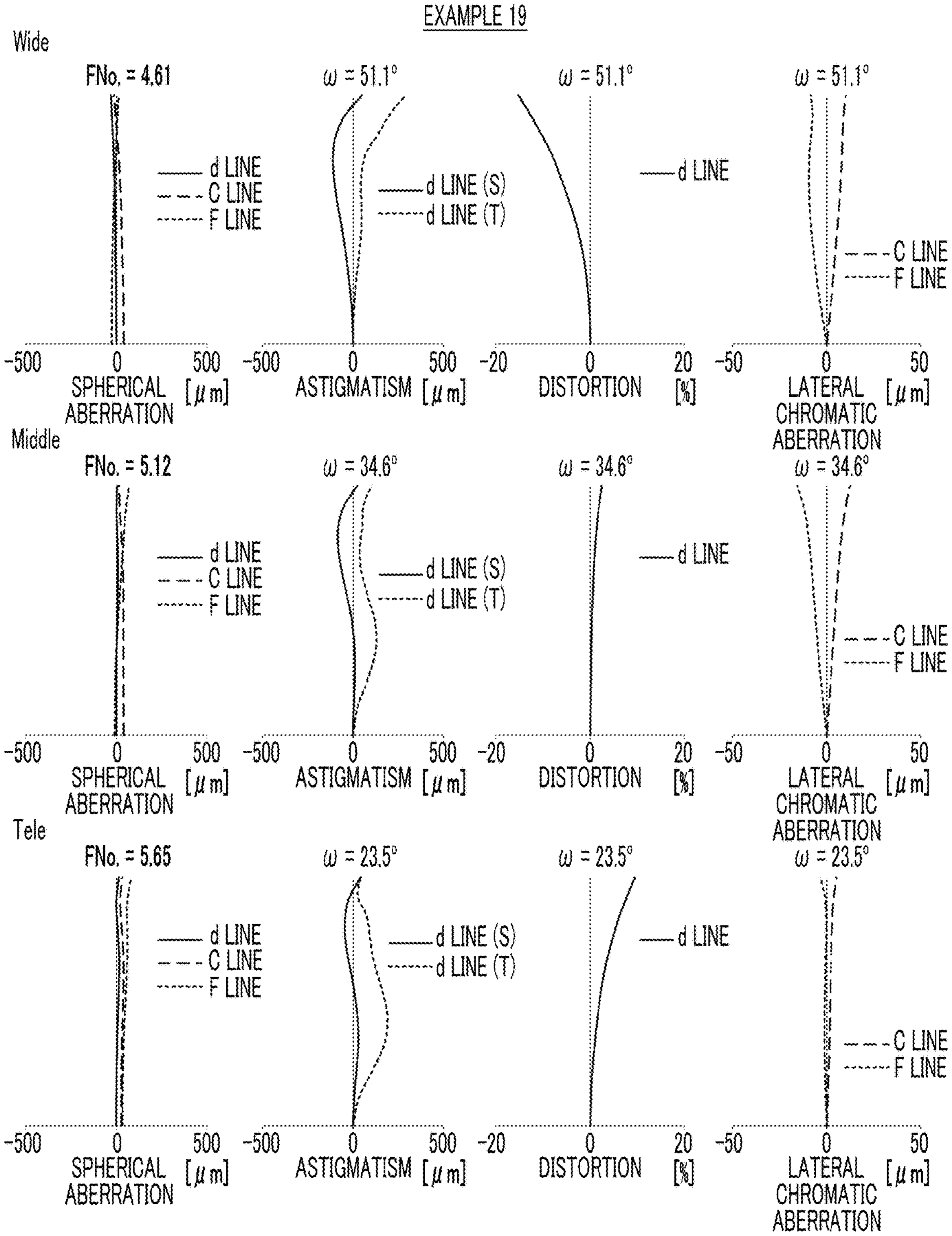
FIG. 40 is each aberration diagram of the variable magnification optical system of Example 19.

For the variable magnification optical system of Example 19, basic lens data is shown in Table 55, specifications and variable surface spacings are shown in Table 56, aspherical coefficients are shown in Table 57, and each aberration diagram is illustrated in FIG. 40.

TABLE 55

Example 19

| Sn | R | D | Nd | νd | θg, F | ED | NG1L + 0.01 × νG1L |
|---|---|---|---|---|---|---|---|
| 1 | 31.6978 | 2.3375 | 1.77535 | 50.31 | 0.55042 | | 2.27845 |
| 2 | 13.0007 | 7.0841 | | | | 23.64 | |
| 3 | 74.6114 | 0.6249 | 1.80400 | 46.53 | 0.55775 | | 2.26930 |
| 4 | 22.2594 | 3.0000 | | | | | |
| *5 | 17.1985 | 2.5663 | 1.66121 | 20.35 | 0.66162 | | 1.86471 |
| *6 | 25.2829 | DD[6] | | | | | |
| 7 | 33.8706 | 2.3497 | 1.77535 | 50.31 | 0.55042 | | |
| 8 | −59.5180 | 1.4999 | | | | | |
| 9 (St) | ∞ | 3.7499 | | | | | |
| 10 | 21.3144 | 3.7599 | 1.497 | 81.54 | 0.53748 | | |
| 11 | −10.0930 | 0.7000 | 1.95375 | 32.32 | 0.59056 | | |
| 12 | −36.5657 | 1.5362 | | | | | |
| *13 | −694.2627 | 2.6262 | 1.54436 | 56.03 | 0.56178 | | |
| *14 | −11.3668 | DD[14] | | | | | |
| 15 | 1701.5868 | 1.2498 | 1.755 | 52.32 | 0.54757 | | |
| 16 | 10.5550 | DD[16] | | | | | |
| *17 | −34.5615 | 1.0002 | 1.66121 | 20.35 | 0.66162 | | |
| *18 | −21.6811 | DD[18] | | | | | |
| 19 | 65.6032 | 1.9762 | 1.48749 | 70.24 | 0.53007 | | |
| 20 | ∞ | 10.4000 | | | | | |

TABLE 56

| Example 19 | | | |
|---|---|---|---|
| | Wide | Middle | Tele |
| Zr | 1.0 | 1.5 | 2.2 |
| f | 13.52 | 20.05 | 29.74 |
| Bf | 10.40 | 10.40 | 10.40 |
| FNo. | 4.61 | 5.12 | 5.65 |
| 2ω [°] | 102.2 | 69.2 | 47.0 |
| DD[6] | 29.64 | 13.67 | 1.60 |
| DD[14] | 1.94 | 3.53 | 6.51 |
| DD[16] | 3.44 | 3.16 | 3.33 |
| DD[18] | 7.51 | 9.53 | 9.60 |

TABLE 57

| Example 19 | | | | |
|---|---|---|---|---|
| | Sn | | | |
| | 5 | 6 | 13 | 14 |
| KA | 1.0000000E+00 | 1.0000000E+00 | 1.0000000E+00 | 1.0000000E+00 |
| A4 | −3.3614432E−05 | −4.7555765E−05 | −1.1374329E−04 | 4.8118646E−05 |
| A6 | 5.4657374E−10 | 2.5790496E−07 | −1.9066192E−06 | −2.2282568E−06 |
| A8 | 1.1519429E−09 | −1.6590025E−09 | 1.2682754E−07 | 1.1011527E−07 |
| A10 | −1.4673234E−11 | −4.2867523E−12 | −4.3172848E−09 | −3.2591354E−09 |

| | Sn | |
|---|---|---|
| | 17 | 18 |
| KA | 1.0000000E+00 | 1.0000000E+00 |
| A4 | 2.6435091E−04 | 2.2915341E−04 |
| A6 | 2.4866697E−06 | 2.7876554E−07 |
| A8 | −1.6305953E−08 | 5.9005483E−08 |
| A10 | −1.5353388E−09 | −2.3247486E−09 |
| A12 | | −1.39564E−14 |

Example 20

Figure 41:
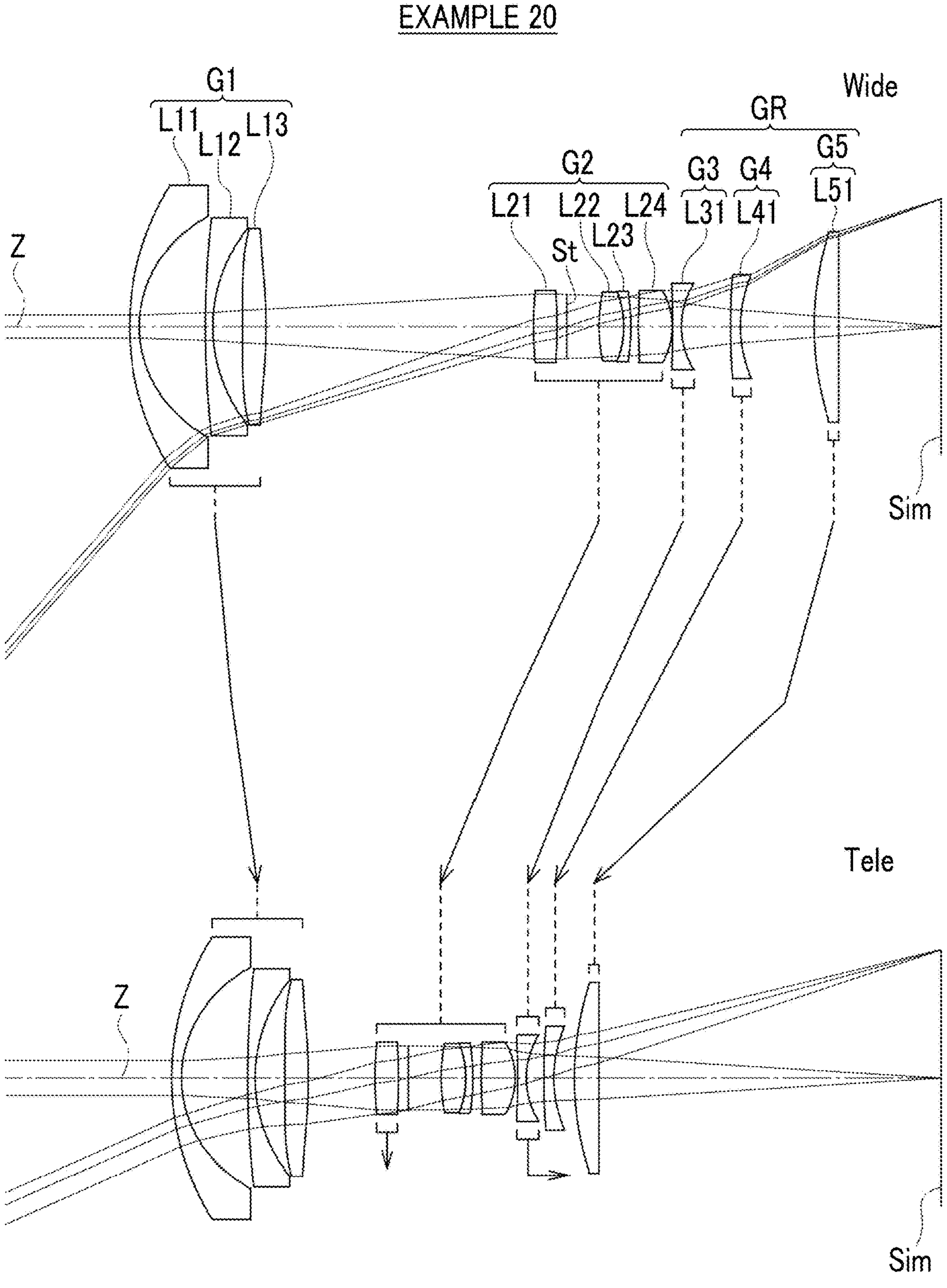
FIG. 41 is a diagram illustrating a cross-sectional view and a moving path of a configuration of a variable magnification optical system of Example 20.

A configuration and a moving path of a variable magnification optical system of Example 20 are illustrated in FIG. 41. The variable magnification optical system of Example 20 consists of, in order from the object side to the image side, the first lens group G1 having a negative refractive power, the second lens group G2 having a positive refractive power, the third lens group G3 having a negative refractive power, the fourth lens group G4 having a negative refractive power, and the fifth lens group G5 having a positive refractive power. The subsequent group GR consists of three lens groups including the third lens group G3, the fourth lens group G4, and the fifth lens group G5. The first lens group G1 consists of three lenses including the lenses L11 to L13 in order from the object side to the image side. The second lens group G2 consists of the lens L21, the aperture stop St, and the lenses L22 to L24 in order from the object side to the image side. The third lens group G3 consists of one lens that is the lens L31. The fourth lens group G4 consists of one lens that is the lens L41. The fifth lens group G5 consists of one lens that is the lens L51.

During changing the magnification from the wide angle end to the telephoto end, all lens groups move along the optical axis Z by changing their spacings with respect to their adjacent lens groups. The focusing lens group consists of the third lens group G3. During the focusing from the infinite distance object to the nearest object, the third lens group G3 moves to the image side, and other lens groups are fixed with respect to the image plane Sim. The vibration-proof group consists of the lens L21.

Figure 42:
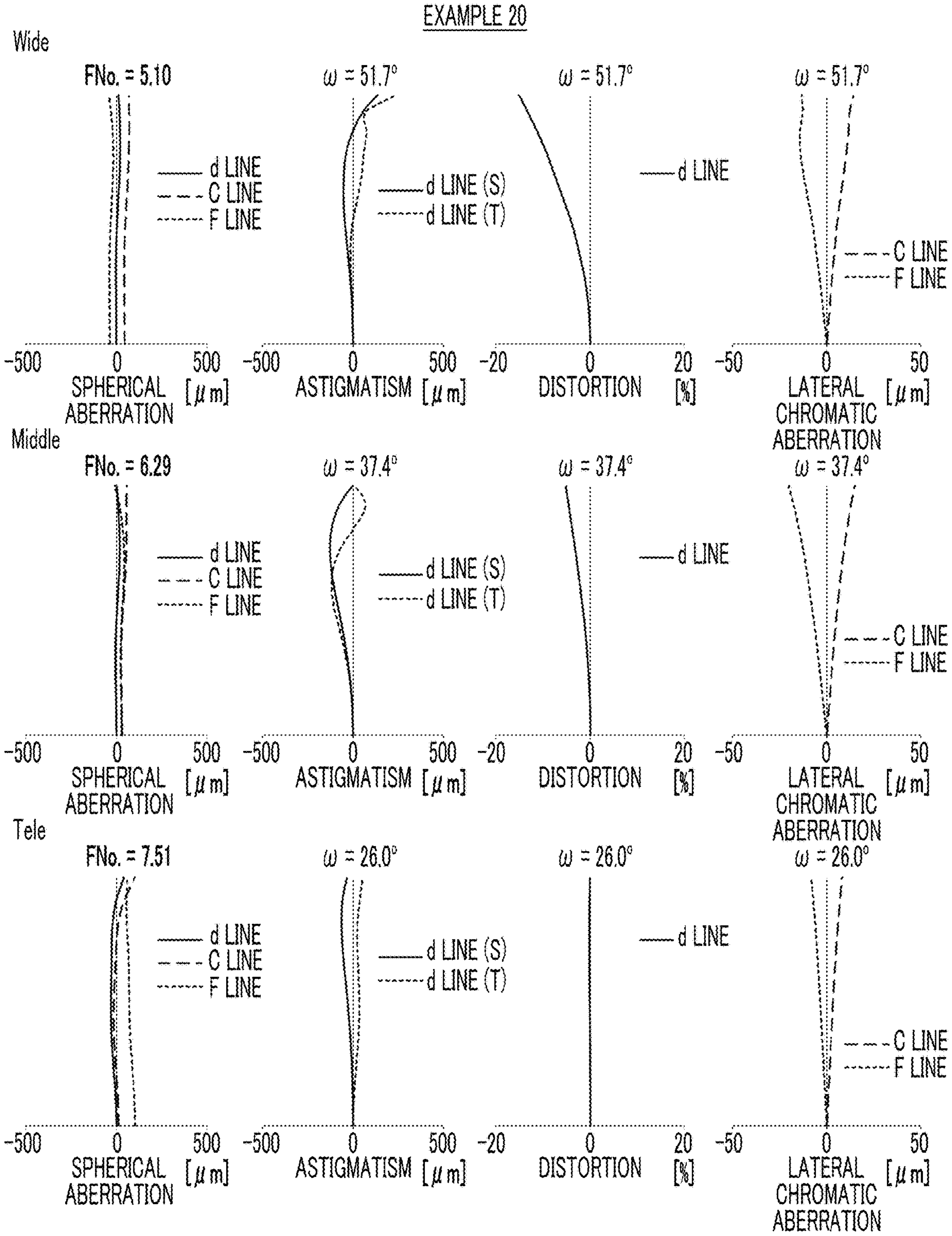
FIG. 42 is each aberration diagram of the variable magnification optical system of Example 20.

For the variable magnification optical system of Example 20, basic lens data is shown in Table 58, specifications and variable surface spacings are shown in Table 59, aspherical coefficients are shown in Table 60, and each aberration diagram is illustrated in FIG. 42.

TABLE 58

| Example 20 | | | | | | | |
|---|---|---|---|---|---|---|---|
| Sn | R | D | Nd | νd | θg, F | ED | NG1L + 0.01 × νG1L |
| 1 | 32.0985 | 0.9998 | 1.77535 | 50.31 | 0.55042 | | 2.27845 |
| 2 | 14.2821 | 6.6926 | | | | 24.54 | |
| 3 | 117.5809 | 0.7500 | 1.65160 | 58.54 | 0.53901 | | 2.23700 |
| 4 | 18.7159 | 3.0000 | | | | | |
| *5 | 406.9518 | 2.3872 | 1.66121 | 20.35 | 0.66162 | | 1.86471 |
| *6 | −64.5994 | DD[6] | | | | | |

TABLE 58-continued

| Example 20 | | | | | | | |
|---|---|---|---|---|---|---|---|
| Sn | R | D | Nd | νd | θg, F | ED | NG1L + 0.01 × νG1L |
| 7 | 46.8649 | 2.3694 | 1.77535 | 50.31 | 0.55042 | | |
| 8 | −63.0004 | 0.9947 | | | | | |
| 9 (St) | ∞ | 3.3182 | | | | | |
| 10 | 21.1088 | 2.5098 | 1.49700 | 81.54 | 0.53748 | | |
| 11 | −11.1502 | 0.7000 | 1.95375 | 32.32 | 0.59056 | | |
| 12 | −27.9015 | 0.7557 | | | | | |
| *13 | 34.3608 | 3.4384 | 1.54436 | 56.03 | 0.56178 | | |
| *14 | −8.3490 | DD[14] | | | | | |
| 15 | −92.4971 | 0.8750 | 1.64000 | 60.08 | 0.53704 | | |
| 16 | 9.7688 | DD[16] | | | | | |
| *17 | 214.9332 | 0.9998 | 1.54436 | 56.03 | 0.56178 | | |
| *18 | 15.3397 | DD[18] | | | | | |
| 19 | 36.6521 | 2.5458 | 1.48749 | 70.24 | 0.53007 | | |
| 20 | ∞ | DD[20] | | | | | |

TABLE 59

| Example 20 | | | |
|---|---|---|---|
| | Wide | Middle | Tele |
| Zr | 1.0 | 1.5 | 2.2 |
| f | 13.23 | 19.62 | 29.10 |
| Bf | 10.36 | 15.36 | 34.66 |
| FNo. | 5.10 | 6.29 | 7.51 |
| 2ω [°] | 103.4 | 74.8 | 52.0 |
| DD[6] | 27.02 | 16.79 | 6.80 |
| DD[14] | 0.05 | 0.09 | 0.25 |
| DD[16] | 4.97 | 3.82 | 1.78 |
| DD[18] | 7.45 | 12.08 | 2.08 |
| DD[20] | 10.36 | 15.36 | 34.66 |

TABLE 60

| Example 20 | | | | |
|---|---|---|---|---|
| | Sn | | | |
| | 5 | 6 | 13 | 14 |
| KA | 1.0000000E+00 | 1.0000000E+00 | 1.0000000E+00 | 1.0000000E+00 |
| A4 | −8.2147757E−06 | −1.2315091E−05 | −3.4526260E−04 | 3.2304968E−04 |
| A6 | 6.8056375E−07 | 6.8281505E−07 | −1.1789116E−05 | −1.5594896E−05 |
| A8 | −1.3110760E−09 | −2.5455416E−09 | 5.1003799E−08 | 1.1877028E−07 |
| A10 | −1.0185620E−11 | −6.1687528E−12 | −1.9605880E−08 | −8.3499544E−09 |

| | Sn | |
|---|---|---|
| | 17 | 18 |
| KA | 1.0000000E+00 | 1.0000000E+00 |
| A4 | 2.2672203E−04 | −4.8793273E−06 |
| A6 | 4.4082312E−06 | 5.6498262E−06 |
| A8 | −5.6236586E−07 | −4.1816205E−07 |
| A10 | 1.0692935E−08 | 6.6632442E−09 |
| A12 | | −1.3956400E−14 |

Tables 61 to 64 show the corresponding values of Conditional Expressions (1) to (3) and (5) to (33) of the variable magnification optical systems of Examples 1 to 20. Preferable ranges of the conditional expressions may be set using the corresponding values of the examples shown in Tables 61 to 64 as the upper limits and the lower limits of the conditional expressions. The corresponding value of Conditional Expression (4) for the lenses of the first lens group G1 is shown in the column of "NG1L+0.01×νG1L" of the basic lens data, as described above. Thus, the corresponding value is not shown in Tables 61 to 64.

TABLE 61

| Expression Number | | Example 1 | Example 2 | Example 3 | Example 4 | Example 5 |
|---|---|---|---|---|---|---|
| (1) | TLw/(ft × tan ωt) | 5.9834 | 5.4609 | 6.0884 | 6.4674 | 6.4588 |
| (2) | Bfw/(ft × tan ωt) | 1.5174 | 1.3272 | 1.6417 | 1.8806 | 1.2627 |
| (3) | (fw × TLw)/ft$^2$ | 1.7151 | 1.7025 | 2.1604 | 1.8322 | 1.6083 |
| (5) | Dsum/(TLw − Bfw) | 0.4626 | 0.5325 | 0.6126 | 0.7442 | 0.4225 |
| (6) | dG1/\|f1\| | 0.5735 | 0.5735 | 0.9232 | 0.8971 | 0.8452 |
| (7) | NG1n + 0.01 × νG1n | 2.0928 | 2.0928 | 2.1047 | 2.1047 | 2.1047 |
| (8) | dm/dG1 | 0.3693 | 0.5582 | 0.2895 | 0.2541 | 0.4805 |
| (9) | f2/\|f1\| | 0.9571 | 1.0003 | 0.8808 | 0.8808 | 1.5253 |
| (10) | fw/\|f1\| | 0.5027 | 0.5633 | 0.6994 | 0.6989 | 0.7149 |
| (11) | (Rf + Rr)/(Rf − Rr) | 1.1722 | 1.5060 | 3.1561 | 2.2950 | 2.1211 |
| (12) | ft/\|fois\| | 1.0233 | 0.8151 | 0.7389 | 0.8255 | 0.9840 |
| (13) | ft/\|ffoc\| | 0.4886 | 0.4590 | 1.0424 | 1.1646 | 0.8642 |
| (14) | Nr + 0.01 × νr | — | — | — | — | 2.1047 |
| (15) | ft/\|f1\| | 0.9052 | 1.0140 | 1.1890 | 1.3283 | 1.5009 |
| (16) | \|f1\|/(fw × ft)$^{1/2}$ | 1.4824 | 1.3231 | 1.0966 | 1.0379 | 0.9654 |
| (17) | f2/(fw × ft)$^{1/2}$ | 1.4188 | 1.3235 | 0.9659 | 0.9142 | 1.4725 |
| (18) | dG1(/TLw − Bfw) | 0.2748 | 0.2438 | 0.2895 | 0.2735 | 0.2073 |
| (19) | \|f1\|/(ft/FNot) | 7.2800 | 6.6369 | 4.9875 | 4.9611 | 4.4774 |
| (20) | fw/\|ffoc\| | 0.2713 | 0.2550 | 0.6132 | 0.6127 | 0.4116 |
| (21) | N1nm | 1.7550 | 1.7550 | 1.4875 | 1.4875 | 1.7550 |
| (22) | NG1n | 1.5341 | 1.5341 | 1.5444 | 1.5444 | 1.5444 |
| (23) | Dfoc/(ft × tan ωt) | 0.1953 | 0.2130 | 0.0546 | 0.0361 | 0.2396 |
| (24) | νfoc | 55.87 | 55.87 | 46.62 | 46.62 | 94.66 |
| (25) | ωw | 48.7 | 50.3 | 51.4 | 51.3 | 53.5 |
| (26) | ft/fw | 1.8 | 1.8 | 1.7 | 1.9 | 2.1 |
| (27) | ρL1n | 1.01 | 1.01 | 1.04 | 1.04 | 1.04 |
| (28) | dL1nh/dL1n | 3.21457 | 3.74633 | 2.6683 | 2.86536 | 2.6512 |
| (29) | ρL2nm | — | — | — | — | — |
| (30) | dL2nmh/dL2nm | — | — | — | — | — |
| (31) | fw/\|fL1nm\| | 0.8014 | 0.6443 | 0.2057 | 0.2517 | 0.3907 |
| (32) | ρLr | — | — | — | — | — |
| (33) | dL1nmh/dL1nm | 6.4876 | 6.6923 | 4.3569 | 4.8810 | 6.2072 |

TABLE 62

| Expression Number | | Example 6 | Example 7 | Example 8 | Example 9 | Example 10 |
|---|---|---|---|---|---|---|
| (1) | TLw/(ft × tan ωt) | 7.5144 | 6.2863 | 7.7761 | 6.1344 | 6.6756 |
| (2) | Bfw/(ft × tan ωt) | 1.2959 | 1.3344 | 1.3242 | 1.8206 | 1.3989 |
| (3) | (fw × TLw)/ft$^2$ | 1.7937 | 1.3751 | 1.5843 | 1.5922 | 2.0032 |
| (5) | Dsum/(TLw − Bfw) | 0.3681 | 0.4294 | 0.3676 | 0.5611 | 0.5762 |
| (6) | dG1/\|f1\| | 0.9567 | 0.9805 | 1.0020 | 1.0333 | 1.1609 |
| (7) | NG1n + 0.01 × νG1n | 2.1047 | 2.1047 | 2.1047 | 2.1047 | 2.0928 |
| (8) | dm/dG1 | 0.2660 | 0.2892 | 0.5235 | 0.2978 | 0.2550 |
| (9) | f2/\|f1\| | 1.5015 | 1.4460 | 1.4945 | 2.3603 | 1.1396 |
| (10) | fw/\|f1\| | 0.6854 | 0.6935 | 0.7332 | 0.7632 | 0.8123 |
| (11) | (Rf + Rr)/(Rf − Rr) | 2.8954 | 3.3002 | 1.5299 | 1.6444 | 2.1302 |
| (12) | ft/\|fois\| | 1.0040 | 1.028 | 1.1279 | 1.6793 | 0.6642 |
| (13) | ft/\|ffoc\| | 0.6633 | 0.8221 | 0.6917 | 1.4103 | 1.1326 |
| (14) | Nr + 0.01 × νr | 2.1047 | 2.1047 | 2.1047 | — | 2.1047 |
| (15) | ft/\|f1\| | 1.5076 | 1.5947 | 1.6857 | 1.6033 | 1.5190 |
| (16) | \|f1\|/(fw × ft)$^{1/2}$ | 0.9837 | 0.9509 | 0.8995 | 0.9040 | 0.9003 |
| (17) | f2/(fw × ft)$^{1/2}$ | 1.4771 | 1.3750 | 1.3443 | 2.1338 | 1.0260 |
| (18) | dG1(/TLw − Bfw) | 0.1944 | 0.2469 | 0.1967 | 0.2740 | 0.2581 |
| (19) | \|f1\|/(ft/FNot) | 4.6166 | 4.1576 | 4.4076 | 4.3412 | 4.3712 |
| (20) | fw/\|ffoc\| | 0.3016 | 0.3575 | 0.3008 | 0.6714 | 0.6056 |
| (21) | N1nm | 1.6516 | 1.6516 | 1.7550 | 1.4875 | 1.4875 |
| (22) | NG1n | 1.5444 | 1.5444 | 1.5444 | 1.5444 | 1.5341 |

TABLE 62-continued

| Expression Number | | Example 6 | Example 7 | Example 8 | Example 9 | Example 10 |
|---|---|---|---|---|---|---|
| (23) | Dfoc/(ft × tan ωt) | 0.2442 | 0.3052 | 0.1979 | 0.0315 | 0.0367 |
| (24) | νfoc | 94.66 | — | 94.66 | 50.31 | 40.78 |
| (25) | ωw | 55.5 | 55.8 | 55 | 54.3 | 52.6 |
| (26) | ft/fw | 2.2 | 2.3 | 2.3 | 2.1 | 1.9 |
| (27) | ρL1n | 3.06 | 3.06 | 1.04 | 1.04 | 1.01 |
| (28) | dL1nh/dL1n | — | — | 2.80229 | 3.18721 | 3.82753 |
| (29) | ρL2nm | 1.04 | 1.04 | — | — | — |
| (30) | dL2nmh/dL2nm | 1.9353 | 1.2343 | — | — | — |
| (31) | fw/\|fL1nm\| | 0.2465 | 0.2217 | 0.6060 | 0.3574 | 0.3157 |
| (32) | ρLr | 1.04 | 1.04 | 1.04 | — | — |
| (33) | dL1nmh/dL1nm | 5.7972 | 5.6214 | 6.9170 | 7.8984 | 6.2766 |

TABLE 63

| Expression Number | | Example 11 | Example 12 | Example 13 | Example 14 | Example 15 |
|---|---|---|---|---|---|---|
| (1) | TLw/(ft × tan ωt) | 5.9940 | 5.9046 | 5.8567 | 6.2995 | 5.9438 |
| (2) | Bfw/(ft × tan ωt) | 1.3644 | 1.2380 | 0.9825 | 0.7949 | 0.7667 |
| (3) | (fw × TLw)/ft$^2$ | 1.8060 | 1.3254 | 1.7864 | 1.8897 | 1.8410 |
| (5) | Dsum/(TLw − Bfw) | 0.6141 | 0.6320 | 0.5754 | 0.5543 | 0.6218 |
| (6) | dG1/\|f1\| | 1..1499 | 1.2048 | 1.0158 | 1.2875 | 0.9011 |
| (7) | NG1n + 0.01 × νG1n | 2.0928 | 2.0928 | 2.0928 | 2.1047 | 2.0928 |
| (8) | dm/dG1 | 0.2966 | 0.3089 | 0.3128 | 0.3351 | 0.2978 |
| (9) | f2/\|f1\| | 1.0932 | 1.2489 | 1.0091 | 1.3053 | 1.0181 |
| (10) | fw/\|f1\| | 0.8750 | 0.9619 | 0.7774 | 0.8865 | 0.6900 |
| (11) | (Rf + Rr)/(Rf − Rr) | 1.5904 | 1.5242 | 1.8334 | 1.9906 | 1.3879 |
| (12) | ft/\|fois\| | 0.7482 | 0.8611 | 0.5410 | 0.7288 | 0.6735 |
| (13) | ft/\|ffoc\| | 1.5202 | 2.5309 | 0.8720 | 0.7481 | 0.4041 |
| (14) | Nr + 0.01 × νr | — | — | — | — | — |
| (15) | ft/\|f1\| | 1.6970 | 2.2118 | 1.4774 | 1.7200 | 1.3385 |
| (16) | \|f1\|/(fw × ft)$^{1/2}$ | 0.8206 | 0.6856 | 0.9331 | 0.8099 | 1.0406 |
| (17) | f2/(fw × ft)$^{1/2}$ | 0.8971 | 0.8562 | 0.9416 | 1.0571 | 1.0595 |
| (18) | dG1(/TLw − Bfw) | 0.2505 | 0.2262 | 0.2434 | 0.2337 | 0.2164 |
| (19) | \|f1\|/(ft/FNot) | 4.0836 | 3.0564 | 4.6500 | 3.9187 | 5.0132 |
| (20) | fw/\|ffoc\| | 0.7839 | 1.1007 | 0.4588 | 0.3856 | 0.2083 |
| (21) | N1nm | 1.4875 | 1.4875 | 1.4875 | 1.4875 | 1.4875 |
| (22) | NG1n | 1.5341 | 1.5341 | 1.5341 | 1.5444 | 1.5341 |
| (23) | Dfoc/(ft × tan ωt) | 0.0356 | 0.0316 | 0.0346 | 0.0337 | 0.0382 |
| (24) | νfoc | 50.31 | 29.14 | 50.31 | 50.31 | 52.32 |
| (25) | ωw | 543 | 53.8 | 53 | 54.3 | 54.2 |
| (26) | ft/fw | 1.9 | 2.3 | 1.9 | 1.9 | 1.9 |
| (27) | ρL1n | 1.01 | 1.01 | 1.01 | 1.04 | 1.01 |
| (28) | dL1nh/dL1n | 3.42962 | 3.73911 | 3.86018 | 3.18201 | 3.46205 |
| (29) | ρL2nm | — | — | — | — | — |
| (30) | dL2nmh/dL2nm | — | — | — | — | — |
| (31) | fw/\|fL1nm\| | 0.3648 | 0.3788 | 0.3504 | 0.3102 | 0.4000 |
| (32) | ρLr | — | — | — | — | — |
| (33) | dL1nmh/dL1nm | 6.3683 | 6.6903 | 6.5016 | 4.4810 | 6.5890 |

TABLE 64

| Expression Number | | Example 16 | Example 17 | Example 18 | Example 19 | Example 20 |
|---|---|---|---|---|---|---|
| (1) | TLw/(ft × tan ωt) | 5.9724 | 5.9994 | 5.9701 | 6.8818 | 5.7906 |
| (2) | Bfw/(ft × tan ωt) | 1.0881 | 1.1568 | 0.9048 | 0.8042 | 0.7299 |
| (3) | (fw × TLw)/ft$^2$ | 1.7769 | 1.5571 | 1.5762 | 1.3603 | 1.2840 |
| (5) | Dsum/(TLw − Bfw) | 0.4673 | 0.5190 | 0.5387 | 0.4588 | 0.4502 |
| (6) | dG1/\|f1\| | 1.0417 | 1.0113 | 1.3839 | 0.7366 | 0.6504 |
| (7) | NG1n + 0.01 × νG1n | 2.0928 | 2.1047 | 2.1047 | 2.2693 | 2.2370 |
| (8) | dm/dG1 | 0.2117 | 0.2979 | 0.2961 | 0.4537 | 0.4839 |
| (9) | f2/\|f1\| | 2.2120 | 2.0443 | 2.3159 | 0.7262 | 0.4961 |
| (10) | fw/\|f1\| | 0.8158 | 0.7458 | 0.8592 | 0.6378 | 0.6222 |
| (11) | (Rf + Rr)/(Rf − Rr) | 1.2620 | 1.6216 | 1.1783 | 2.3907 | 2.6033 |
| (12) | ft/\|fois\| | 0.7157 | 0.7664 | 0.7789 | 1.0565 | 0.8317 |
| (13) | ft/\|ffoc\| | 1.8095 | 1.4225 | 1.4728 | 2.1134 | 2.1148 |
| (14) | Nr + 0.01 × νr | — | — | — | — | — |

TABLE 64-continued

| Expression Number | | Example 16 | Example 17 | Example 18 | Example 19 | Example 20 |
|---|---|---|---|---|---|---|
| (15) | ft/\|f1\| | 1.5832 | 1.5667 | 1.8038 | 1.4031 | 1.3686 |
| (16) | $\|f1\|/(fw \times ft)^{1/2}$ | 0.8799 | 0.9251 | 0.8033 | 1.0571 | 1.0837 |
| (17) | $f2/(fw \times ft)^{1/2}$ | 1.9463 | 1.8912 | 1.8603 | 0.7677 | 0.5377 |
| (18) | dG1(/TLw − Bfw) | 0.2333 | 0.2445 | 0.2733 | 0.1987 | 0.1925 |
| (19) | \|f1\|/(ft/FNot) | 3.9414 | 4.5127 | 3.9139 | 4.0269 | 5.4875 |
| (20) | fw/\|ffoc\| | 0.9325 | 0.6772 | 0.7015 | 0.9608 | 0.9615 |
| (21) | N1nm | 1.4875 | 1.4875 | 1.5168 | 1.7754 | 1.7754 |
| (22) | NG1n | 1.5341 | 1.5444 | 1.5444 | 1.8040 | 1.6516 |
| (23) | Dfoc/(ft × tan ωt) | 0.0322 | 0.0340 | 0.0304 | 0.0966 | 0.0617 |
| (24) | νfoc | 50.31 | 50.31 | 50.31 | 52.32 | 60.08 |
| (25) | ωw | 54.3 | 54.3 | 54.2 | 51.1 | 51.7 |
| (26) | ft/fw | 1.9 | 2.1 | 2.1 | 2.2 | 2.2 |
| (27) | ρL1n | 1.01 | 1.04 | 1.04 | 4.46 | 3.24 |
| (28) | dL1nh/dL1n | 4.10934 | 3.00672 | 3.05394 | — | — |
| (29) | ρL2nm | — | — | — | — | — |
| (30) | dL2nmh/dL2nm | — | — | — | — | — |
| (31) | fw/\|fL1nm\| | 0.4220 | 0.3606 | 0.4643 | 0.4496 | 0.3889 |
| (32) | ρLr | — | — | — | 1.23 | 1.04 |
| (33) | dL1nmh/dL1nm | 6.7013 | 7.9166 | 7.1314 | 3.2727 | 5.481 |

The variable magnification optical systems of Examples 1 to 20 maintain high optical performance by favorably correcting various aberrations in the entire magnification range, while being configured to have a small size and a low weight.

Figure 43:
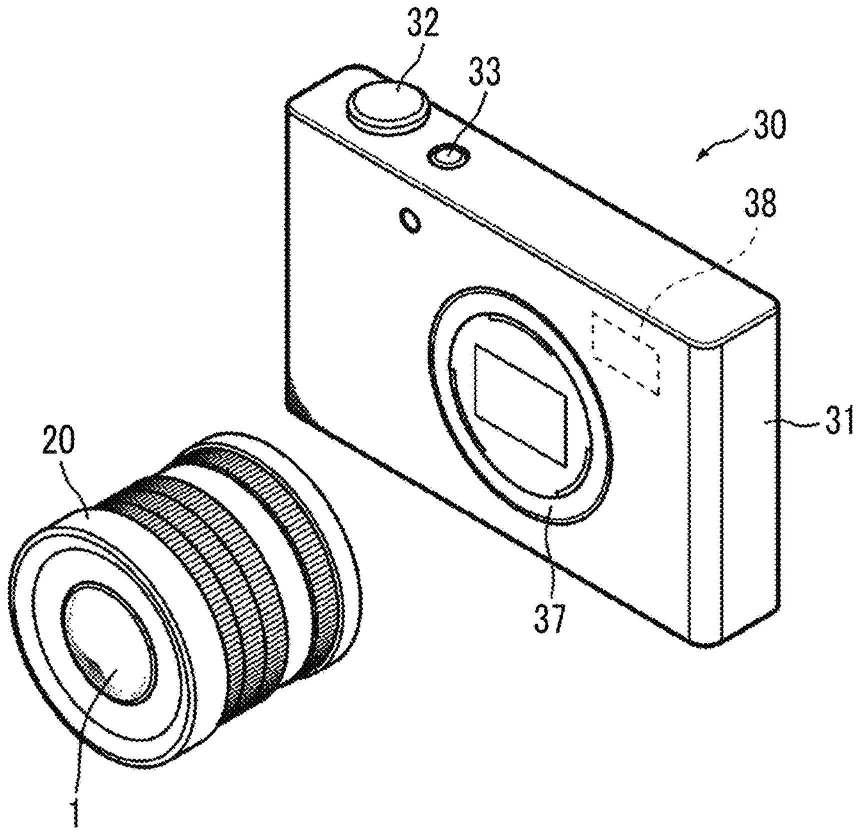
FIG. 43 is a perspective view of a front surface side of an imaging apparatus according to one embodiment.
Figure 44:
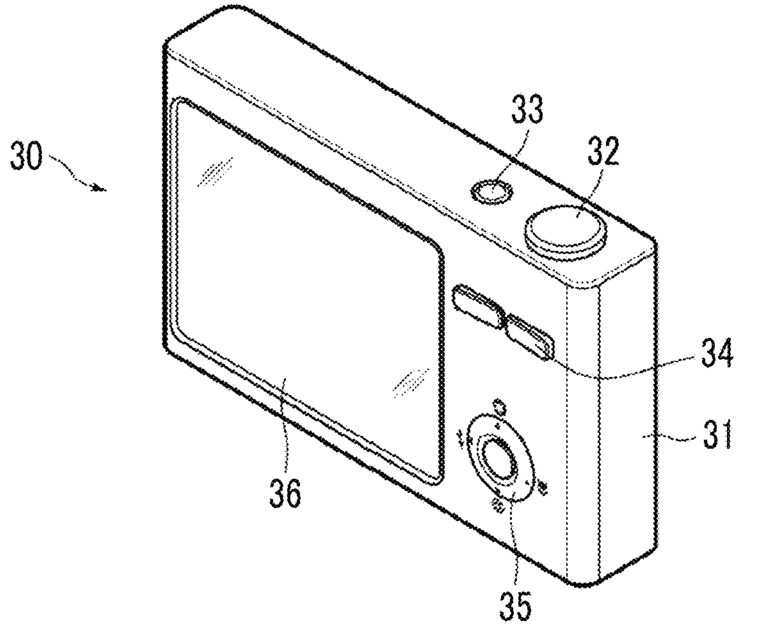
FIG. 44 is a perspective view of a rear surface side of the imaging apparatus according to one embodiment.

Next, an imaging apparatus according to the embodiment of the present disclosure will be described. FIGS. 43 and 44 illustrate external views of a camera 30 that is the imaging apparatus according to one embodiment of the present disclosure. FIG. 43 illustrates a perspective view of the camera 30 seen from a front surface side, and FIG. 44 illustrates a perspective view of the camera 30 seen from a rear surface side. The camera 30 is a so-called mirrorless type digital camera on which an interchangeable lens 20 can be attachably and detachably mounted. The interchangeable lens 20 is configured to include a variable magnification optical system 1 according to one embodiment of the present disclosure accommodated in a lens barrel.

The camera 30 comprises a camera body 31. A shutter button 32 and a power button 33 are provided on an upper surface of the camera body 31. In addition, an operating part 34, an operating part 35, and a display unit 36 are provided on a rear surface of the camera body 31. The display unit 36 can display a captured image and an image within an angle of view before being captured.

An imaging aperture on which light from an imaging target is incident is provided in a center portion of a front surface of the camera body 31. A mount 37 is provided at a position corresponding to the imaging aperture, and the interchangeable lens 20 is mounted on the camera body 31 through the mount 37.

An imaging element 38 is provided in the camera body 31. The imaging element 38 outputs an imaging signal corresponding to a subject image formed by the interchangeable lens 20. For example, a charge coupled device (CCD) or a complementary metal oxide semiconductor (CMOS) is used as the imaging element 38. A signal processing circuit (not illustrated), a recording medium (not illustrated), and the like are provided in the camera body 31. The signal processing circuit generates an image by processing the imaging signal output from the imaging element 38. The generated image is recorded on the recording medium. In the camera 30, a static image or a video can be captured by pressing the shutter button 32, and image data obtained by this capturing is recorded on the recording medium.

While the disclosed technology has been described above using the embodiment and the examples, the disclosed technology is not limited to the embodiment and the examples, and various modifications can be made. For example, the curvature radius, the surface spacing, the refractive index, the Abbe number, and the aspherical coefficient of each lens are not limited to the values shown in each example and may have other values.

In addition, the imaging apparatus according to the embodiment of the present disclosure is not limited to the above example and can have various aspects of, for example, a camera of a type other than a mirrorless type, a film camera, a video camera, and a security camera.

The following appendixes are further disclosed with respect to the embodiment and the examples described above.

Appendix 1

A variable magnification optical system consisting of, in order from an object side to an image side, a first lens group having a negative refractive power, a second lens group having a positive refractive power, and a subsequent group including one or more lens groups, in which during changing magnification, the first lens group moves, and spacings between all adjacent lens groups change, one lens group included in the subsequent group is a focusing lens group that moves along an optical axis during focusing, and in a case where a sum of a back focus of an entire system as an air conversion distance and a distance on the optical axis from a lens surface of the first lens group closest to the object side to a lens surface of the subsequent group closest to the image side in a state where an infinite distance object is focused on at a wide angle end is denoted by TLw, a focal length of the entire system in a state where the infinite distance object is focused on at a telephoto end is denoted by ft, a maximum half angle of view in the state where the infinite distance object is focused on at the telephoto end is denoted by ωt, the back focus of the entire system as the air conversion distance in the state where the infinite distance object is focused on at the wide angle end is denoted by Bfw, a focal length of the entire system in the state where the infinite distance object is focused on at the wide angle end is denoted by fw, a refractive index with respect to a d line and an Abbe number based on the d line for any lens included in the first lens group are denoted by NG1L and νG1L, respectively, and a sum total of thicknesses of all lens groups on the optical axis is denoted by Dsum, Conditional Expressions (1), (2), (3), (4), and (5) are satisfied, which are represented by $$4.5 < TLw/(\mathrm{ft} \times \tan\omega t) < 8 \quad (1)$$

$$0.4 < Bfw/(\mathrm{ft} \times \tan\omega t) < 3 \quad (2)$$

$$0.9 < (fw \times TLw)/\mathrm{ft}^2 < 3.2 \quad (3)$$

$$1.6 < NG1L + 0.01 \times \nu G1L < 2.3 \quad (4)$$

$$0.1 < Dsum/(TLw - Bfw) < 0.8. \quad (5)$$

Appendix 2

The variable magnification optical system according to Appendix 1, in which Conditional Expression (1-1) is satisfied, which is represented by $$5.4 < TLw/(\mathrm{ft} \times \tan\omega t) < 7. \quad (1\text{-}1)$$

Appendix 3

The variable magnification optical system according to Appendix 1 or 2, in which Conditional Expression (2-1) is satisfied, which is represented by $$0.55 < Bfw/(\mathrm{ft} \times \tan\omega t) < 2. \quad (2\text{-}1)$$

Appendix 4

The variable magnification optical system according to any one of Appendixes 1 to 3, in which Conditional Expression (4-1) is satisfied, which is represented by $$1.82 < NG1L + 0.01 \times \nu G1L < 1.91. \quad (4\text{-}1)$$

Appendix 5

The variable magnification optical system according to any one of Appendixes 1 to 4, in which in a case where a thickness of the first lens group on the optical axis is denoted by dG1, and a focal length of the first lens group is denoted by f1, Conditional Expression (6) is satisfied, which is represented by $$0.4 < dG1/|f1| < 2. \quad (6)$$

Appendix 6

The variable magnification optical system according to Appendix Note 5, in which Conditional Expression (6-1) is satisfied, which is represented by $$0.55 < dG1/|f1| < 1.65. \quad (6\text{-}1)$$

Appendix 7

The variable magnification optical system according to Appendix 5, in which Conditional Expression (6-2) is satisfied, which is represented by $$0.75 < dG1/|f1| < 1.35. \quad (6\text{-}2)$$

Appendix 8

The variable magnification optical system according to any one of Appendixes 1 to 7, in which the first lens group includes an L1nm lens that is a non-cemented negative meniscus lens having a convex surface toward the object side, an L1n lens that is a non-cemented negative lens having a concave surface toward the image side, and an L1p lens that is a positive lens, the L1n lens is disposed adjacent to the image side of the L1nm lens, and the L1p lens is disposed closer to the image side than the L1n lens.

Appendix 9

The variable magnification optical system according to Appendix 8, in which in a case where a refractive index with respect to a d line and an Abbe number based on the d line for a negative lens disposed between the L1nm lens and the L1p lens are denoted by NG1n and νG1n, respectively, the variable magnification optical system includes a negative lens satisfying Conditional Expression (7) represented by $$1.7 < NG1n + 0.01 \times \nu G1n < 2.16, \quad (7)$$

the negative lens satisfying Conditional Expression (7) is the L1n lens or a negative lens disposed adjacent to the image side of the L1n lens.

Appendix 10

The variable magnification optical system according to Appendix 9, in which the negative lens satisfying Conditional Expression (7) satisfies Conditional Expression (7-1) represented by $$1.74 < NG1n + 0.01 \times \nu G1n < 2.14. \quad (7\text{-}1)$$

Appendix 11

The variable magnification optical system according to any one of Appendixes 8 to 10, in which in a case where a distance on the optical axis between the L1nm lens and the L1n lens is denoted by dm, and a thickness of the first lens group on the optical axis is denoted by dG1, Conditional Expression (8) is satisfied, which is represented by $$0.01 < dm/dG1 < 0.9. \quad (8)$$

Appendix 12

The variable magnification optical system according to any one of Appendixes 8 to 11, in which a surface of the L1n lens on the object side is an aspherical surface in which a refractive power at a position of a maximum effective diameter is shifted in a positive direction compared to a refractive power in a paraxial region.

Appendix 13

The variable magnification optical system according to Appendix 12, in which the surface of the L1n lens on the object side has a concave shape in the paraxial region and has a convex shape in an edge part including the position of the maximum effective diameter.

Appendix 14

The variable magnification optical system according to any one of Appendixes 1 to 13, in which in a case where a focal length of the second lens group is denoted by f2, and a focal length of the first lens group is denoted by f1, Conditional Expression (9) is satisfied, which is represented by $$0.3 < f2/|f1| < 5. \tag{9}$$

Appendix 15

The variable magnification optical system according to Appendix 14, in which Conditional Expression (9-1) is satisfied, which is represented by $$0.65 < f2/|f1| < 3. \tag{9-1}$$

Appendix 16

The variable magnification optical system according to any one of Appendixes 1 to 15, in which the first lens group includes a positive lens having a convex surface toward the object side, closest to the object side.

Appendix 17

The variable magnification optical system according to any one of Appendixes 1 to 16, in which the first lens group consists of four or less lenses.

Appendix 18

The variable magnification optical system according to any one of Appendixes 1 to 17, in which in a case where a focal length of the first lens group is denoted by f1, Conditional Expression (10) is satisfied, which is represented by $$0.45 < fw/|f1| < 2. \tag{10}$$

Appendix 19

The variable magnification optical system according to any one of Appendixes 1 to 18, in which the first lens group includes an L1nm lens that is a non-cemented negative meniscus lens having a convex surface toward the object side, and in a case where a paraxial curvature radius of a surface of the L1nm lens on the object side is denoted by Rf, and a paraxial curvature radius of a surface of the L1nm lens on the image side is denoted by Rr, Conditional Expression (11) is satisfied, which is represented by $$1 < (Rf + Rr)/(Rf - Rr) < 7. \tag{11}$$

Appendix 20

The variable magnification optical system according to any one of Appendixes 1 to 19, in which a vibration-proof group that moves in a direction intersecting with the optical axis during image shake correction is disposed closer to the image side than the first lens group, and in a case where a focal length of the vibration-proof group is denoted by fois, Conditional Expression (12) is satisfied, which is represented by $$0.3 < ft/|fois| < 4. \tag{12}$$

Appendix 21

The variable magnification optical system according to any one of Appendixes 1 to 20, in which in a case where a focal length of the focusing lens group is denoted by ffoc, Conditional Expression (13) is satisfied, which is represented by $$0.3 < ft/|ffoc| < 3. \tag{13}$$

Appendix 22

The variable magnification optical system according to any one of Appendixes 1 to 21, in which an Lr lens is disposed closer to the image side than the focusing lens group, and in a case where a refractive index with respect to a d line and an Abbe number based on the d line for the Lr lens are denoted by Nr and νr, respectively, Conditional Expression (14) is satisfied, which is represented by $$1.7 < Nr + 0.01 \times \nu r < 2.16. \tag{14}$$

Appendix 23

An imaging apparatus comprising the variable magnification optical system according to any one of Appendixes 1 to 22.

What is claimed is:

1. A variable magnification optical system consisting of, in order from an object side to an image side, a first lens group having a negative refractive power, a second lens group having a positive refractive power, and a subsequent group including one or more lens groups, wherein during changing magnification, the first lens group moves, and spacings between all adjacent lens groups change, one lens group included in the subsequent group is a focusing lens group that moves along an optical axis during focusing, and in a case where a sum of a back focus of the variable magnification optical system as an air conversion distance and a distance on the optical axis from a lens surface of the first lens group closest to the object side to a lens surface of the subsequent group closest to the image side in a state where an infinite distance object is focused on at a wide angle end is denoted by TLw, a focal length of the variable magnification optical system in a state where the infinite distance object is focused on at a telephoto end is denoted by ft, a maximum half angle of view in the state where the infinite distance object is focused on at the telephoto end is denoted by ωt, the back focus of the variable magnification optical system as the air conversion distance in the state where the infinite distance object is focused on at the wide angle end is denoted by Bfw, a focal length of the variable magnification optical system in the state where the infinite distance object is focused on at the wide angle end is denoted by fw, a refractive index with respect to a d line and an Abbe number based on the d line for any lens included in the first lens group are denoted by NG1L and νG1L, respectively, and a sum total of thicknesses of all lens groups on the optical axis is denoted by Dsum, Conditional Expressions (1), (2), (3), (4), and (5) are satisfied, which are represented by $$4.5 < TLw/(ft \times \tan\omega t) < 8 \quad (1)$$

$$0.4 < Bfw/(ft \times \tan\omega t) < 3 \quad (2)$$

$$0.9 < (fw \times TLw)/ft^2 < 3.2 \quad (3)$$

$$1.6 < NG1L + 0.01 \times \nu G1L < 2.3 \quad (4)$$

$$0.1 < Dsum/(TLw - Bfw) < 0.8. \quad (5)$$

2. The variable magnification optical system according to claim 1, wherein Conditional Expression (1-1) is satisfied, which is represented by $$5.4 < TLw/(ft \times \tan\omega t) < 7. \quad (1\text{-}1)$$

3. The variable magnification optical system according to claim 1, wherein Conditional Expression (2-1) is satisfied, which is represented by $$0.55 < Bfw/(ft \times \tan\omega t) < 2. \quad (2\text{-}1)$$

4. The variable magnification optical system according to claim 1, wherein in a case where a thickness of the first lens group on the optical axis is denoted by dG1, and a focal length of the first lens group is denoted by f1, Conditional Expression (6) is satisfied, which is represented by $$0.4 < dG1/|f1| < 2. \quad (6)$$

5. The variable magnification optical system according to claim 4, wherein Conditional Expression (6-1) is satisfied, which is represented by $$0.55 < dG1/|f1| < 1.65. \quad (6\text{-}1)$$

6. The variable magnification optical system according to claim 1, wherein the first lens group includes an L1nm lens that is a non-cemented negative meniscus lens having a convex surface toward the object side, an L1n lens that is a non-cemented negative lens having a concave surface toward the image side, and an L1p lens that is a positive lens, the L1n lens is disposed adjacent to the image side of the L1nm lens, and the L1p lens is disposed closer to the image side than the L1n lens.

7. The variable magnification optical system according to claim 6, wherein in a case where a refractive index with respect to a d line and an Abbe number based on the d line for a negative lens disposed between the L1nm lens and the L1p lens are denoted by NG1n and νG1n, respectively, the variable magnification optical system includes a negative lens satisfying Conditional Expression (7) represented by $$1.7 < NG1n + 0.01 \times \nu G1n < 2.16, \quad (7)$$

and the negative lens satisfying Conditional Expression (7) is the L1n lens or a negative lens disposed adjacent to the image side of the L1n lens.

8. The variable magnification optical system according to claim 7, wherein the negative lens satisfying Conditional Expression (7) satisfies Conditional Expression (7-1) represented by $$1.74 < NG1n + 0.01 \times \nu G1n < 2.14. \quad (7\text{-}1)$$

9. The variable magnification optical system according to claim 6, wherein in a case where a distance on the optical axis between the L1nm lens and the L1n lens is denoted by dm, and a thickness of the first lens group on the optical axis is denoted by dG1, Conditional Expression (8) is satisfied, which is represented by $$0.01 < dm/dG1 < 0.9. \quad (8)$$

10. The variable magnification optical system according to claim 6, wherein a surface of the L1n lens on the object side is an aspherical surface in which a refractive power at a position of a maximum effective diameter is shifted in a positive direction compared to a refractive power in a paraxial region.

11. The variable magnification optical system according to claim 10, wherein the surface of the L1n lens on the object side has a concave shape in the paraxial region and has a convex shape in an edge part including the position of the maximum effective diameter.

12. The variable magnification optical system according to claim 1, wherein in a case where a focal length of the second lens group is denoted by f2, and a focal length of the first lens group is denoted by f1, Conditional Expression (9) is satisfied, which is represented by $$0.3 < f2/|f1| < 5. \quad (9)$$

13. The variable magnification optical system according to claim 12, wherein Conditional Expression (9-1) is satisfied, which is represented by $$0.65 < f2/|f1| < 3. \quad (9\text{-}1)$$

14. The variable magnification optical system according to claim 13, wherein Conditional Expression (1-1) is satisfied, which is represented by $$5.4 < TLw/(ft \times \tan\omega t) < 7. \quad (1\text{-}1)$$

15. The variable magnification optical system according to claim 14, wherein the first lens group includes an L1nm lens that is a non-cemented negative meniscus lens having a convex surface toward the object side, an L1n lens that is a non-cemented negative lens having a concave surface toward the image side, and an L1p lens that is a positive lens, the L1n lens is disposed adjacent to the image side of the L1nm lens, and the L1p lens is disposed closer to the image side than the L1n lens.

16. The variable magnification optical system according to claim 15, wherein in a case where a refractive index with respect to a d line and an Abbe number based on the d line for a negative lens disposed between the L1nm lens and the L1p lens are denoted by NG1n and νG1n, respectively, the variable magnification optical system includes a negative lens satisfying Conditional Expression (7-1) represented by $$1.74 < NG1n + 0.01 \times \nu G1n < 2.14, \quad (7\text{-}1)$$

and the negative lens satisfying Conditional Expression (7-1) is the L1n lens or a negative lens disposed adjacent to the image side of the L1n lens.

17. The variable magnification optical system according to claim 16, wherein the first lens group includes a positive lens having a convex surface toward the object side, closest to the object side.

18. The variable magnification optical system according to claim 16, wherein Conditional Expression (4-1) is satisfied, which is represented by $$1.82 < NG1L + 0.01 \times \nu G1L < 1.91. \quad (4\text{-}1)$$

19. The variable magnification optical system according to claim 16, wherein in a case where a thickness of the first lens group on the optical axis is denoted by dG1, Conditional Expression (6-1) is satisfied, which is represented by $$0.55 < dG1/|f1| < 1.65. \quad (6\text{-}1)$$

20. The variable magnification optical system according to claim 19, wherein Conditional Expression (6-2) is satisfied, which is represented by $$0.75 < dG1/|f1| < 1.35. \quad (6-2)$$

21. The variable magnification optical system according to claim 19, wherein in a case where a distance on the optical axis between the L1nm lens and the L1n lens is denoted by dm, Conditional Expression (8) is satisfied, which is represented by $$0.01 < dm/dG1 < 0.9. \quad (8)$$

22. The variable magnification optical system according to claim 19, wherein the first lens group consists of four or less lenses.

23. The variable magnification optical system according to claim 19, wherein a surface of the L1n lens on the object side is an aspherical surface in which a refractive power at a position of a maximum effective diameter is shifted in a positive direction compared to a refractive power in a paraxial region.

24. The variable magnification optical system according to claim 1, wherein in a case where a focal length of the first lens group is denoted by f1, Conditional Expression (10) is satisfied, which is represented by $$0.45 < fw/|f1| < 2. \quad (10)$$

25. The variable magnification optical system according to claim 1, wherein the first lens group includes an L1nm lens that is a non-cemented negative meniscus lens having a convex surface toward the object side, and in a case where a paraxial curvature radius of a surface of the L1nm lens on the object side is denoted by Rf, and a paraxial curvature radius of a surface of the L1nm lens on the image side is denoted by Rr, Conditional Expression (11) is satisfied, which is represented by $$1 < (Rf + Rr)/(Rf - Rr) < 7. \quad (11)$$

26. The variable magnification optical system according to claim 1, wherein a vibration-proof group that moves in a direction intersecting with the optical axis during image shake correction is disposed closer to the image side than the first lens group, and in a case where a focal length of the vibration-proof group is denoted by fois, Conditional Expression (12) is satisfied, which is represented by $$0.3 < ft/|fois| < 4. \quad (12)$$

27. The variable magnification optical system according to claim 1, wherein in a case where a focal length of the focusing lens group is denoted by ffoc, Conditional Expression (13) is satisfied, which is represented by $$0.3 < ft/|ffoc| < 3. \quad (13)$$

28. The variable magnification optical system according to claim 1, wherein an Lr lens is disposed closer to the image side than the focusing lens group, and in a case where a refractive index with respect to a d line and an Abbe number based on the d line for the Lr lens are denoted by Nr and νr, respectively, Conditional Expression (14) is satisfied, which is represented by $$1.7 < Nr + 0.01 \times \nu r < 2.16. \quad (14)$$

29. An imaging apparatus comprising:

the variable magnification optical system according to claim 1.

* * * * *